US008267206B2

(12) United States Patent
Vogel et al.

(10) Patent No.: US 8,267,206 B2
(45) Date of Patent: Sep. 18, 2012

(54) MOTORIZED TRACTION DEVICE FOR A PATIENT SUPPORT

(75) Inventors: John David Vogel, Columbus, IN (US); Thomas W. Hanson, Loveland, OH (US); Craig Crandall, Greensburg, IN (US); Joseph A. Kummer, Cincinnati, OH (US); Michael M. Frondorf, Lakeside Park, KY (US); David P. Lubbers, Cincinnati, OH (US); Ronald P. Kappeler, Batesville, IN (US); Bradley T. Wilson, Batesville, IN (US); Darrell L. Metz, Batesville, IN (US); Doug K. Smith, Batesville, IN (US); Jeffrey A. Ruschke, Lawrenceburg, IN (US); John Vodzak, Batesville, IN (US); Terry J. Stratman, Villa Hills, KY (US); Eric W. Oberhaus, West Chester, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 13/243,627

(22) Filed: Sep. 23, 2011

(65) Prior Publication Data

US 2012/0012408 A1 Jan. 19, 2012

Related U.S. Application Data

(63) Continuation of application No. 12/914,625, filed on Oct. 28, 2010, now Pat. No. 8,051,931, which is a continuation of application No. 12/185,310, filed on Aug. 4, 2008, now Pat. No. 7,828,092, which is a continuation of application No. 11/685,964, filed on Mar. 14, 2007, now Pat. No. 7,407,024, which is a continuation of application No. 11/127,012, filed on May 11, 2005, now Pat. No. 7,195,253, which is a continuation of application No. 11/104,228, filed on Apr. 12, 2005, now Pat. No. 7,083,012, which is a continuation of application No. 10/783,267, filed on Feb. 20, 2004, now Pat. No. 6,877,572, which is a continuation of application No. 10/336,576, filed on Jan. 3, 2003, now Pat. No. 7,014,000, which is a continuation-in-part of application No. 09/853,221, filed on May 11, 2001, now Pat. No. 6,749,034.

(60) Provisional application No. 60/203,214, filed on May 11, 2000, provisional application No. 60/345,058, filed on Jan. 4, 2002.

(51) Int. Cl.
*B62D 51/04* (2006.01)

(52) U.S. Cl. ..................... 180/19.3; 180/19.1; 180/19.2; 180/15; 180/16; 180/11; 180/12; 180/13; 180/199; 180/200; 180/203

(58) Field of Classification Search ........................ None
See application file for complete search history.

(56) References Cited

U.S. PATENT DOCUMENTS 813,213 A 2/1906 Johnson
(Continued)

FOREIGN PATENT DOCUMENTS

CA 2010543 9/1990
(Continued)

OTHER PUBLICATIONS

Stryker's Preliminary Invalidity Contentions for U.S. Patents Nos. 6,993,799 and 7,644,458, dated Feb. 24, 2012.

(Continued)

*Primary Examiner* — Lesley D Morris
*Assistant Examiner* — Marlon Arce
(74) *Attorney, Agent, or Firm* — Barnes & Thornburg LLP

(57) ABSTRACT

A patient support including a traction device for powered movement of the patient support.

19 Claims, 61 Drawing Sheets

U.S. PATENT DOCUMENTS

| | | | | |
|---|---|---|---|---|
| 1,110,838 | A | | 9/1914 | Taylor |
| 1,118,931 | A | | 12/1914 | Hasley |
| 1,598,124 | A | | 8/1926 | Evans |
| 1,639,801 | A | | 8/1927 | Heise |
| 1,778,698 | A | | 10/1930 | Walter |
| 2,224,087 | A | | 12/1940 | Reichert |
| 2,599,717 | A | | 6/1952 | Menzies |
| 2,635,899 | A | | 4/1953 | Osbon, Jr. |
| 2,973,823 | A | | 3/1961 | Stenz |
| 2,999,555 | A | | 9/1961 | Stroud et al. |
| 3,004,768 | A | | 10/1961 | Klages |
| 3,112,001 | A | | 11/1963 | Wise |
| 3,304,116 | A | | 2/1967 | Stryker |
| 3,305,876 | A | | 2/1967 | Hutt |
| 3,344,445 | A | | 10/1967 | Crawford |
| 3,349,862 | A | | 10/1967 | Shirey |
| 3,380,546 | A | | 4/1968 | Rabjohn |
| 3,393,004 | A | | 7/1968 | Williams |
| 3,404,746 | A | | 10/1968 | Slay |
| 3,452,371 | A | | 7/1969 | Hirsch |
| 3,464,841 | A | | 9/1969 | Pulskamp |
| 3,544,127 | A | | 12/1970 | Dobson |
| 3,618,966 | A | | 11/1971 | Vandervest |
| 3,680,880 | A | | 8/1972 | Blaauw |
| 3,770,070 | A | | 11/1973 | Smith |
| 3,802,524 | A | | 4/1974 | Seidel |
| 3,814,199 | A | | 6/1974 | Jones |
| 3,820,838 | A | | 6/1974 | Limpach |
| 3,841,142 | A | | 10/1974 | Aisuta |
| 3,869,011 | A | | 3/1975 | Jensen |
| 3,872,945 | A | | 3/1975 | Hickman et al. |
| 3,876,024 | A | | 4/1975 | Shieman et al. |
| 3,905,436 | A | | 9/1975 | Karchak |
| 3,907,051 | A | | 9/1975 | Weant |
| 3,929,354 | A | | 12/1975 | Elkins |
| 3,995,024 | A | | 11/1976 | Hawking et al. |
| 4,067,409 | A | | 1/1978 | DiMatteo |
| 4,137,984 | A | | 2/1979 | Jennings et al. |
| 4,164,355 | A | | 8/1979 | Eaton et al. |
| 4,167,221 | A | | 9/1979 | Edmonson et al. |
| 4,175,632 | A | | 11/1979 | Lassanske |
| 4,175,783 | A | | 11/1979 | Pioth |
| 4,186,456 | A | | 2/1980 | Huempfner |
| 4,221,273 | A | | 9/1980 | Finden |
| 4,274,503 | A | | 6/1981 | Mackintosh |
| 4,275,797 | A | | 6/1981 | Johnson |
| 4,295,555 | A | | 10/1981 | Kamm |
| 4,380,175 | A | | 4/1983 | Griffen |
| 4,415,049 | A | | 11/1983 | Wereb |
| 4,415,050 | A | | 11/1983 | Nishida et al. |
| 4,432,247 | A | | 2/1984 | Takeno |
| 4,439,879 | A | | 4/1984 | Werner |
| 4,444,284 | A | | 4/1984 | Montemurro |
| 4,475,611 | A | | 10/1984 | Fisher |
| 4,475,613 | A | | 10/1984 | Walker |
| 4,511,825 | A | | 4/1985 | Klimo |
| 4,513,832 | A | | 4/1985 | Engman |
| 4,566,707 | A | | 1/1986 | Nitzberg |
| 4,570,739 | A | | 2/1986 | Kramer |
| 4,584,989 | A | | 4/1986 | Stith |
| 4,614,246 | A | | 9/1986 | Masse et al. |
| 4,629,242 | A | | 12/1986 | Schrager |
| 4,646,860 | A | | 3/1987 | Owens et al. |
| 4,723,808 | A | | 2/1988 | Hines |
| 4,724,555 | A | | 2/1988 | Poehner et al. |
| 4,759,418 | A | | 7/1988 | Goldenfeld et al. |
| 4,771,840 | A | | 9/1988 | Keller |
| 4,807,716 | A | | 2/1989 | Hawkins |
| 4,811,988 | A | | 3/1989 | Immel |
| 4,848,504 | A | | 7/1989 | Olson |
| 4,874,055 | A | | 10/1989 | Beer |
| 4,895,040 | A | | 1/1990 | Soederberg |
| 4,906,906 | A | | 3/1990 | Lautzenhiser et al. |
| 4,915,184 | A | | 4/1990 | Watkins |
| 4,922,574 | A | | 5/1990 | Heiligenthal et al. |
| 4,938,493 | A | | 7/1990 | Okuda |
| 4,949,408 | A | | 8/1990 | Trkla |
| 4,978,899 | A | | 12/1990 | Lautzenhiser |
| 4,979,582 | A | | 12/1990 | Forster |
| 4,981,309 | A | | 1/1991 | Froeschle et al. |
| 5,021,917 | A | | 6/1991 | Pike |
| 5,060,327 | A | | 10/1991 | Celestina et al. |
| 5,060,959 | A | | 10/1991 | Davis et al. |
| 5,069,465 | A | | 12/1991 | Stryker et al. |
| 5,083,625 | A | | 1/1992 | Bleicher |
| 5,084,922 | A | | 2/1992 | Louit |
| 5,094,314 | A | | 3/1992 | Hayata |
| 5,117,521 | A | | 6/1992 | Foster et al. |
| 5,121,806 | A | | 6/1992 | Johnson |
| 5,156,226 | A | | 10/1992 | Boyer et al. |
| 5,181,762 | A | | 1/1993 | Beumer |
| 5,187,824 | A | | 2/1993 | Stryker |
| 5,193,663 | A | | 3/1993 | Kuroda |
| 5,201,819 | A | | 4/1993 | Shiraishi et al. |
| 5,222,567 | A | * | 6/1993 | Broadhead et al. ............. 180/15 |
| 5,232,065 | A | | 8/1993 | Cotton |
| 5,244,225 | A | | 9/1993 | Frycek |
| 5,251,429 | A | | 10/1993 | Minato et al. |
| 5,255,403 | A | | 10/1993 | Ortiz |
| 5,275,248 | A | | 1/1994 | Finch |
| 5,279,010 | A | | 1/1994 | Ferrand et al. |
| 5,284,218 | A | | 2/1994 | Rusher, Jr. |
| 5,293,950 | A | | 3/1994 | Marliac |
| 5,307,889 | A | | 5/1994 | Bohannan |
| 5,322,306 | A | | 6/1994 | Coleman |
| 5,337,845 | A | | 8/1994 | Foster et al. |
| 5,348,326 | A | | 9/1994 | Fullenkamp et al. |
| 5,358,265 | A | | 10/1994 | Yaple |
| 5,366,036 | A | | 11/1994 | Perry |
| 5,377,372 | A | | 1/1995 | Rudolf et al. |
| 5,381,572 | A | | 1/1995 | Park |
| 5,388,294 | A | | 2/1995 | Reeder |
| 5,406,778 | A | | 4/1995 | Lamb et al. |
| 5,439,069 | A | | 8/1995 | Beeler |
| 5,445,233 | A | | 8/1995 | Fernie et al. |
| 5,447,317 | A | | 9/1995 | Gehlsen et al. |
| 5,447,935 | A | | 9/1995 | Hubele et al. |
| 5,450,639 | A | | 9/1995 | Weismiller et al. |
| 5,477,935 | A | | 12/1995 | Chen |
| 5,495,904 | A | | 3/1996 | Zwaan et al. |
| 5,526,890 | A | | 6/1996 | Kadowaki |
| 5,531,030 | A | | 7/1996 | Dale, Jr. |
| 5,535,465 | A | | 7/1996 | Hannant |
| 5,540,297 | A | | 7/1996 | Meier |
| 5,542,690 | A | | 8/1996 | Kozicki |
| 5,562,091 | A | | 10/1996 | Foster et al. |
| 5,570,483 | A | | 11/1996 | Williamson |
| 5,580,207 | A | | 12/1996 | Kiebooms et al. |
| 5,613,252 | A | | 3/1997 | Yu et al. |
| 5,648,708 | A | | 7/1997 | Littlejohn |
| 5,669,086 | A | | 9/1997 | Garman |
| 5,687,437 | A | | 11/1997 | Goldsmith |
| 5,687,438 | A | | 11/1997 | Biggie |
| 5,690,185 | A | | 11/1997 | Sengel |
| 5,697,623 | A | | 12/1997 | Bermes et al. |
| 5,726,541 | A | | 3/1998 | Glenn |
| 5,730,243 | A | | 3/1998 | Koike |
| 5,732,786 | A | | 3/1998 | Fujigaki |
| 5,737,782 | A | | 4/1998 | Matsuura et al. |
| 5,746,282 | A | | 5/1998 | Fujiwara et al. |
| 5,749,424 | A | | 5/1998 | Reimers |
| 5,771,988 | A | | 6/1998 | Kikutani |
| 5,775,456 | A | | 7/1998 | Reppas |
| 5,778,996 | A | | 7/1998 | Prior et al. |
| 5,806,111 | A | | 9/1998 | Heimbrock et al. |
| 5,809,755 | A | | 9/1998 | Velke et al. |
| 5,810,104 | A | | 9/1998 | Campbell |
| 5,826,670 | A | | 10/1998 | Nan |
| 5,839,528 | A | | 11/1998 | Lee |
| 5,854,622 | A | | 12/1998 | Brannon |
| 5,862,549 | A | | 1/1999 | Morton et al. |
| 5,865,426 | A | | 2/1999 | Kazerooni |
| 5,906,017 | A | | 5/1999 | Ferrand et al. |
| 5,915,487 | A | | 6/1999 | Splittstoesser et al. |
| 5,921,338 | A | | 7/1999 | Edmondson |
| 5,927,414 | A | | 7/1999 | Kan et al. |
| 5,934,694 | A | | 8/1999 | Schugt et al. |

| | | | | |
|---|---|---|---|---|
| 5,937,959 | A | 8/1999 | Fujii et al. | |
| 5,937,961 | A | 8/1999 | Davidson | |
| 5,944,131 | A | 8/1999 | Schaffner et al. | |
| 5,959,538 | A | 9/1999 | Schousek | |
| 5,961,561 | A | 10/1999 | Wakefield | |
| 5,964,313 | A | 10/1999 | Guy | |
| 5,964,473 | A | 10/1999 | Degonda et al. | |
| 5,971,091 | A | 10/1999 | Kamen et al. | |
| 5,983,425 | A | 11/1999 | DiMucci et al. | |
| 5,987,671 | A | 11/1999 | Heimbrock et al. | |
| 5,988,304 | A | 11/1999 | Behrendts | |
| 5,996,149 | A | 12/1999 | Heimbrock et al. | |
| 6,000,486 | A | 12/1999 | Romick et al. | |
| 6,016,580 | A | 1/2000 | Heimbrock et al. | |
| 6,035,561 | A | 3/2000 | Paytas et al. | |
| 6,045,262 | A | 4/2000 | Igeta et al. | |
| 6,050,356 | A | 4/2000 | Takeda et al. | |
| 6,059,060 | A | 5/2000 | Kanno et al. | |
| 6,059,301 | A | 5/2000 | Skarnulis | |
| 6,062,328 | A | 5/2000 | Campbell et al. | |
| 6,065,555 | A | 5/2000 | Yuki et al. | |
| 6,070,679 | A | 6/2000 | Berg et al. | |
| 6,073,285 | A | 6/2000 | Ambach et al. | |
| 6,076,208 | A | 6/2000 | Heimbrock et al. | |
| 6,076,209 | A | 6/2000 | Paul | |
| 6,098,732 | A | 8/2000 | Romick et al. | |
| 6,105,348 | A | 8/2000 | Turk et al. | |
| 6,109,379 | A | 8/2000 | Madwed | |
| 6,125,957 | A | 10/2000 | Kauffmann | |
| 6,131,690 | A | 10/2000 | Galando et al. | |
| 6,148,942 | A | 11/2000 | Mackert, Sr. | |
| 6,154,690 | A | 11/2000 | Coleman | |
| 6,173,799 | B1 | 1/2001 | Miyazaki et al. | |
| 6,178,565 | B1 | 1/2001 | Franco | |
| 6,178,575 | B1 | 1/2001 | Harada | |
| 6,179,074 | B1 | 1/2001 | Scharf | |
| 6,205,601 | B1 | 3/2001 | Nessmann et al. | |
| 6,209,670 | B1 | 4/2001 | Fernie et al. | |
| 6,227,320 | B1 | 5/2001 | Eggert et al. | |
| 6,240,579 | B1 | 6/2001 | Hanson et al. | |
| 6,256,812 | B1 * | 7/2001 | Bartow et al. | 5/86.1 |
| 6,286,165 | B1 * | 9/2001 | Heimbrock et al. | 5/600 |
| 6,296,261 | B1 | 10/2001 | deGoma | |
| 6,321,878 | B1 | 11/2001 | Mobley et al. | |
| 6,330,926 | B1 * | 12/2001 | Heimbrock et al. | 180/65.51 |
| 6,343,665 | B1 | 2/2002 | Eberlein et al. | |
| 6,390,213 | B1 * | 5/2002 | Bleicher | 180/65.1 |
| 6,505,359 | B2 | 1/2003 | Heimbrock et al. | |
| 6,668,402 | B2 | 12/2003 | Heimbrock | |
| 6,668,965 | B2 | 12/2003 | Strong | |
| 6,725,956 | B1 | 4/2004 | Lemire | |
| 6,749,034 | B2 | 6/2004 | Vogel et al. | |
| 6,752,224 | B2 | 6/2004 | Hopper et al. | |
| 6,772,850 | B1 | 8/2004 | Waters et al. | |
| 6,772,860 | B1 | 8/2004 | Nelson | |
| 6,877,572 | B2 | 4/2005 | Vogel et al. | |
| 6,945,697 | B2 | 9/2005 | Schuster | |
| 7,011,172 | B2 | 3/2006 | Heimbrock et al. | |
| 7,014,000 | B2 | 3/2006 | Kummer et al. | |
| 7,021,407 | B2 | 4/2006 | Ruschke et al. | |
| 7,083,012 | B2 | 8/2006 | Vogel et al. | |
| 7,090,041 | B2 | 8/2006 | Vogel et al. | |
| 7,191,854 | B2 * | 3/2007 | Lenkman | 180/65.1 |
| 7,195,253 | B2 | 3/2007 | Vogel et al. | |
| 7,273,115 | B2 | 9/2007 | Kummer et al. | |
| 7,284,626 | B2 | 10/2007 | Heimbrock et al. | |
| 7,407,024 | B2 | 8/2008 | Vogel et al. | |
| 7,481,286 | B2 | 1/2009 | Ruschke et al. | |
| 2002/0138905 | A1 | 10/2002 | Bartlett et al. | |
| 2002/0152555 | A1 | 10/2002 | Gallant et al. | |
| 2003/0159861 | A1 | 8/2003 | Hopper et al. | |
| 2004/0133982 | A1 | 7/2004 | Horitani et al. | |
| 2004/0159473 | A1 | 8/2004 | Vogel et al. | |
| 2005/0199430 | A1 | 9/2005 | Vogel et al. | |
| 2005/0236193 | A1 | 10/2005 | Vogel et al. | |
| 2008/0283329 | A1 | 11/2008 | Vogel et al. | |

FOREIGN PATENT DOCUMENTS

| | | | |
|---|---|---|---|
| DE | 1 041 210 | | 10/1958 |
| DE | 199 21 503 | A1 | 10/1988 |
| DE | 94 20 429.2 | | 12/1994 |
| DE | 295 18 502 | U1 | 4/1995 |
| EP | 093 700 | A2 | 11/1983 |
| EP | 0 173 393 | | 3/1986 |
| EP | 0 204 637 | A1 | 12/1986 |
| EP | 0 338 689 | | 10/1989 |
| EP | 0 420 263 | A1 | 4/1991 |
| EP | 0 630 637 | A1 | 12/1994 |
| EP | 0 707 842 | | 4/1996 |
| EP | 2 735 019 | | 12/1996 |
| EP | 0 776 637 | A1 | 6/1997 |
| EP | 0 776 648 | A1 | 6/1997 |
| FR | 2 714 008 | | 6/1995 |
| FR | 2 746 060 | | 9/1997 |
| GB | 415450 | | 8/1934 |
| GB | 672557 | | 5/1952 |
| GB | 1 601 930 | | 11/1981 |
| GB | 2 285 393 | A | 7/1995 |
| JP | 46-31490 | | 9/1971 |
| JP | 47-814 | | 8/1972 |
| JP | 47-17495 | | 10/1972 |
| JP | 48-44792 | | 6/1973 |
| JP | 48-44793 | | 6/1973 |
| JP | 48-54494 | | 7/1973 |
| JP | 48-54495 | | 7/1973 |
| JP | 49-29855 | | 3/1974 |
| JP | 51-20491 | | 2/1976 |
| JP | 53-9091 | | 7/1976 |
| JP | 53096397 | A | 8/1978 |
| JP | 56-73822 | | 6/1981 |
| JP | 56068523 | A | 6/1981 |
| JP | 56068524 | A | 6/1981 |
| JP | 57157325 | A | 9/1982 |
| JP | 57-187521 | | 11/1982 |
| JP | 58063575 | A | 4/1983 |
| JP | 59-37946 | | 3/1984 |
| JP | 59038176 | A | 3/1984 |
| JP | 59-183756 | | 10/1984 |
| JP | 59-186554 | | 10/1984 |
| JP | 60-12058 | | 1/1985 |
| JP | 60-12059 | | 1/1985 |
| JP | 60-3151 | | 2/1985 |
| JP | 60-21751 | | 2/1985 |
| JP | 60-31749 | | 2/1985 |
| JP | 60-31750 | | 2/1985 |
| JP | 60-122561 | | 7/1985 |
| JP | 60-188152 | | 9/1985 |
| JP | 60-188153 | | 9/1985 |
| JP | 61188727 | A | 8/1986 |
| JP | 62-60433 | | 4/1987 |
| JP | 64-17231 | | 1/1989 |
| JP | 2-84961 | | 3/1990 |
| JP | 3-31063 | | 2/1991 |
| JP | 4-108525 | | 9/1992 |
| JP | 6-50631 | | 7/1994 |
| JP | 6-237959 | | 8/1994 |
| JP | 6-30404 | | 11/1994 |
| JP | 7-136215 | | 5/1995 |
| JP | 8-112244 | | 5/1995 |
| JP | 7-328074 | | 12/1995 |
| JP | 8-317953 | | 12/1996 |
| JP | 9-24071 | | 1/1997 |
| JP | 9-31855 | | 2/1997 |
| JP | 9-38154 | | 2/1997 |
| JP | 10146364 | A | 6/1998 |
| JP | 2000-107230 | A | 4/2000 |
| JP | 2000-175974 | | 6/2000 |
| WO | WO 82/01313 | | 4/1982 |
| WO | WO 87/07830 | | 12/1987 |
| WO | WO 94/16935 | | 8/1994 |
| WO | WO 94/21505 | | 9/1994 |
| WO | WO 95/20514 | | 8/1995 |
| WO | WO 96/07555 | | 3/1996 |
| WO | WO 96/33900 | | 10/1996 |
| WO | WO 97/39715 | | 10/1997 |
| WO | WO 00/37222 | | 6/2000 |

| | | |
|---|---|---|
| WO | WO 00/51830 | 9/2000 |
| WO | WO 01/19313 A1 | 3/2001 |
| WO | WO 01/85084 A1 | 11/2001 |

OTHER PUBLICATIONS

Stryker's Preliminary Invalidity Contentions for U.S. Patents Nos. 6,588,523, 6,902,019, 7,011,172 and 7,284,626, dated Feb. 24, 2012.
Stryker's Preliminary Invalidity Contentions for U.S. Patents Nos. 7,090,041, 7,273,115, 7,407,024 and 7,8928,092, dated Feb. 24, 2012.
Sanders, Da, et al. "Computer Systems and Strategies to Assist a Disabled Person in Navigating a Powered Wheelchair Through a Doorway," The Institution of Electrical Engineers, 1997, 4 pages.
Sokira, Thomas J. et al. "Brushless DC Motors Electronics Commutation and Controls," Tab Brooks, Inc., 1990, 8 pages.
Smith, Robert E., "Digital Controls for an Omnidirectional Wheelchair,", American Control Conference, 1983, 4 pages.
Levine, Simon P. et al., "The NavChair Assistive Wheelchair Navigation System,", IEEE Transactions on Rehabilitation Engineering, vol. 7, No. 4, Dec. 1999.
Roy, et al. "Techincal Note: Five-wheel unicycle system" Journal of the International Federation for Medical & Biological Engineering, vol. 23, No. 6, Nov. 1985.
Kassler, Michael, Robotics for health care: a review of the literature:, Robotics (1993) vol. 11, pp. 495-516.
Finlay, Patrick A., "PAM: A Robotic Solution to Patient Handling", Industrial Robot, International Quarterly, vol. 19, No. 3, 1992, pp. 13-15.
Finlay, Patrick A. Advanced Medical Robotics in the UK:, Principal Engineer and Divisional Manager, Pulver Systems Ltd. pp. 1-4.
Gray, Professor J. O., "The National Advanced Robotics Research Center, Core Technical Programme" IEE Colloquium on Advanced Robotic Initiatives in the UK, pp. 1-8.
Hagan, Karen et al., "The Design of a Wheelchair Mounted Robot," The Institution of Electrical Engineers, pp. 1-6.
Hashino, Satoshi, "Aiding robots," Advanced Robotics, vol. 7, No. 1. pp. 97-103 (1993).
Beaty, H. Wayne et al., "Electric Motor Handbook,"McGraw-Hill Handbooks, 1998.
Cameron, Stephen, "Advanced Robotics at Oxford University," IEE Colloquium on Advanced Robotic Initiatives in the UK, 1991, pp. 1-3.
Cooper, Rory A., "Intelligent Control of Power Wheelchairs,", IEEE Engineering in Medicine and Biology, Jul./Aug. 1995 pp. 423-431.
Finlay, P.A., "Feasibility Study Report—Applications for Advanced Robotics in Medicine and HealthCare," Fulmer Research Limited, Slough UK, Report No. R1175/2, Jan. 1988.
Nagel et al., "Proceedings of the Annual International Conference of the IEEE Engineering in Medicine and Biology Society," vol. 13, 1991.
Stryker Medical 2040 Zoom Critical Care Bed, Operations Manual, Sep. 1999.
Stryker Medical Zoom Critical Care Bed, Model 2040, Maintenance Manual, Rev. A, Oct. 1999.
Stryker Medical Zoom Patient Transport Frame, Model 2040, Operations Manual.
Stryker Medical Zoom Patient Transport Frame, Model 2040, Maintenance Manual, Rev. D, Jul. 2000.
Stryker Medical Renaissance Series, 1060 OB/GYN Trauma Bed, Maintenance Manual, Mar. 1992.
Stryker Medical Renaissance Series, 1060 OB/GYN Trauma Bed, Operations Manual, Mar. 1992.
Findlay, Patrick A., "Medical Robots in Intensive Care," Intensive Care World, Mar. 7, 1990.
Findlay, Patrick A., "Robotic Systems for Health and Retirement Care," Proc Ann Conf International Federation Robotics, 1994.
"Dart Controls, Inc, Instructional Manual, HBP Control Series,"LTHBP (IM-HBP-0198).
"From Muscle Power to Motor Power," Midlands News, Omaha World Herald, Business 43, Sunday, Jan. 6, 1996, p. 43.
2030 Epic Critical Care Bed Operations Manual, Jul. 1998.
Curtis PMC 1208 Transistorized Motor Controllers Installation/Operation Manual, Rev. 1.
Stryker Medical, 2040 Zoom™ Critical Care Bed Maintenance Manual, date unknown.
Motorvator 3 Product Features Webpage, May 10, 2000.
Stryker Corporation Zoom™ drive brochure, Mar. 2000.
Midmark 530 Stretcher Information, Midmark Catalog, p. 14.
EP 10 07 5514, European Search Report, dated Nov. 29, 2010, 5 pages.
Complaint and Demand for Jury Trail, Apr. 4, 2011, *Hill-Rom Services, Inc. et al.* v. *Stryker Corporation et al.*, U. S. District Court for the Southern District of Indiana, Indianapolis Division, Case No. 1:11-CV-0458-JMS-DKL.
Defendant Stryker's Answer, Affirmative Defenses and Counterclaims to Plaintiff Hill-Rom's Compliant, Jun. 6, 2011, *Hill-Rom Services, Inc. et al.* v. *Stryker Corporation et al.*, U. S. District Court for the Southern District of Indiana, Indianapolis Division, Case No. 1:11-CV-0458-JMS-DKL.
Defendant Stryker's Responses to Hill-Rom's First Set of Interrogatories, *Hill-Rom Services, Inc. et al.* v. *Stryker Corporation et al.*, U. S. District Court for the Southern District of Indiana, Indianapolis Division, Case No. 1:11-CV-0458-JMS-DKL.
Defendant Styrker's Preliminary Interference-in-Fact and Priority Contentions, Dec. 12, 2011, *Hill-Rom Services, Inc. et al.*, v. *Stryker Corporation et al.*, U.S. District Court for the Southern District of Indiana, Indianapolis Division, Case No. 1:11-CV-0458-JMS-DKL.

* cited by examiner

MOTORIZED TRACTION DEVICE FOR A PATIENT SUPPORT

CROSS-REFERENCE TO RELATED APPLICATIONS

This application is continuation of U.S. patent application Ser. No. 12/914,625, filed Oct. 28, 2010, now U.S. Pat. No. 8,051,931, which is a continuation of U.S. patent application Ser. No. 12/185,310, filed Aug. 4, 2008, now U.S. Pat. No. 7,828,092, which is a continuation of U.S. patent application Ser. No. 11/685,964, filed Mar. 14, 2007, now U.S. Pat. No. 7,407,024, which is a continuation of U.S. patent application Ser. No. 11/127,012, filed May 11, 2005, now U.S. Pat. No. 7,195,253, which is a continuation of U.S. patent application Ser. No. 11/104,228, filed Apr. 12, 2005, now U.S. Pat. No. 7,083,012, which is a continuation of U.S. patent application Ser. No. 10/783,267, filed Feb. 20, 2004, now U.S. Pat. No. 6,877,572, which is a continuation of U.S. patent application Ser. No. 10/336,576, filed Jan. 3, 2003, now U.S. Pat. No. 7,014,000, which is a continuation-in-part of U.S. patent application Ser. No. 09/853,221, filed May 11, 2001, now U.S. Pat. No. 6,749,034, which claims the benefit of U.S. Provisional Application Ser. No. 60/203,214, filed May 11, 2000, and further claims the benefit of U.S. Provisional Application Ser. No. 60/345,058, filed Jan. 4, 2002, the disclosures of all of which are expressly incorporated by reference herein. The disclosure of U.S. patent application Ser. No. 09/853,802, filed May 11, 2001, now U.S. Pat. No. 7,021,407, is expressly incorporated by reference herein.

BACKGROUND OF THE INVENTION

This invention relates to patient supports, such as beds. More particularly, the present invention relates to devices for moving a patient support to assist caregivers in moving the patient support from one location in a care facility to another location in the care facility.

Additional features of the disclosure will become apparent to those skilled in the art upon consideration of the following detailed description when taken in conjunction with the accompanying drawings.

SUMMARY OF THE INVENTION

The present invention provides a patient support including a propulsion system for providing enhanced mobility. The patient support includes a bedframe supporting a mattress defining a patient rest surface. A plurality of swivel-mounted casters, including rotatably supported wheels, provide mobility to the bedframe. The casters are capable of operating in several modes, including: brake, neutral, and steer. The propulsion system includes a propulsion device operably connected to an input system. The input system controls the speed and direction of the propulsion device such that a caregiver can direct the patient support to a proper position within a care facility.

The propulsion device includes a traction device that is movable between a first, or storage, position spaced apart from the floor and a second, or use, position in contact with the floor so that the traction device may move the patient support. Movement of the traction device between its storage and use positions is controlled by a traction engagement controller.

The traction device includes a rolling support positioned to provide mobility to the bedframe and a rolling support lifter configured to move the rolling support between the storage position and the use position. The rolling support lifter includes a rolling support mount, an actuator, and a biasing device, illustratively a spring. The rolling support includes a rotatable member supported for rotation by the rolling support mount. A motor is operably connected to the rotatable member.

The actuator is configured to move between first and second actuator positions and thereby move the rolling support between first and second rolling support positions. The actuator is further configured to move to a third actuator position while the rolling support remains substantially in the second position. The spring is coupled to the rolling support mount and is configured to bias the rolling support toward the second position when the spring is in an active mode. The active mode occurs during movement of the actuator between the second and third actuator positions.

The input system includes a user interface comprising a first handle member coupled to a first user input device and a second handle member coupled to a second user input device. The first and second handle members are configured to transmit first and second input forces to the first and second user input devices, respectively. A third user input, or enabling, device is configured to receive an enable/disable command from a user and in response thereto provide an enable/disable signal to a motor drive. A speed controller is coupled to the first and second user input devices to receive the first and second force signals therefrom. The speed controller is configured to receive the first and second force signals and to provide a speed control signal based on the combination of the first and second force signals. The speed controller instructs the motor drive to operate the motor at a suitable horsepower based upon the input from the first and second user input devices. However, the motor drive will not drive the motor absent an enable signal being received from the third user input device.

A caster mode detector and an external power detector are in communication with the traction engagement controller and provide respective caster mode and external power signals thereto. The caster mode detector provides a caster mode signal to the traction engagement controller indicative of the casters mode of operation. The external power detector provides an external power signal to the traction engagement controller indicative of connection of external power to the propulsion device. When the caster mode detector indicates that the casters are in a steer mode, and the external power detector indicates that external power has been disconnected from the propulsion device, then the traction engagement controller causes automatic deployment or lowering of the traction device from the storage position to the use position. Likewise, should the caster mode detector or the external power detector provide a signal to the traction engagement controller indicating either that the casters are no longer in the steer mode or that external power has been reconnected to the propulsion device, then the traction engagement controller will automatically raise or stow the traction device from the use position to the storage position.

In a further illustrative embodiment, an automatic braking system is provided to selectively brake the patient support based upon the power available to drive the traction device. More particularly, a power source is configured to provide power to the motor wherein the braking system includes a controller coupled intermediate the power source and the motor. The braking system causes the motor to operate as an electronic brake when the power detected by the controller is below a predetermined value. In one illustrative embodiment, the controller comprises a braking relay configured to selectively short a pair of power leads in electrical communication with the motor. An override switch is illustratively provided intermediate the controller and the motor, and is configured to disengage the braking system by opening the short between the power leads to the motor.

In another aspect of the present invention, there is provided a transport apparatus including a movable support frame, a plurality of casters to support the support frame, a wheel, and a motor operably connected to the wheel and configured to drive the wheel. An external power detector is configured to determine if external power is supplied to the transport apparatus and to provide a power indication signal in response thereto. An enable input device is operable to receive an enable command from a user and to provide an enable signal in response to the enable command. A controller is coupled to the external power detector to receive the power indication signal therefrom, with the controller being configured to drive the motor when the power indication signal indicates external power is not supplied.

There is also provided a patient support including a support frame having a plurality of wheels to move the support frame along a floor, an external power input, coupled to the patient support, to provide an external power to the patient support, and a traction device, coupled to the support frame, the traction device including a storage position spaced from the floor and a use position to contact the floor. An external power detector is coupled to the external power input and is configured to generate an external power signal if the external power is supplied to the external power input. A controller is coupled to the external power detector, to receive the external power signal. The controller is configured to enable movement of the traction device to the use position, upon receipt of the external power signal.

Additional features and advantages of the present invention will become apparent to those skilled in the art upon consideration of the following detailed description of the presently perceived best mode of carrying out the invention.

BRIEF DESCRIPTION OF THE DRAWINGS

The detailed description particularly refers to the accompanying figures in which.

DETAILED DESCRIPTION OF THE DRAWINGS

Figure 1:
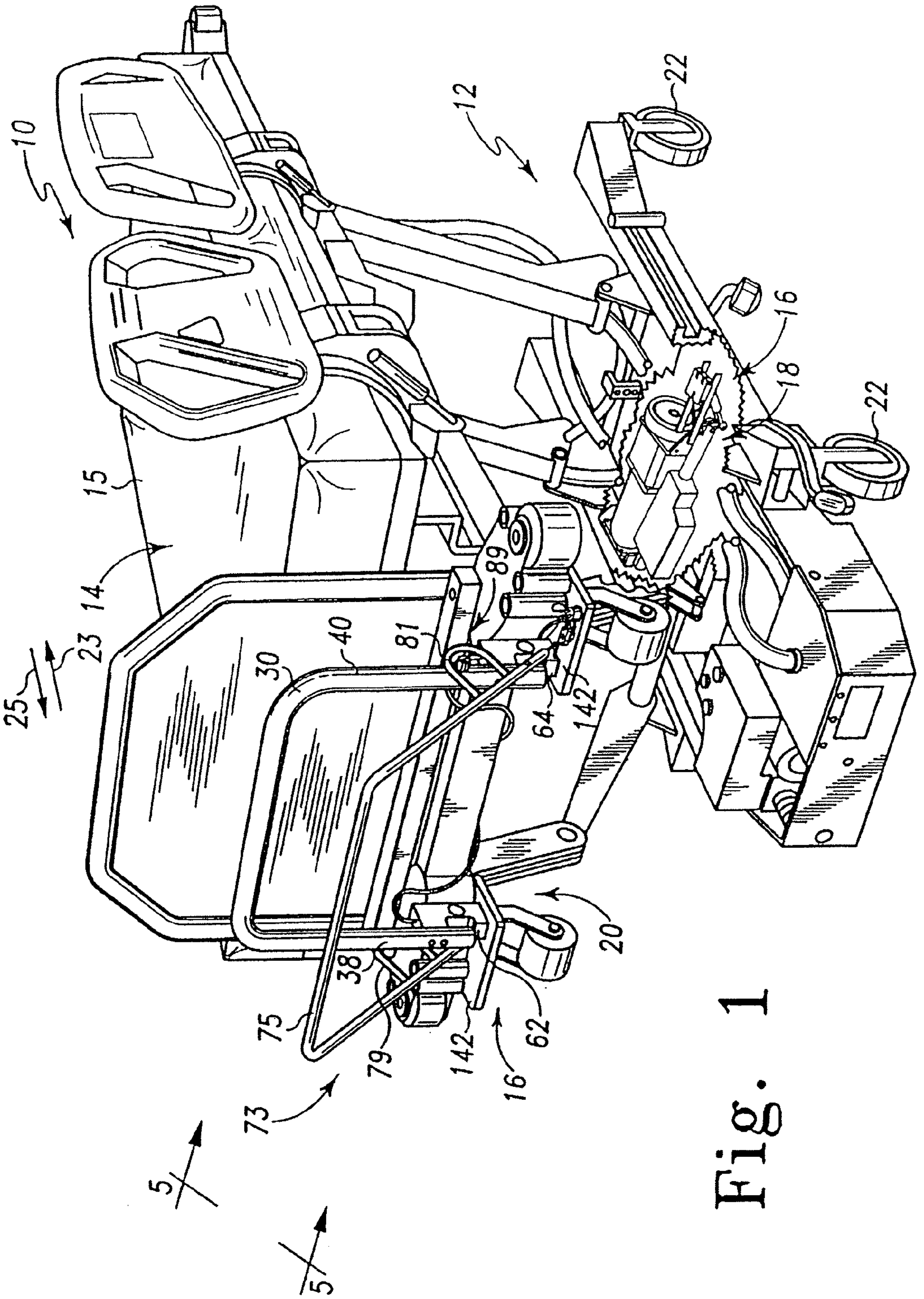
FIG. 1 is a perspective view of a hospital bed of the present invention, with portions broken away, showing the bed including a bedframe, an illustrative propulsion device coupled to the bottom of the bedframe, and a U-shaped handle coupled to the bedframe through a pair of load cells for controlling the propulsion device.

A patient support or bed 10 in accordance with an illustrative embodiment of the present disclosure is shown in FIG. 1. Patient support 10 includes a bedframe 12 extending between opposing ends 9 and 11, a mattress 14 positioned on bedframe 12 to define a patient rest surface 15, and an illustrative propulsion system 16 coupled to bedframe 12. Propulsion system 16 is provided to assist a caregiver in moving bed 10 between various rooms in a care facility. According to the illustrative embodiment, propulsion system 16 includes a propulsion device 18 and an input system 20 coupled to propulsion device 18. Input system 20 is provided to control the speed and direction of propulsion device 18 so that a caregiver can direct patient support 10 to the proper position in the care facility.

Patient support 10 includes a plurality of casters 22 that are normally in contact with floor 24. A caregiver may move patient support 10 by pushing on bedframe 12 so that casters 22 move along floor 24. The casters 22 may be of the type disclosed in U.S. Pat. No. 6,321,878 to Mobley et al., and in PCT Published Application No. WO 00/51830 to Mobley et al., both of which are assigned to the assignee of the present invention, and the disclosures of which are expressly incorporated by reference herein. When it is desirable to move patient support 10 a substantial distance, propulsion device 18 is activated by input system 20 to power patient support 10 so that the caregiver does not need to provide all the force and energy necessary to move patient support 10 between locations in a care facility.

Figure 2:
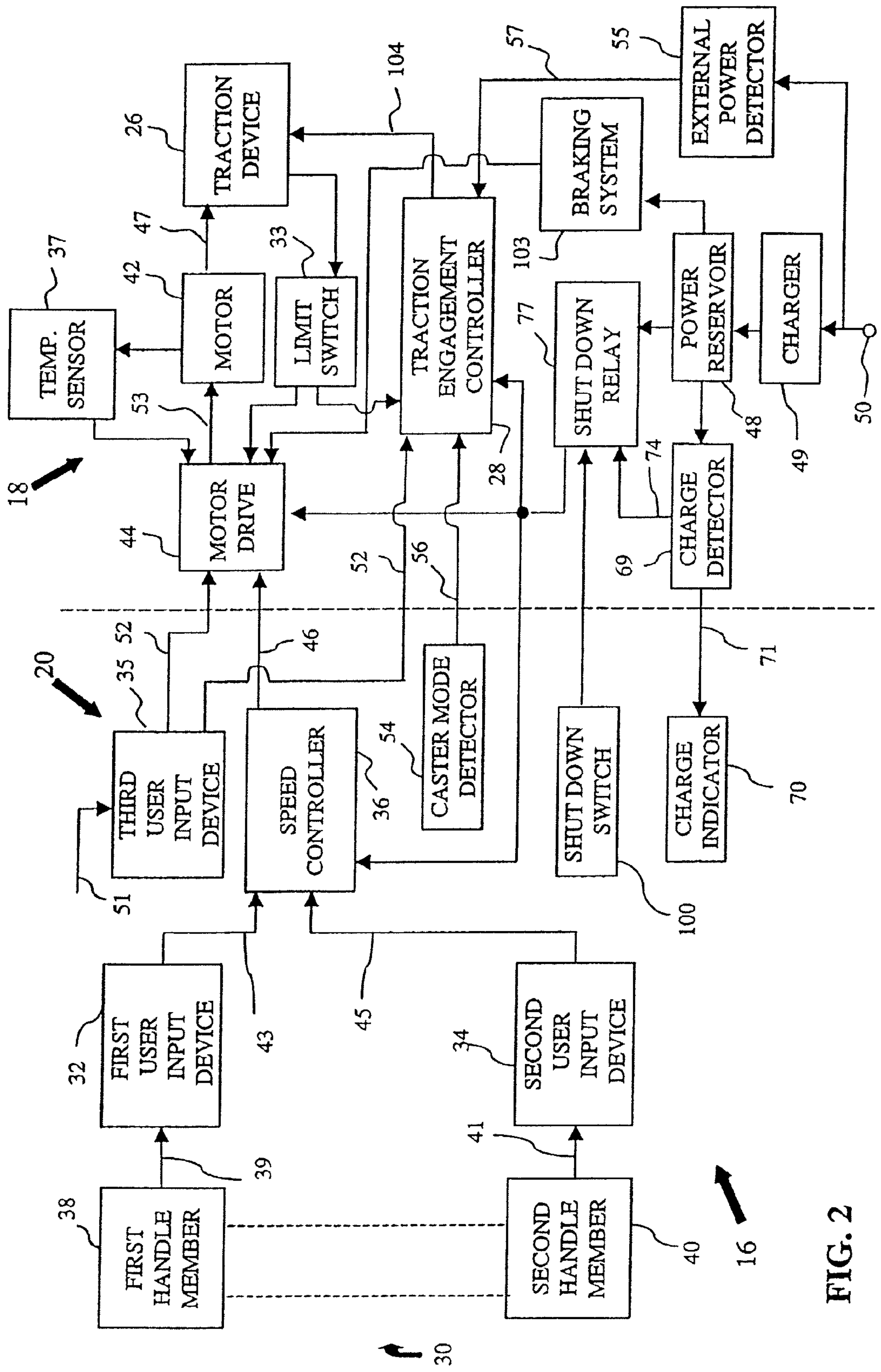
FIG. 2 is a schematic block diagram of a propulsion device, shown on the right, and a control system, shown on the left, for the propulsion device.

As shown schematically in FIG. 2, a suitable propulsion system 16 includes a propulsion device 18 and an input system 20. Propulsion device 18 includes a traction device 26 that is normally in a storage position spaced apart from floor 24. Propulsion device 18 further includes a traction engagement controller 28. Traction engagement controller 28 is configured to move traction device 26 from the storage position spaced apart from the floor 24 to a use position in contact with floor 24 so that traction device 26 can move patient support 10.

According to alternative embodiments, the various components of the propulsion system are implemented in any number of suitable configurations, such as hydraulics, pneumatics, optics, or electrical/electronics technology, or any combination thereof such as hydro-mechanical, electro-mechanical, or opto-electric embodiments. In the preferred embodiment, propulsion system 16 includes mechanical, electrical and electro-mechanical components as discussed below.

Input system 20 includes a user interface or handle 30, a first user input device 32, a second user input device 34, a third user input device 35, and a speed controller 36. Handle 30 has a first handle member 38 that is coupled to first user input device 32 and second handle member 40 that is coupled to second user input device 34. Handle 30 is configured in any suitable manner to transmit a first input force 39 from first handle member 38 to first user input device 32 and to transmit a second input force 41 from second handle member 40 to second user input device 34. Further details regarding the mechanics of a first embodiment of handle 30 are discussed below in connection with FIGS. 1, 5, 6A and 6B. Details of additional embodiments of handle 30 are discussed below in connection with FIGS. 36-40, 58 and 60-63.

Generally, first and second user input devices 32, 34 are configured in any suitable manner to receive the first and second input forces 39 and 41, respectively, from first and second handle members 38 and 40, respectively, and to provide a first force signal 43 based on the first input force 39 and a second force signal 45 based on the second input force 41.

As shown in FIG. 2, speed controller 36 is coupled to first user input device 32 to receive the first force signal 43 therefrom and is coupled to second user input device 34 to receive the second force signal 45 therefrom. In general, speed controller 36 is configured in any suitable manner to receive the first and second force signals 43 and 45, and to provide a speed control signal 46 based on the combination of the first and second force signals 43 and 45. Further details regarding illustrative embodiments of speed controller 36 are discussed below in connection with FIGS. 4A and 4B.

As previously mentioned, propulsion system 16 includes propulsion device 18 having traction device 26 configured to contact floor 24 to move bedframe 12 from one location to another. Propulsion device 18 further includes a motor 42 coupled to traction device 26 to provide power to traction device 26. Propulsion device 18 also includes a motor drive 44, a power reservoir 48, a charger 49, and an external power input 50. Motor drive 44 is coupled to speed controller 36 of input system 20 to receive speed control signal 46 therefrom.

Third user input, or enabling, device 35 is also coupled to motor drive 44 as shown in FIG. 2. In general, third user input device 35 is configured to receive an enable/disable command 51 from a user and to provide an enable/disable signal 52 to motor drive 44. When the traction device 26 is in its use position and a user provides an enable command 51*a* to third user input device 35, motor drive 44 reacts by responding to any speed control signal 46 received from the speed controller 36. Similarly, when a user fails to provide an enable command 51*a*, or provides a disable command 51*b*, to third user input 35, motor drive 44 reacts by not responding to any speed control signal 46 received from the speed controller 36.

In the illustrative embodiment of FIG. 2, limit switches 33 detect whether the traction device 26 is in its storage or use positions and provide signals indicative thereof to the traction engagement controller 28 and the motor drive 44. After the motor drive 44 receives a signal indicating that the traction device 26 is in its use position, it permits operation of the motor 42 in response to a speed control signal 46 provided that an enable/disable signal 52 has been received from the third user input device 35 as described above. After the motor drive 44 receives a signal indicating that the traction device 26 is in its storage position, it inhibits operation of the motor 42 in response to a speed control signal 46.

In alternative embodiments, third user input device 35 may be configured to receive an enable/disable command 51 from a user and to provide an enable/disable signal 52 to traction engagement controller 28. In one illustrative embodiment, when a user provides an enable command 51*a* to third user input device 35, the traction engagement controller 28 responds by placing traction device 26 in its use position in contact with floor 24. Similarly, when a user fails to provide an enable command 51*a*, or provides a disable command 51*b*, to third user input 35, traction engagement controller 28 responds by placing traction device 26 in its storage position raised above floor 24.

In a further illustrative embodiment, when a user provides an enable command 51*a* to third user input device 35, the traction engagement controller 28 responds by preventing the lowering of traction device 26 from its storage position raised above floor 24. Similarly, when a user fails to provide an enable command 51*a*, or provides a disable command 51*b*, to third user input 35, traction engagement controller 28 responds by permitting the lowering of traction device 26 to its use position in contact with floor 24, provided that other required inputs are supplied to traction engagement controller 28 as identified herein. As may be appreciated, in this embodiment of the invention, the enable signal 52*a* from third user input device 35 allows for operation of motor drive 44 and motor 42, while preventing the lowering of traction device 26 from its storage position to its use position. As noted above, however, the limit switches 33 will detect the storage position of the traction device 26 and prevent operation of the motor 42 in response thereto. As such, should a switch failure occur causing a constant enable signal 52*a* to be produced by third user input device 35, then the traction device 26 will not lower, and the motor 42 will not propel the patient support 10. A fault condition of the third user input device 35 is therefore identified by the traction device 26 not lowering to its use position in response to unintentional receipt of enable signal 52*a* by traction engagement controller 28.

Illustratively, a temperature sensor 37 may be coupled to the motor drive 44 and the motor 42 as shown in FIG. 2. The temperature sensor 37 is in thermal communication with the motor 42 for detecting a temperature thereof. If the detected temperature exceeds a predetermined value, then the motor drive 44 responds by slowing the motor 42 to a stop. Once the detected temperature falls below the predetermined value, the motor drive 44 operates in a normal manner as detailed herein.

Generally, motor drive 44 is configured in any suitable manner to receive the speed control signal 46 and to provide drive power 53 based on the speed control signal 46. The drive power 53 is a power suitable to cause motor 42 to operate at a suitable horsepower 47 ("motor horsepower"). In an illustrative embodiment, motor drive 44 is a commercially available Curtis PMC Model No. 1208, which responds to a voltage input range from roughly 0.3 VDC (for full reverse motor drive) to roughly 4.7 VDC (for full forward motor drive) with roughly a 2.3-2.7 VDC input null reference/deadband (corresponding to zero motor speed).

Motor 42 is coupled to motor drive 44 to receive the drive power 53 therefrom. Motor 42 is suitably configured to receive the drive power 53 and to provide the motor horsepower 47 in response thereto. In an illustrative embodiment, the motor 42 is a commercially available Teco Team-1, 24 VDC, 350 Watt, permanent magnet motor.

Traction engagement controller 28 is configured to provide actuation force to move traction device 26 into contact with floor 24 or away from floor 24 into its storage position. Additionally, traction engagement controller 28 is coupled to power reservoir 48 to receive a suitable operating power therefrom. Traction engagement controller 28 is also coupled to a caster mode detector 54 and to an external power detector 55 for receiving caster mode and external power signals 56 and 57, respectively. In general, traction engagement controller 28 is configured to automatically cause traction device 26 to lower into its use position in contact with floor 24 upon receipt of both signals 56 and 57 indicating that the casters 22 are in a steer mode of operation and that no external power 50 is applied to the propulsion system 16. Likewise, traction engagement controller 28 is configured to raise traction device 26 away from contact with floor 24 and into its storage position when the externally generated power is being received through the external power input 50, or when casters 22 are not in a steer mode of operation.

As detailed above, in a further illustrative embodiment, an enable command 51*a* to the third user input device 35 is also required in order for the traction engagement controller 28 to cause lowering of the traction device 26 to its use position in contact with the floor 24. Likewise, when the third user input device 35 fails to receive the enable command 51*a*, or receives a disable command 51*b*, then the traction engagement controller 28 responds by raising the traction device 26 to its storage position raised above the floor 24. In another illustrative embodiment, the lack of an enable command 51*a* to the third user input device 35 is required in order for the traction engagement controller 28 to cause lowering of the traction device 26 to its use position in contact with the floor 24.

The caster mode detector 54 is configured to cooperate with a caster and braking system 58 including the plurality of casters 22 supported by bed frame 12. More particularly, each caster 22 includes a wheel 59 rotatably supported by caster forks 60. The caster forks 60, in turn, are supported for swiveling movement relative to bedframe 12. Each caster 22 includes a brake mechanism (not shown) to inhibit the rotation of wheel 59, thereby placing caster 22 in a brake mode of operation. Further, each caster 22 includes an anti-swivel or directional lock mechanism (not shown) to prevent swiveling of caster forks 60, thereby placing caster 22 in a steer mode of operation. A neutral mode of operation is defined when neither the brake mechanism nor the directional lock mechanism are actuated such that wheel 59 may rotate and caster forks 60 may swivel. The caster and braking system 58 also includes an actuator including a plurality of pedals 61, each pedal 61 adjacent to a different one of the plurality of casters 22 for selectively placing caster and braking system 58 in one of the three different modes of operation: brake, steer, or neutral. A linkage 63 couples all of the actuators of casters 22 so that movement of any one of the plurality of pedals 61 causes movement of all the actuators, thereby simultaneously placing all of the casters 22 in the same mode of operation. Additional details regarding the caster and braking system 58 are provided in U.S. Pat. No. 6,321,878 to Mobley et al. and in PCT Published Application No. WO 00/51830 to Mobley et al., both of which are assigned to the assignee of the present invention and the disclosures of which are expressly incorporated by reference herein.

Figure 31:
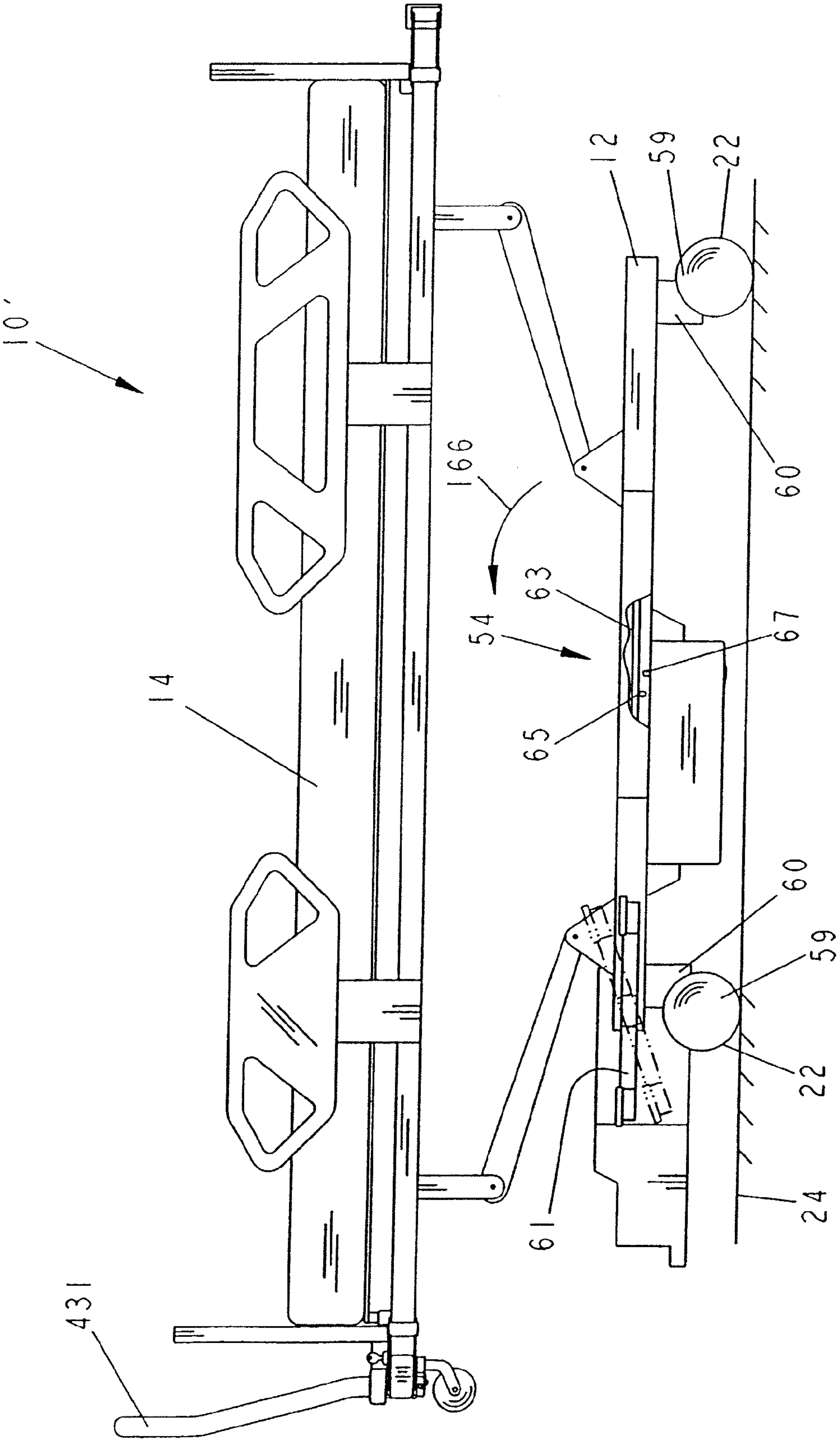
FIG. 31 is a side elevational view of the second embodiment hospital bed of FIG. 17 showing a caster and braking system operably connected to the second embodiment propulsion device.
Figure 32:
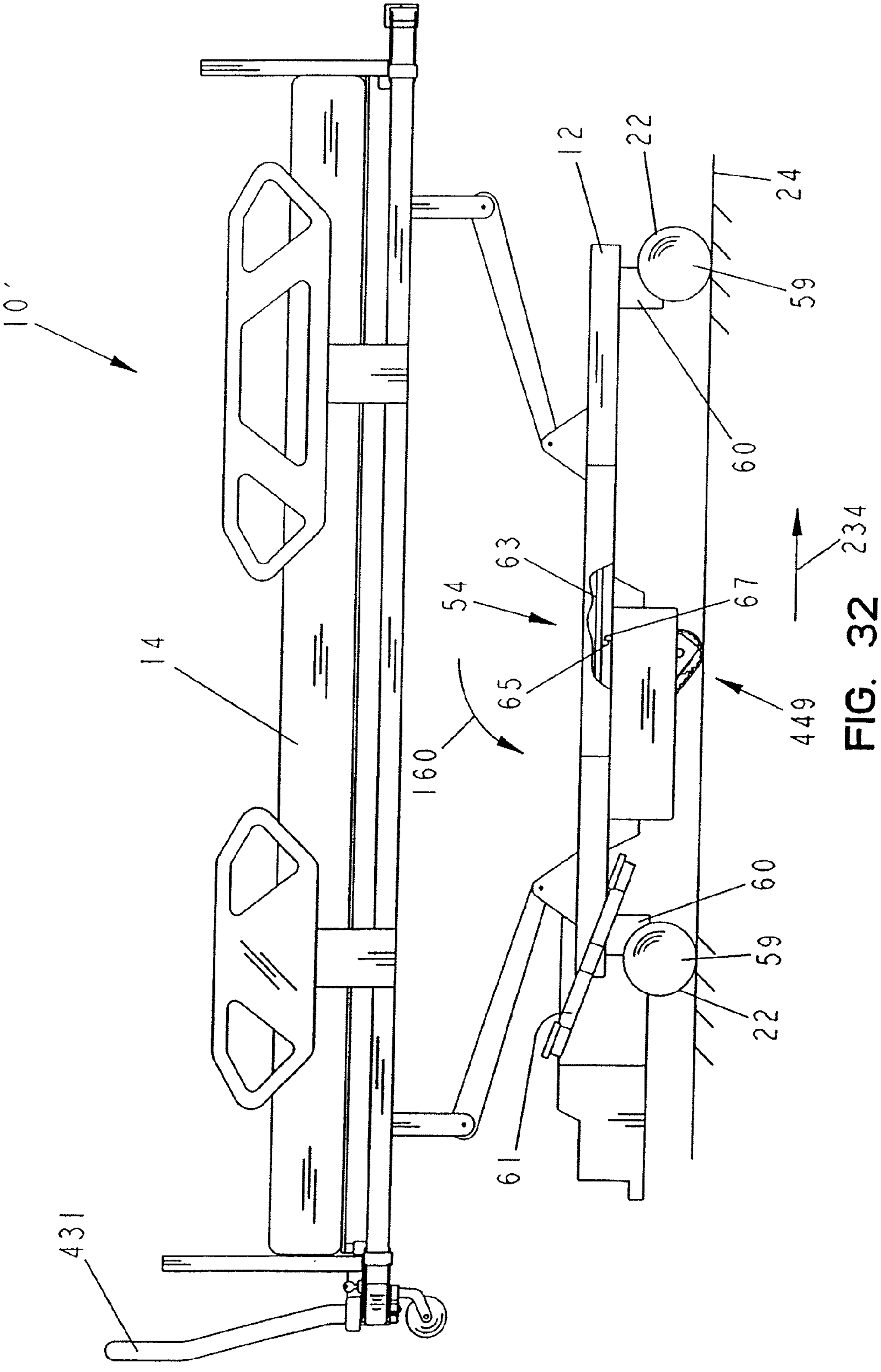
FIG. 32 is view similar to FIG. 31 showing the caster and braking system in a steer mode of operation whereby the traction belt is lowered to contact the floor.
Figure 33:
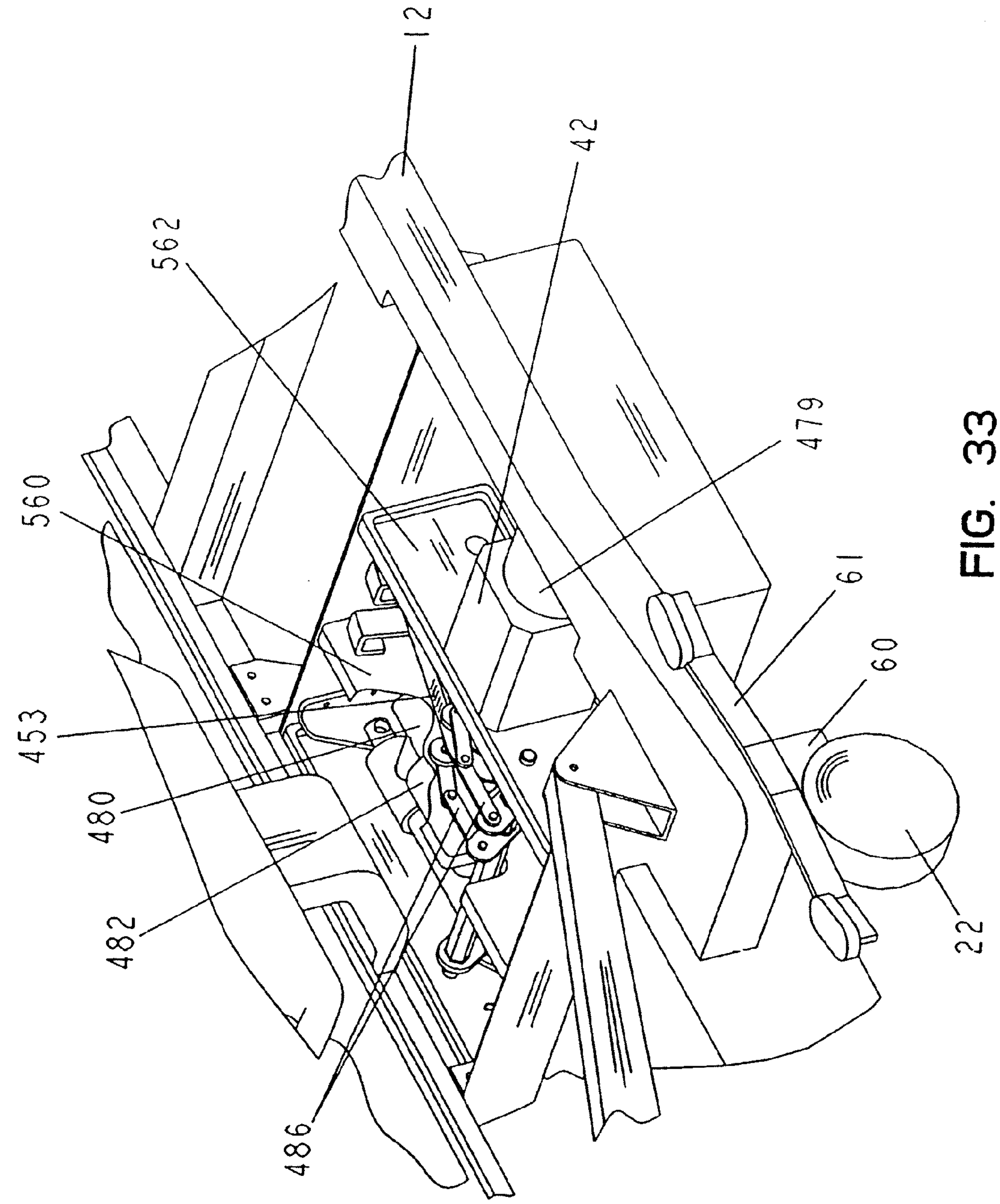
FIG. 33 is a partial perspective view of the second embodiment hospital bed of FIG. 17, with portions broken away, showing the second embodiment propulsion device.

With reference now to FIGS. 31 and 32, caster mode detector 54 includes a tab or protrusion 65 supported by, and extending downwardly from, linkage 63 of caster and braking system 58. A limit switch 67 is supported by bedframe 12 wherein tab 65 is engagable with switch 67. A neutral mode of casters 22 is illustrated in FIG. 31 when pedal 61 is positioned substantially horizontal. By rotating the pedal 61 counterclockwise in the direction of arrow 166 and into the position as illustrated in phantom in FIG. 31, pedal 61 is placed into a brake mode where rotation of wheels 59 is prevented. In either the neutral or brake modes, the tab 65 is positioned in spaced relation to the switch 67 such that the traction engagement controller 28 does not lower traction device 26 from its storage position into its use position.

FIG. 32 illustrates casters 22 in a steer mode of operation where pedal 61 is positioned clockwise, in the direction of arrows 160, from the horizontal neutral position of FIG. 31. In this steer mode, wheels 59 may rotate, but forks 60 are prevented from swiveling. By rotating pedal 61 clockwise, linkage 63 is moved to the right in the direction of arrow 234 in FIG. 32. As such, tab 65 moves into engagement with switch 67 whereby caster mode signal 56 supplied to traction engagement controller 28 indicates that casters 22 are in the steer mode. In response, assuming no external power is supplied to the propulsion system 16 from power input 50, traction engagement controller 28 automatically lowers the traction device 26 from its storage position into its use position in contact with the floor 24.

In a further illustrative embodiment, the tab 65 and switch 67 may be replaced by a conventional reed switch. The reed switch may be coupled to the linkage 63. More particularly, the reed switch may be coupled to a transversely extending rod (not shown) rotatably supported and interconnecting pedals 61 positioned on opposite sides of the patient support 10. Regardless of the particular embodiment, the caster mode detector 54 is configured to provide the caster mode signal 56 indicating that the casters 22 are in the steer mode.

The external power detector 55 is configured to detect alternating current (AC) since this is the standard current supplied from conventional external power sources. The power reservoir 48 supplies direct current (DC) to traction engagement controller 28, speed controller 36, and motor drive 44. As such, external power detector 55, by sensing the presence of AC current, provides an indication of the connection of an external power source through power input 50 to the propulsion system 16. It should be appreciated that in alternative embodiments, other devices for detecting the connection of an external AC power source to the bed 10 may be utilized. For example, a detector may be used to detect DC current supplied by the charger 49 to the power reservoir 48, indicating the connection of the bed 10 to an external AC power source.

The traction engagement controller 28 is configured to (i) activate an actuator to raise traction device 26 when casters 22 are not in a steer mode of operation as detected by caster mode detector 54; and (ii) activate an actuator to raise traction device 26 when externally generated power is received through external power input 50 as detected by external power detector 55. Limit switches 33 detect the raised storage position and the lowered use position of the traction device 26 and provide a signal indicative thereof to the traction engagement controller 28. In response, the traction engagement controller 28 stops the raising or lowering of the traction device 26 once it reaches its desired storage or use position, respectively.

As discussed in greater detail below, the linear actuator in the embodiment of FIGS. 8-14 is normally extended (i.e., the linear actuator includes a spring (not shown) which causes it to be in the extended state when it receives no power). Retraction of the linear actuator provides actuation force which moves traction device 26 into contact with floor 24, while extension of the linear actuator removes the actuation force and moves traction device 26 away from floor 24. In the illustrative embodiment, traction engagement controller 28 inhibits contact of traction device 26 with floor 24 not only when the user places casters 22 of bed 10 in brake or neutral positions, but also when charger 48 is plugged into an external power line through input 50. In further illustrative embodiments, traction engagement controller 28 prevents lowering of traction device 26 from its storage position to its use position in contact with floor 24 when third user input 35 produces an enable signal 52.

Power reservoir 48 is coupled to speed controller 36 of input system 20 and motor drive 44 and traction engagement controller 28 of propulsion system 16 to provide the necessary operating power thereto. In the preferred embodiment, power reservoir 48 includes two rechargeable 12 AmpHour 12 Volt type 12120 batteries connected in series which provide operating power to motor drive 44, motor 42, and the linear actuator in traction engagement controller 28, and further includes an 8.5 V voltage regulator which converts unregulated power from the batteries into regulated power for electronic devices in propulsion system 16 (such as operational amplifiers). However, it should be appreciated that power reservoir 48 may be suitably coupled to other components of propulsion system 16 in other embodiments, and may be accordingly configured as required to provide the necessary operating power.

Charger 49 is coupled to external power input 50 to receive an externally generated power therefrom, and is coupled to power reservoir 48 to provide charging thereto. Accordingly, charger 49 is configured to use the externally generated power to charge, or replenish, power reservoir 48. In the preferred embodiment, charger 49 is an IBEX model number L24-1.0/115 AC.

External power input 50 is coupled to charger 49 and traction engagement controller 28 to provide externally generated power thereto. In the preferred embodiment, the external power input 50 is a standard 115V AC power plug.

Figure 59:
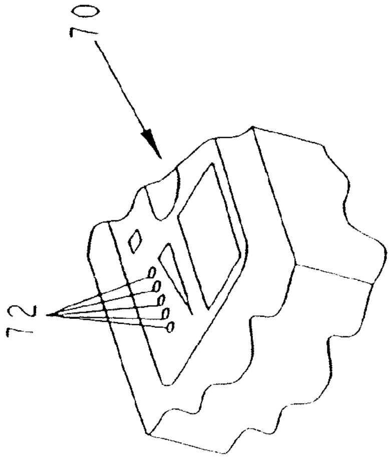
FIG. 59 is a detail view of the charge indicator of FIG. 58.
Figure 60:
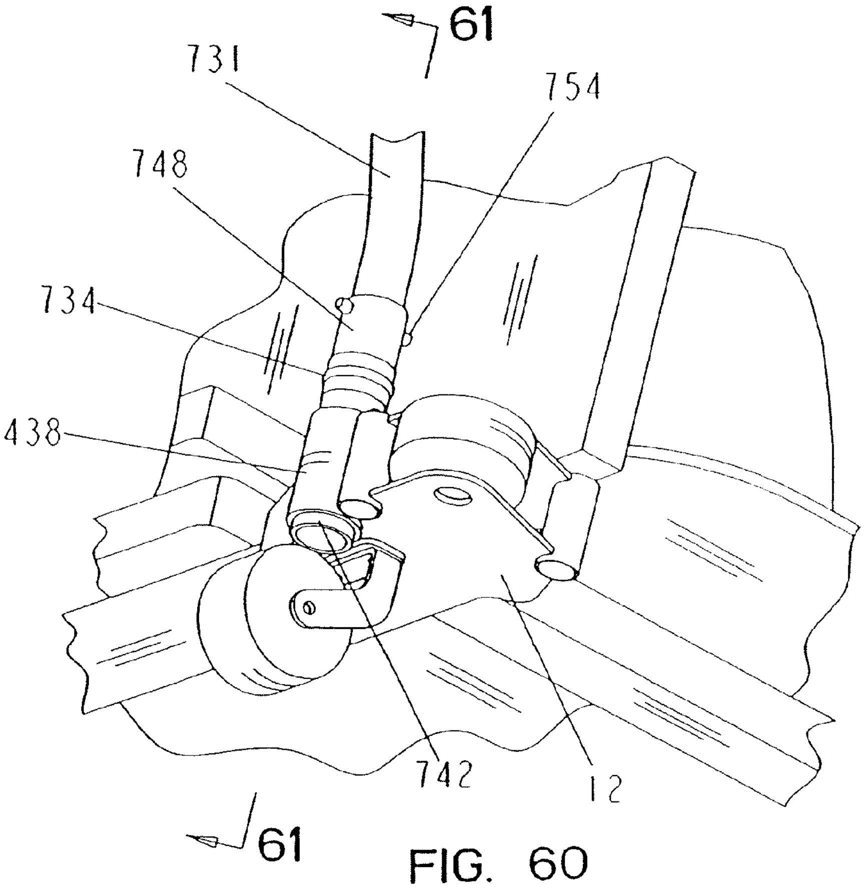
FIG. 60 is an enlarged partial perspective view of the third embodiment input system of FIG. 57 showing a lower end of a first handle supported by the bedframe.

Referring further to FIG. 2, a charge detector or battery gas gauge 69 is provided in communication with power reservoir 48 for sensing the amount of power or charge contained therein. The charge detector 69 is based on the TI/Benchmarq 2013H gas gauge chip. A 0.005 ohm resistor is positioned intermediate the battery minus and ground. The charge detector 69 monitors the voltage across the resistor as a function of time, interpreting positive voltages as current into the power reservoir 48 (charging) and negative voltages as current out of the power reservoir 48 (discharging). The amount of detected charge is provided to a charge indicator 70 through a charge indication signal 71. The charge indicator 70 may comprise any conventional display visible to the caregiver. One embodiment, as illustrated in FIG. 59, comprises a plurality of lights 72, preferably light emitting diodes (LEDs), which provide a visible indication of remaining charge in the power reservoir 48. Each illuminated LED 72 is representative of a percentage of full charge remaining, such that the fewer LEDs illuminated, the less charge remains within power reservoir 48. It should be appreciated that the charge indicator 70 may comprise other similar displays, including, but not limited to liquid crystal displays.

With further reference to FIGS. 2 and 59, the charge indicator 70 illustratively comprises a total of five LEDs 72. Each LED 72 represents approximately 20% of the nominal power reservoir capacity, i.e., 5 LEDs 72 illuminated represents an 80% to 100% capacity in the power reservoir 48, 4 LEDs 72 illuminated represents an 60 to 79% capacity in the power reservoir 48, etc. A single illuminated LED 72 indicates that the remaining capacity is less than 20%.

A shut down relay 77 is provided in communication with the charge detector 69. When the charge detector 69 senses a remaining charge within the power reservoir 48 below a predetermined amount, it sends a low charge signal 74 to the shut down relay 77. In an illustrative embodiment, the predetermined amount is defined as seventy percent of a full charge. The shut down relay 77, in response to the low charge signal 74, disconnects the power reservoir 48 from the motor drive 44 and the traction engagement controller 28. As such, further depletion of the power reservoir 48 (i.e., deep discharging) is prevented. Preventing the unnecessary depletion of the power reservoir 48 typically extends the useful life of the batteries within the power reservoir 48.

Figure 42:
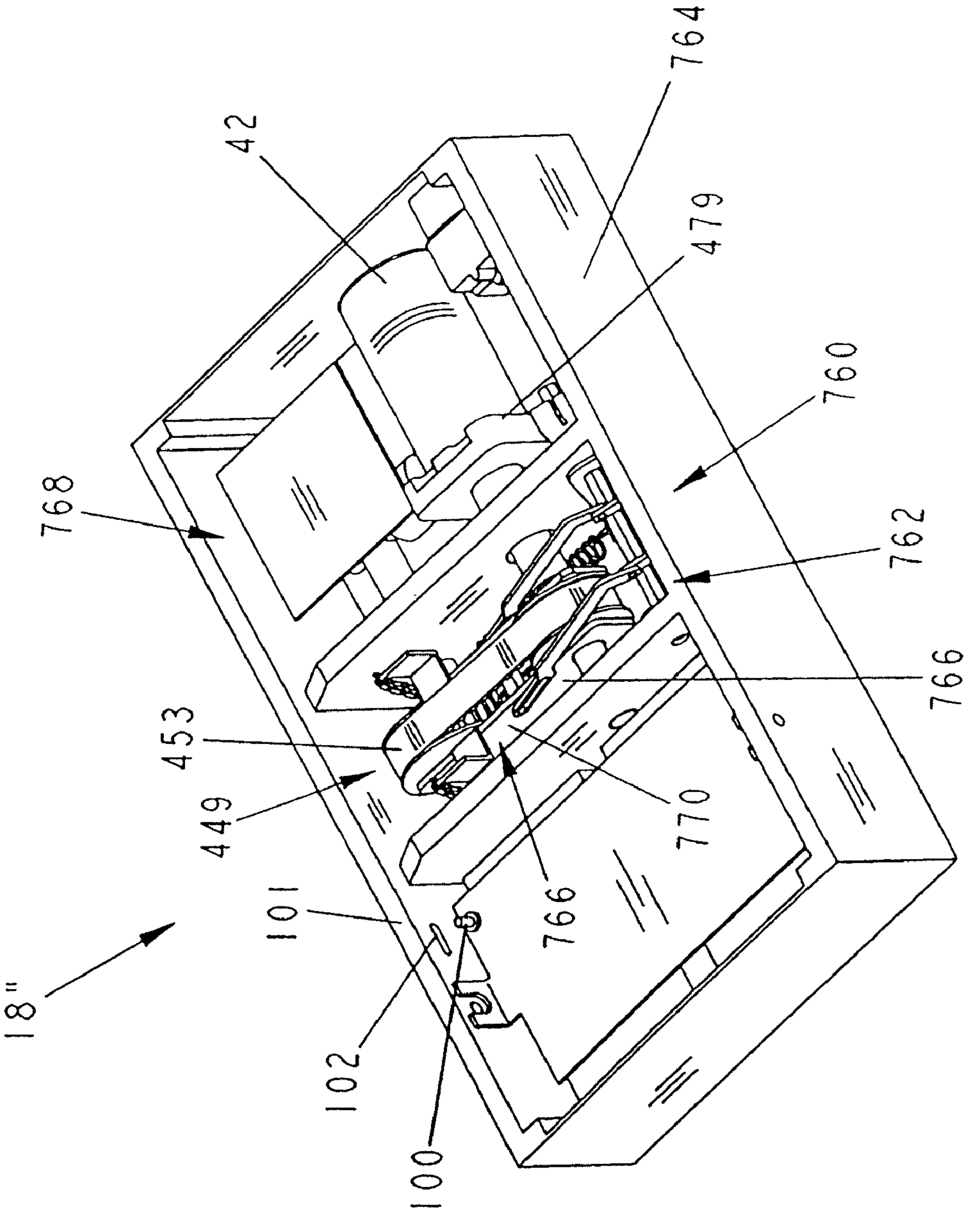
FIG. 42 is a perspective view showing the third embodiment propulsion device including a traction belt supported by a belt mount, an actuator, an arm coupled to the actuator, and a spring coupled to the arm and the belt mount.
Figure 43:
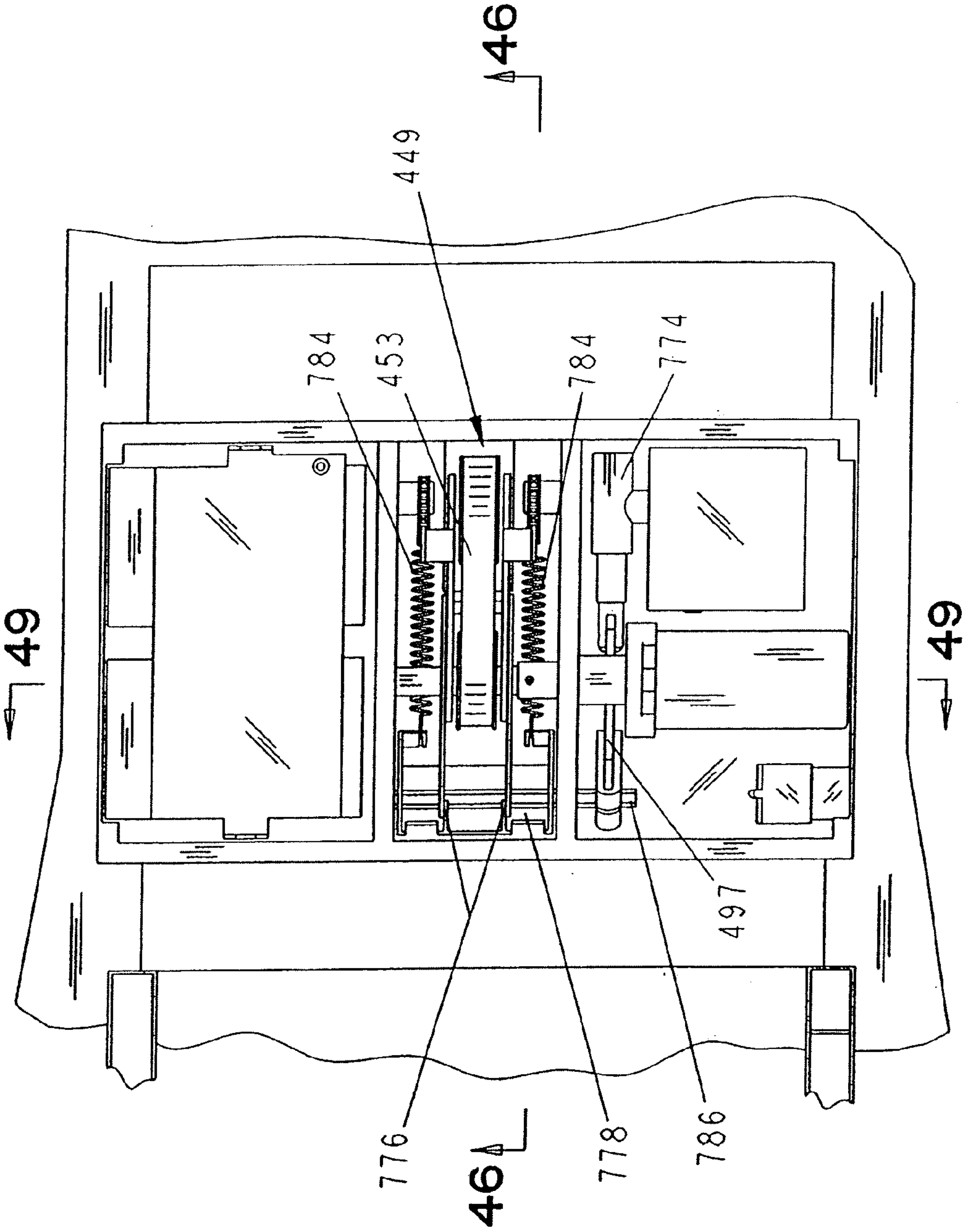
FIG. 43 is a top plan view of the of the propulsion device of FIG. 42.
Figure 44:
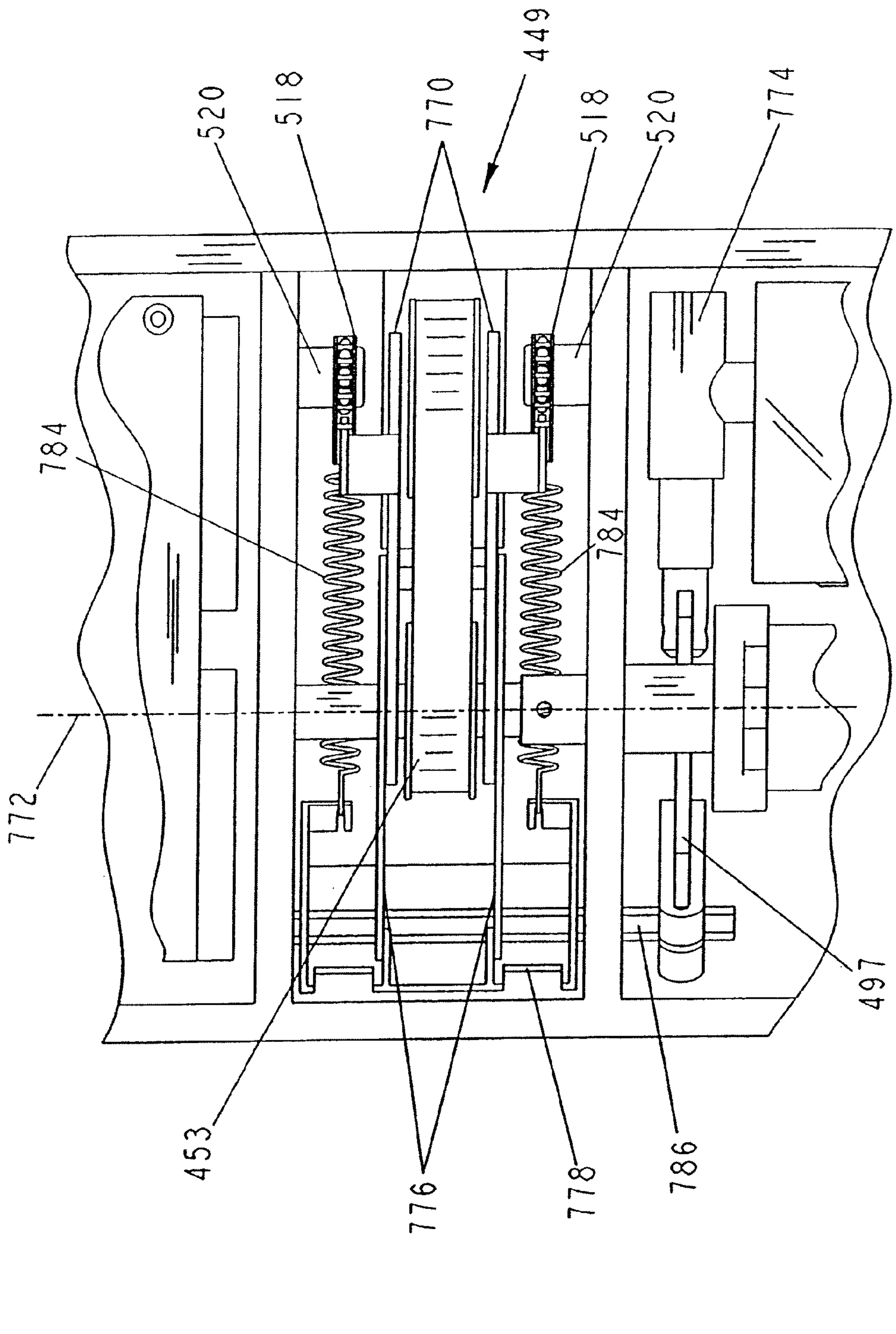
FIG. 44 is a detail view of FIG. 43.
Figure 45:
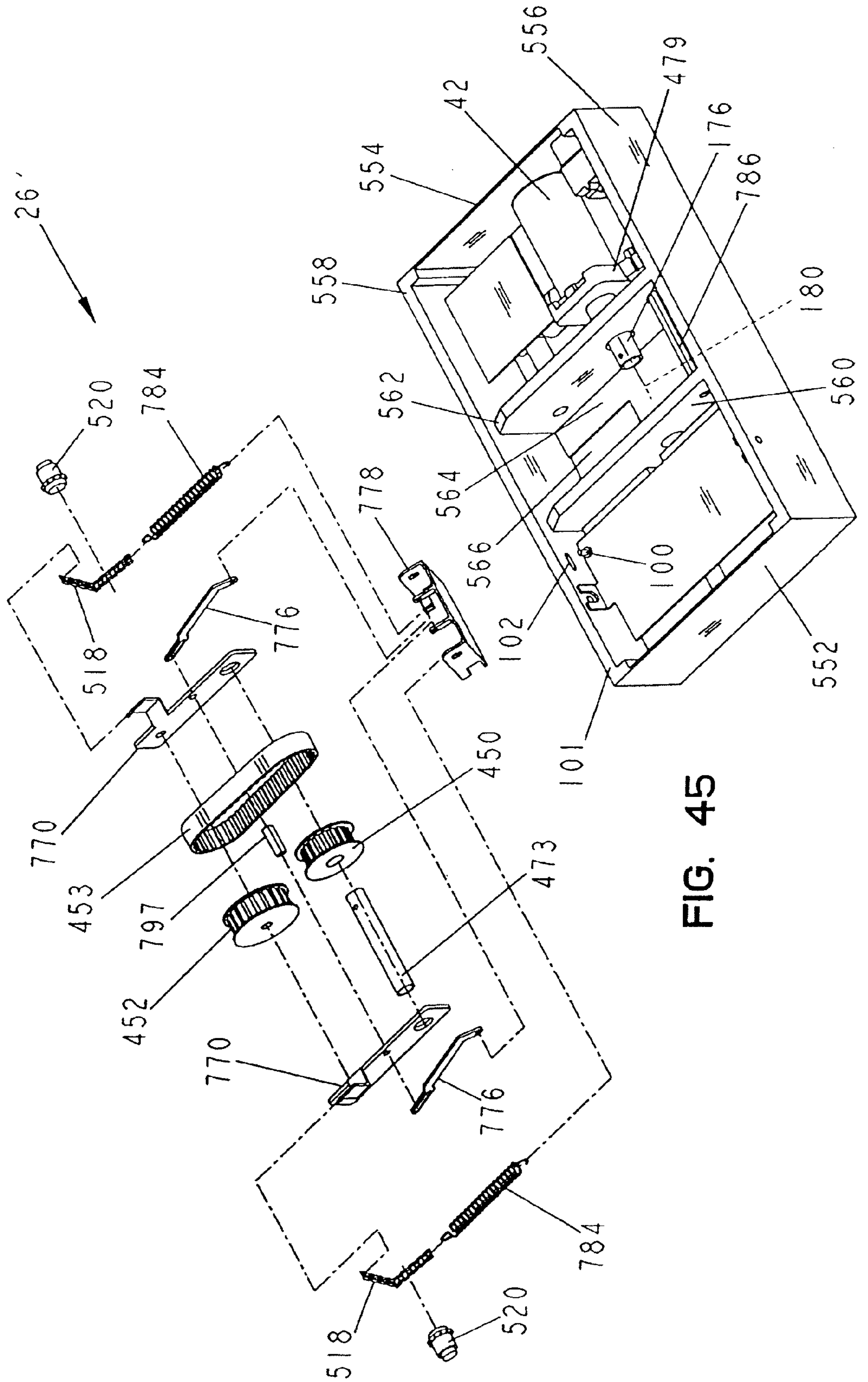
FIG. 45 is an exploded perspective view of the propulsion device of FIG. 42.

The shut down relay 77 is in further communication with a manual shut down switch 100. The shut down switch 100 may comprise a conventional toggle switch supported by the bedframe 12 and physically accessible to the user. As illustrated in FIGS. 42 and 45, the switch 100 may be positioned behind a wall 101 formed by traction device 26 such that access is available only through an elongated slot 102, thereby preventing inadvertent movement of the switch 100. The switch 100 causes shut down relay 77 to disconnect power from motor drive 44 and traction engagement controller 28 which is desirable during shipping and maintenance of patient support 10.

The propulsion device 18 is configured to be manually pushed should the traction device 26 be in the lowered use position and power is no longer available to drive the motor 42 and traction engagement controller 28. In the preferred embodiment, the motor 42 is geared to permit it to be back-driven. Furthermore, it is preferred that the no more than 200% of manual free force is required to push the bed 10 when the traction device 76 is lowered to the use position in contact with floor 24 but not driven in motion by the motor 42, compared to when the traction device 26 is raised to the storage position.

When the batteries of power reservoir 48 become drained, the user recharges them by connecting external power input 50 to an AC power line. However, as discussed above, traction engagement controller 28 does not provide the actuation force to lower traction device 26 into contact with floor 24 unless the user disconnects external power input 50 from the power line and places casters 22 in a steer mode of operation through pedal 61.

In an illustrative embodiment of the patient support 10, an automatic braking system 103 is coupled intermediate the power reservoir 48 and the motor 42. The braking system 103 is configured to provide braking to the patient support 10 should insufficient power be available to drive the motor 42 and, in turn, the traction device 26 is not capable of moving the bedframe 12. More particularly, the braking system 103 is configured to detect power available to drive the motor 42 and to provide braking of the motor 42 selectively based upon the power detected.

Figure 3A:
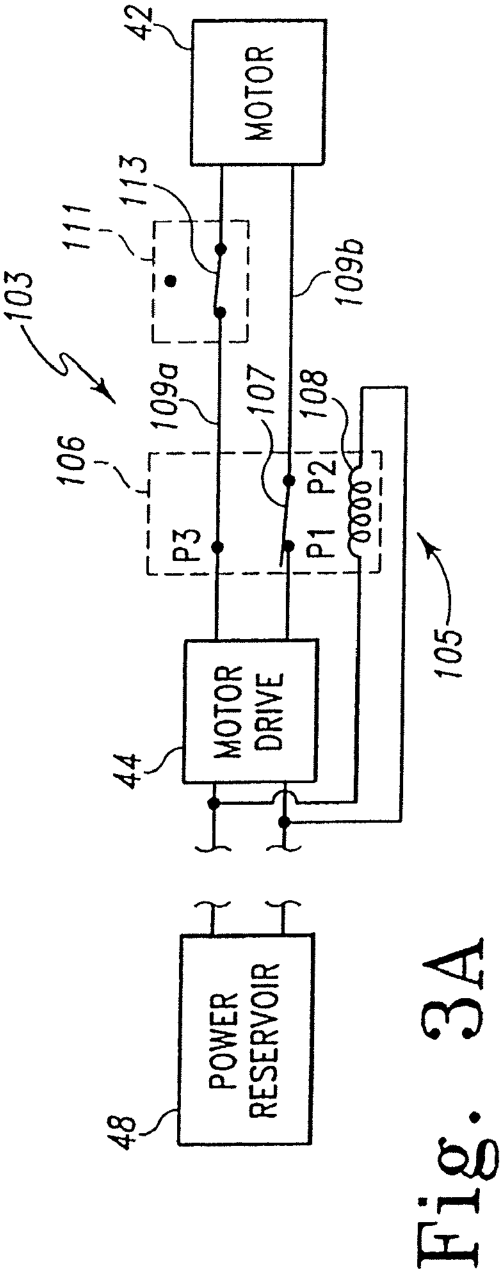
FIG. 3A is a schematic block diagram of an automatic braking system of the present invention shown in a driving mode of operation.
Figure 3B:
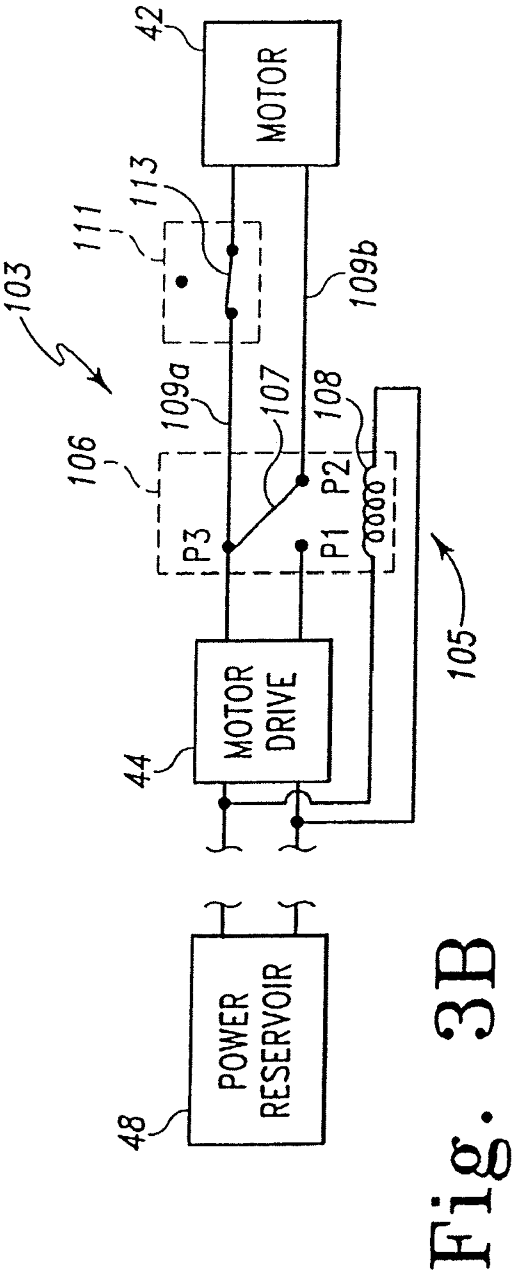
FIG. 3B is a schematic block diagram of the automatic braking system of FIG. 3A shown in a braking mode of operation.
Figure 3C:
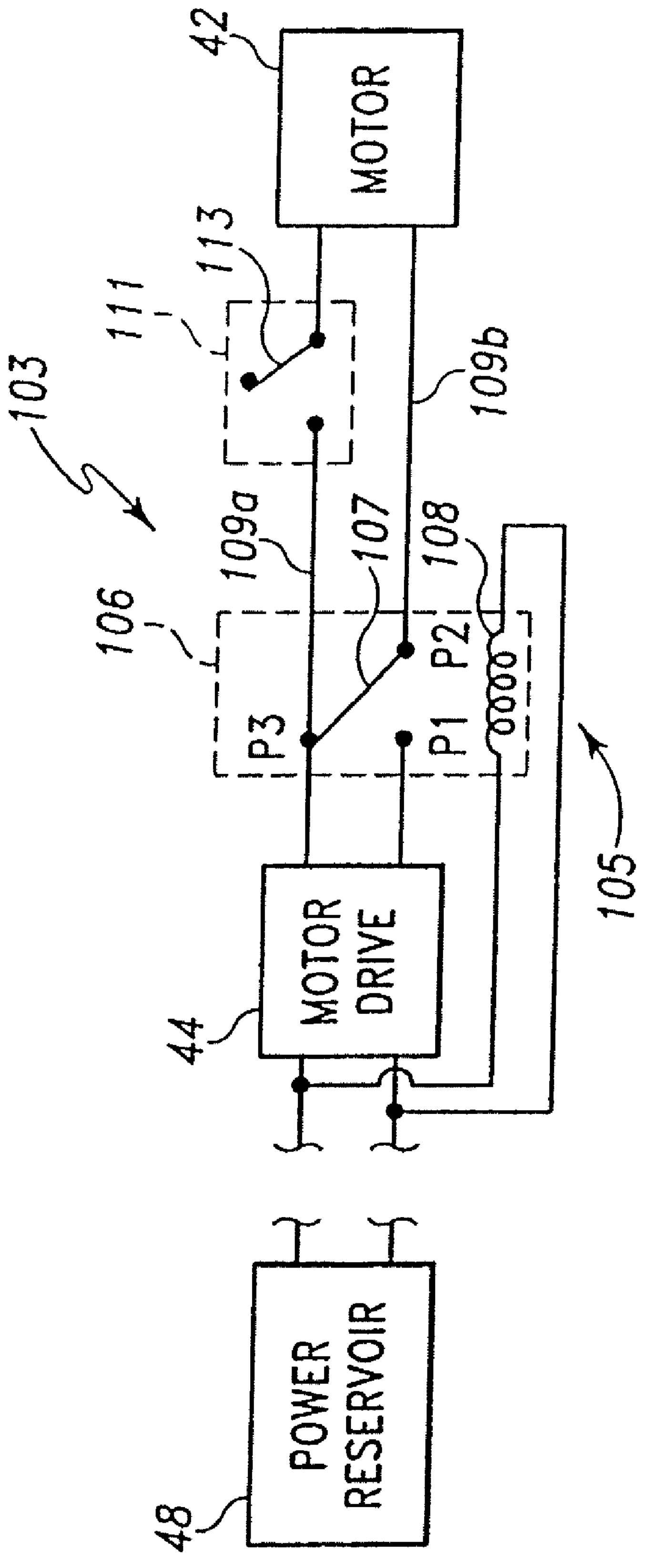
FIG. 3C is a schematic block diagram of the automatic braking system of FIG. 3A shown in an override mode of operation.

As illustrated schematically in FIGS. 3A-3C, the braking system includes a braking controller 105 configured to cause the traction device 26 to operate in a driving mode when it detects power supplied to the motor 42 at least as great as a predetermined value. The braking controller 105 is further configured to cause the traction device 26 to operate in a dynamic braking mode when it detects power supplied to the motor 42 below the predetermined value. In the illustrative embodiment of FIGS. 3A-3C, the controller 105 comprises a conventional relay 106 including a movable contact 107 which provides electrical communication between a pair of pins P1 and P2 when a sufficient current passes through a coil 108 (FIG. 3A). More particularly, the contact 107 is pulled toward pin P1 by the energized coil 108 against a spring bias tending to cause the contact 107 to be drawn toward pin P3. The contact 107 of the relay 106 disconnects pins P1 and P2 and instead provides electrical communication between pins P2 and P3 when the current through the coil 108 drops below the predetermined value (FIGS. 3B and 3C). In other words, the spring bias causes the contact 107 to move toward the pin P3. The relay 106 may comprise commercially available Tyco Model VF4-15H13-C01 having approximately a 40 amp capacity. Illustratively, the relay 106 is configured to open, and thereby connect pins P2 and P3, when voltage applied to the motor 42 is less than approximately 21 volts and the current supplied to the motor 42 is less than approximately 5 amps.

The braking relay 106 functions to switch the motor 42 between a driving mode, as illustrated in FIG. 3A, and a dynamic braking mode, as illustrated in FIG. 3B. In the driving mode, the braking relay 106 connects the power leads 109*a* and 109*b* of the motor 42 with the power reservoir 48, thereby supplying power for driving the motor 42. This, in turn, causes the traction device 26 to drive the bed frame 12 in motion. In the braking mode, the braking relay 106 disconnects one of the power leads 109*b* from the motor 42 and instead shorts the power leads 109*a* and 109*b* through contact 107. Since the motor 42 includes a permanent magnet, shorting the power leads 109*a* and 109*b* causes the motor 42 to act as an electronic brake, in a manner known in the art. Moreover, shorting the power leads 109*a* and 109*b* causes the motor 42 to function as a brake resulting in the traction device 26 resisting movement of the patient support 10. The override switch 111 is provided in order to remove the short from the motor leads 109*a* and 109*b* and thereby prevent the motor 42 from functioning as an electronic brake.

In operation, when power to the motor 42 drops below a certain predetermined value, as measured by current and/or voltage supplied to the motor 42, then the relay 106 shorts the leads to the motor 42. As described above, in an illustrative embodiment, the predetermined value of the voltage is approximately 21 volts and the predetermined value of the current is approximately 5 amps. When the motor leads 109*a* and 109*b* are shorted, the motor 42 will act as a generator should the traction device 26 be moved in an attempt to transport the patient support 10. By attempting to generate into a short circuit of the power leads 109*a* and 109*b*, the motor 42 acts as an electronic brake thereby slowing or preventing movement of the patient support 10. Such braking is often desirable, particularly if the patient support 10 is located on a ramp or incline with insufficient power supplied to the motor 42 to cause the traction device 26 to assist in moving the patient support 10 against gravity. More particularly, the electronic braking mode of the motor 42 will act against gravity induced movement of the patient support 10 down the incline. Should the operator need to physically or manually push the patient support 10, he or she may disengage the electronic braking mode by activating the override switch 111 which, as detailed above, removes the short circuit of the power leads 109*a* and 109*b* to the motor 42.

As detailed above, the shut down relay 77 disconnects the power reservoir 48 from the motor drive 44 in response to the low charge signal 74 from the charge detector 69 or in response to manipulation of the shut down switch 100 by a user. As may be appreciated, disconnecting power from the motor drive 44 and motor 42 will cause the braking relay 106 to short the leads to the motor 42, thereby causing the motor 42 to operate in the braking mode as detailed above. In other illustrative embodiments, the shut down relay 77 may disconnect the power reservoir 48 from the motor drive 44 in response to additional inputs. For example, the shut down relay 77 may respond to the enable/disable signal 52 from the third user input device 35, thereby causing the braking relay 106 to short the leads to the motor 42 resulting in the motor 42 operating in the braking mode. This condition may be desirable in certain circumstances where braking is desired in response to either (i) the failure of the user to provide an enable command 51*a* to the third user input device 35 or (ii) the user providing a disable command 51*b* to the third user input device 35.

In further illustrative embodiments, the third user input device 35 may directly control a motor relay similar to the braking relay 106 and configured such that when the relay is off, its normally-closed contact shorts the motor 42, and when energized, its normally-open contact connects the motor 42 to the motor drive 44 to permit operation of the motor 42. As detailed above, the override switch 111 may be utilized to open the short circuit of the motor leads and eliminate the braking function of the motor 42.

Figure 52:
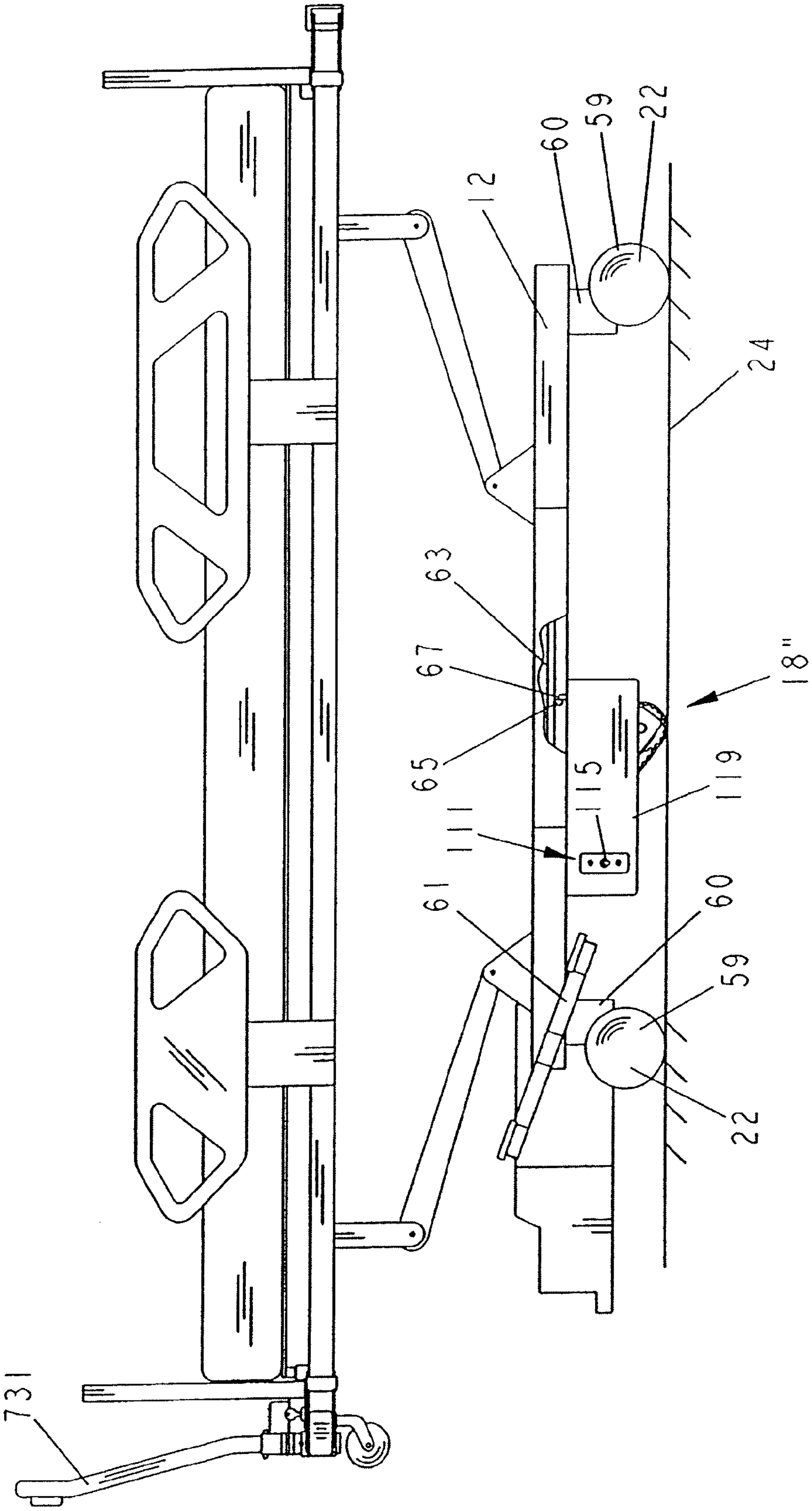
FIG. 52 is view similar to FIG. 51 showing the caster and braking system in a steer mode of operation whereby the traction belt is lowered to contact the floor.
Figure 53:
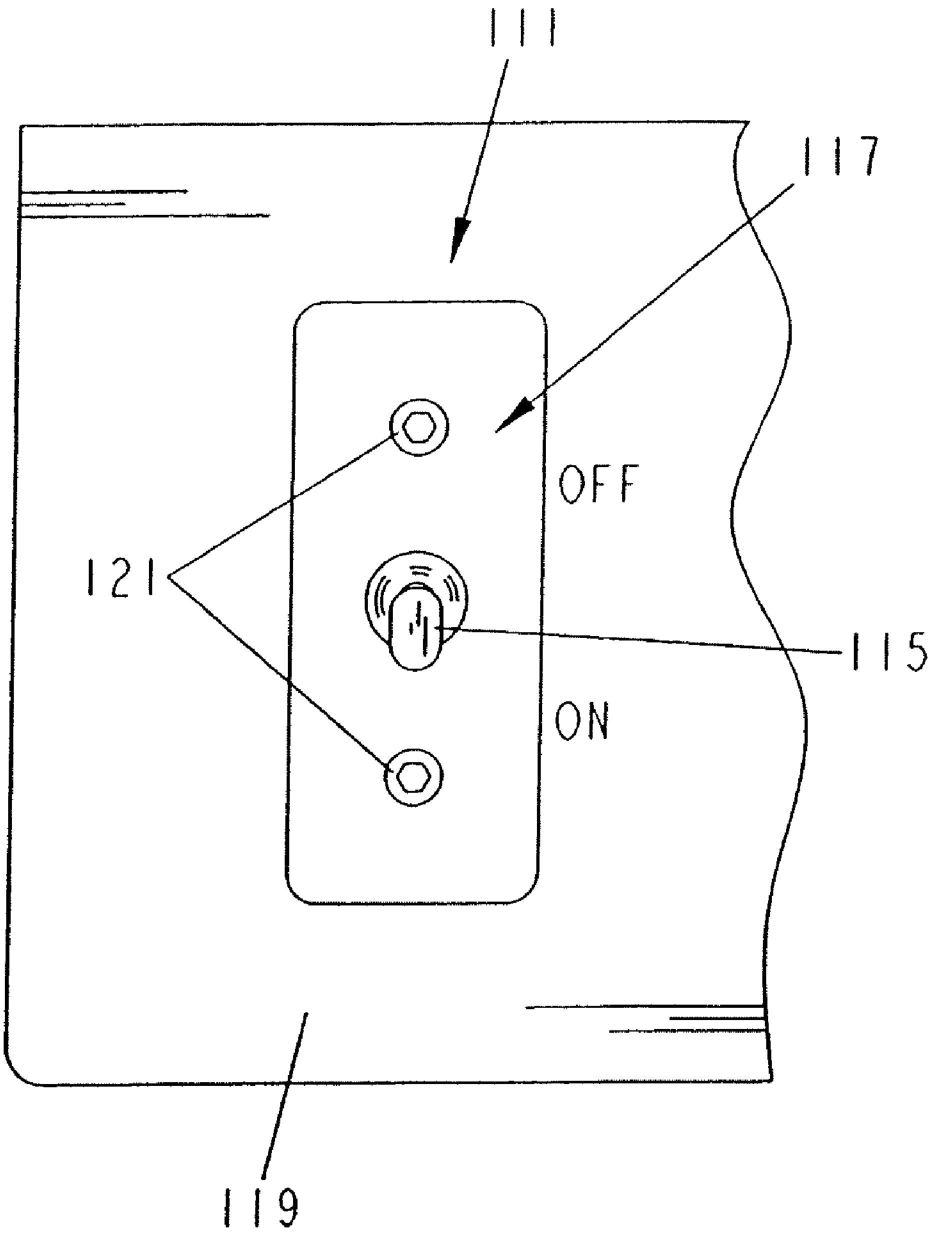
FIG. 53 is a detail view of FIG. 52, illustrating the override switch of the automatic braking system.
Figure 54:
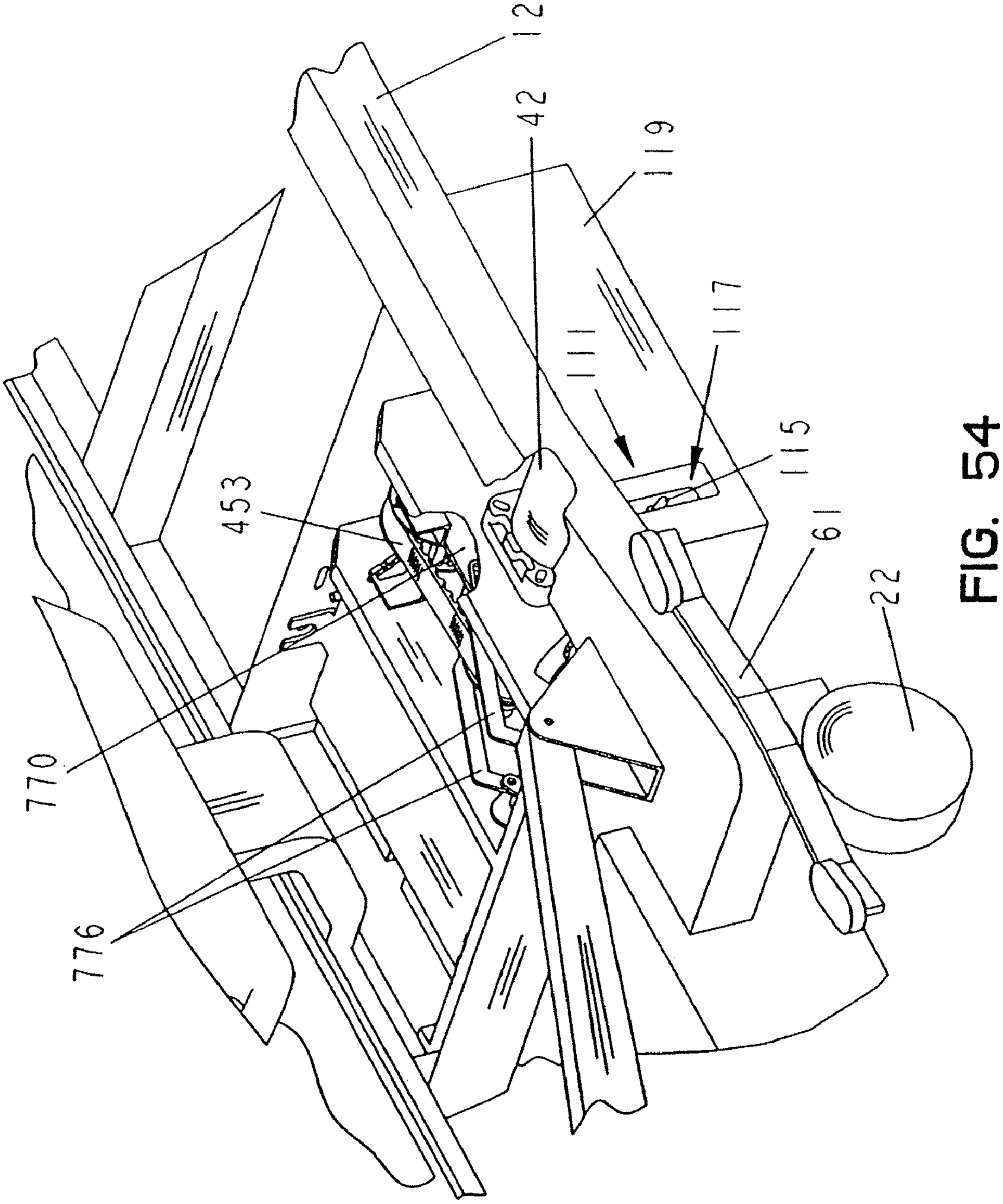
FIG. 54 is a partial perspective view of the third embodiment hospital bed of FIG. 41, with portions broken away, showing the third embodiment propulsion device.
Figure 55:
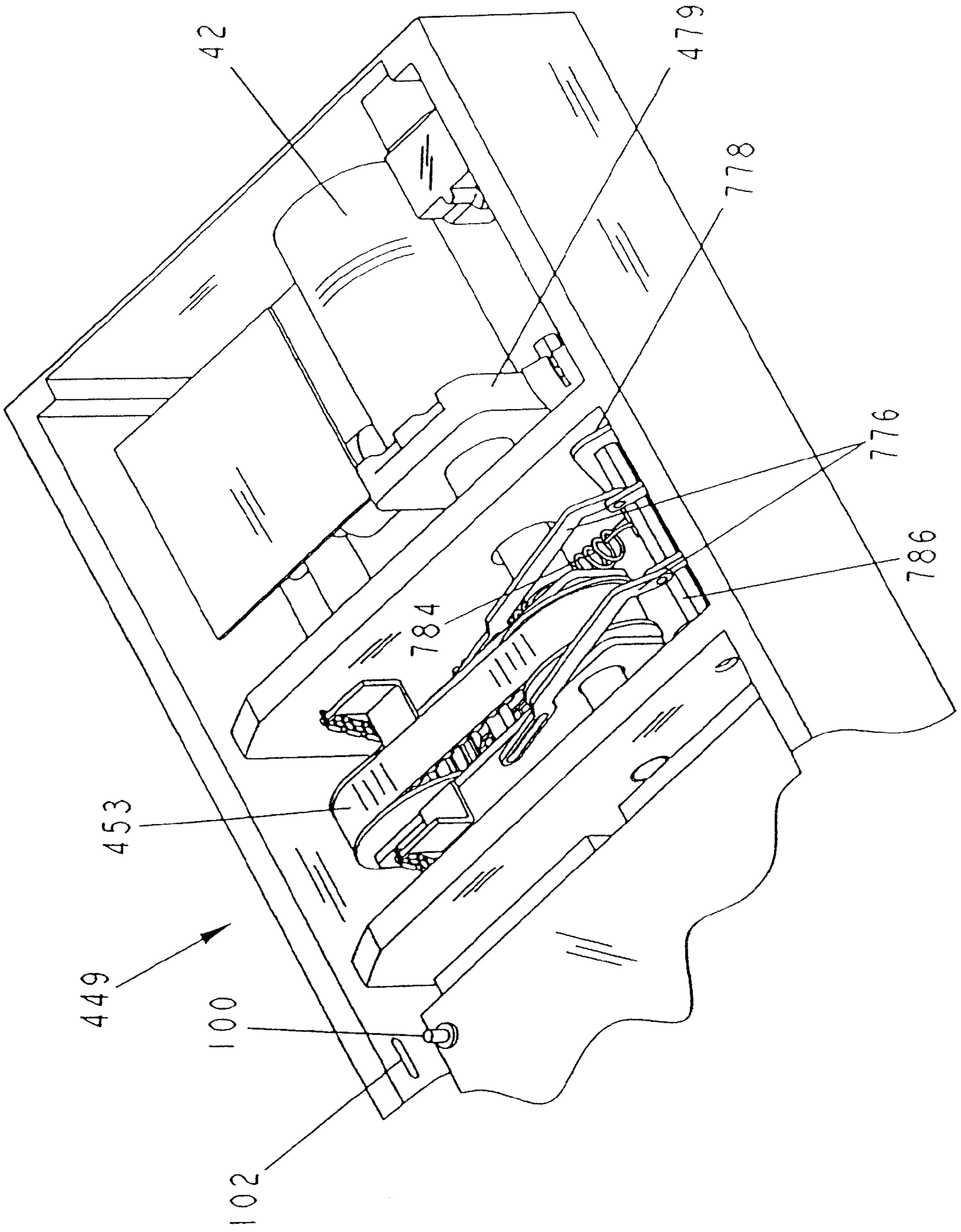
FIG. 55 is a perspective view of the third embodiment propulsion device of FIG. 42 showing the track drive spaced apart from the floor as in FIG. 46.
Figure 56:
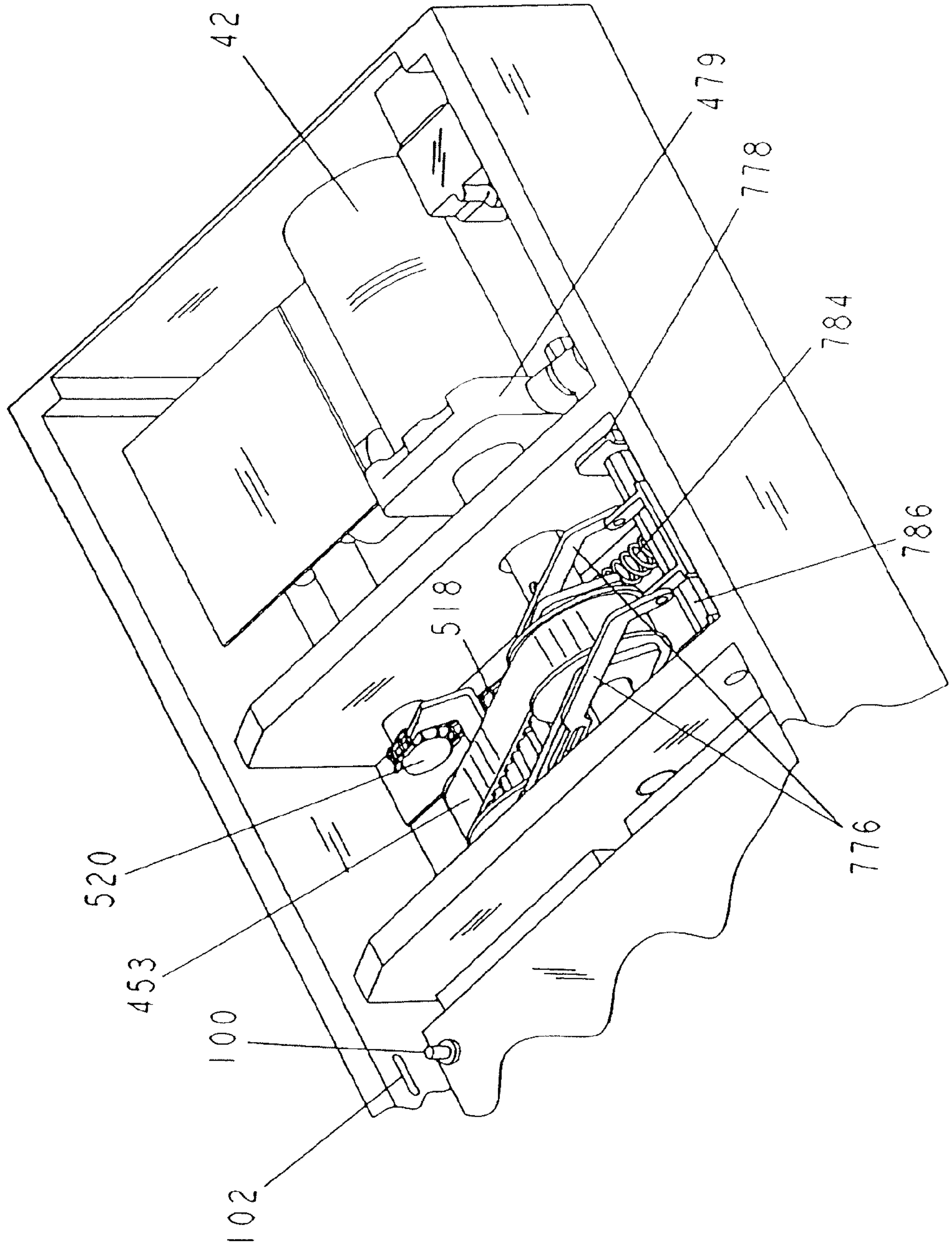
FIG. 56 is a view similar to FIG. 55 showing the traction belt in contact with the floor as in FIG. 48.
Figure 57:
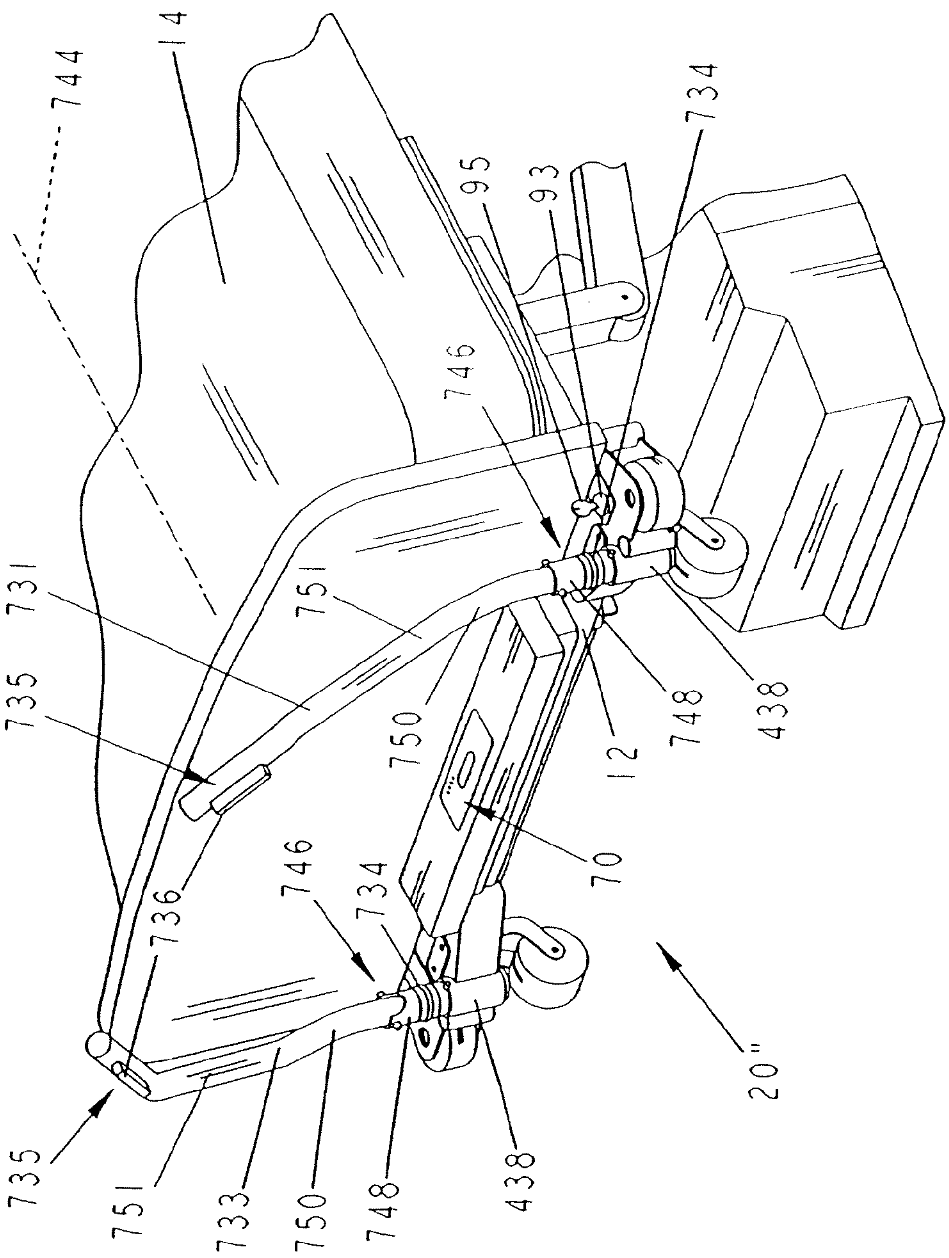
FIG. 57 is a partial perspective view of the third embodiment hospital bed of FIG. 42 as seen from the front and right side, showing a third embodiment input system.
Figure 58:
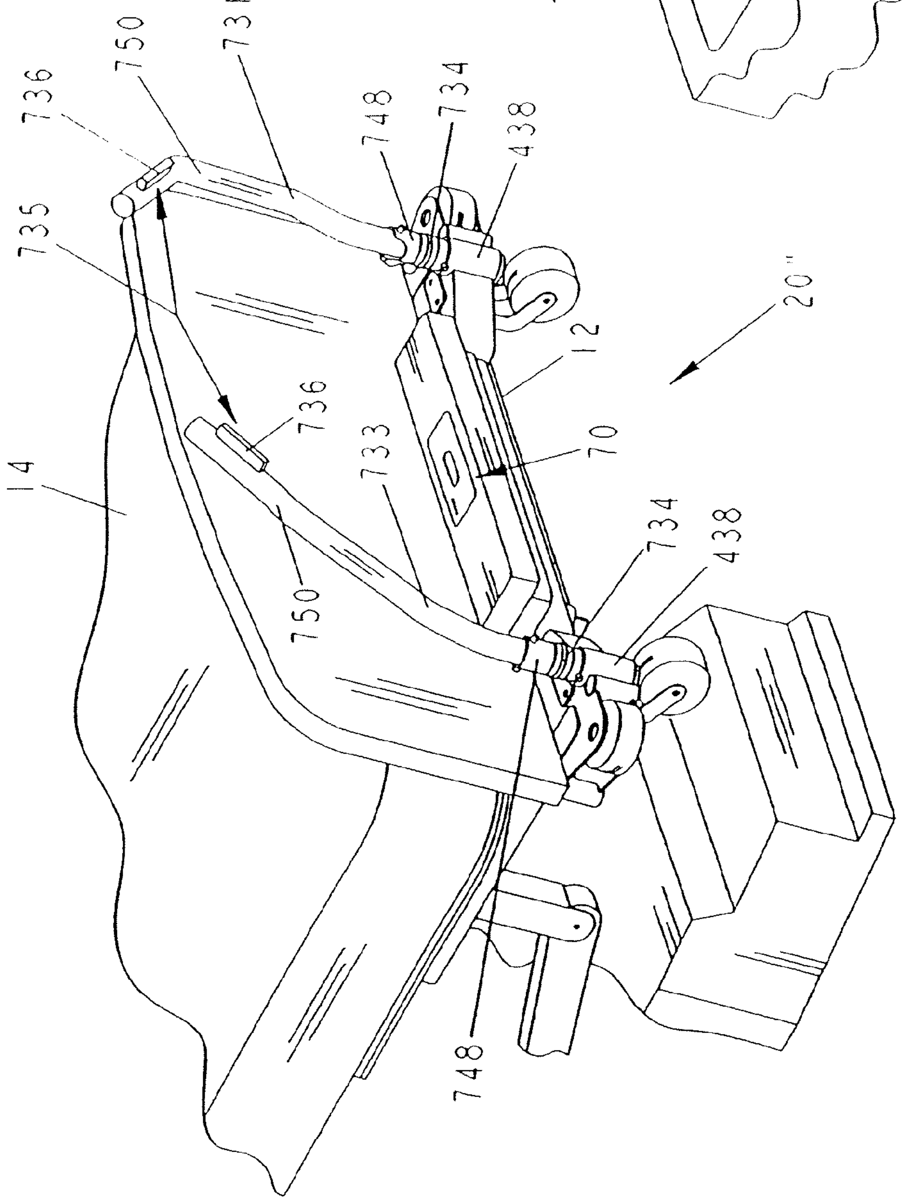
FIG. 58 is a perspective view similar to FIG. 57 as seen from the front and left side.

The mounting of the override switch 111 is illustrated in greater detail in FIGS. 52 and 53. More particularly, the override switch 111 may comprise a conventional toggle switch including a lever 115 operably connected to the contact 113 (FIGS. 3A-3C) and which may be moved between closed (FIGS. 3A and 3B) and opened (FIG. 3C) positions. The lever 115 is preferably received within a recess 117 formed in a side wall 119 supported by the bed frame 12 in order to provide access to the operator while preventing inadvertent activation thereof. The switch 111 may be secured to the side wall 119 using conventional fasteners, such as screws 121.

Figure 41:
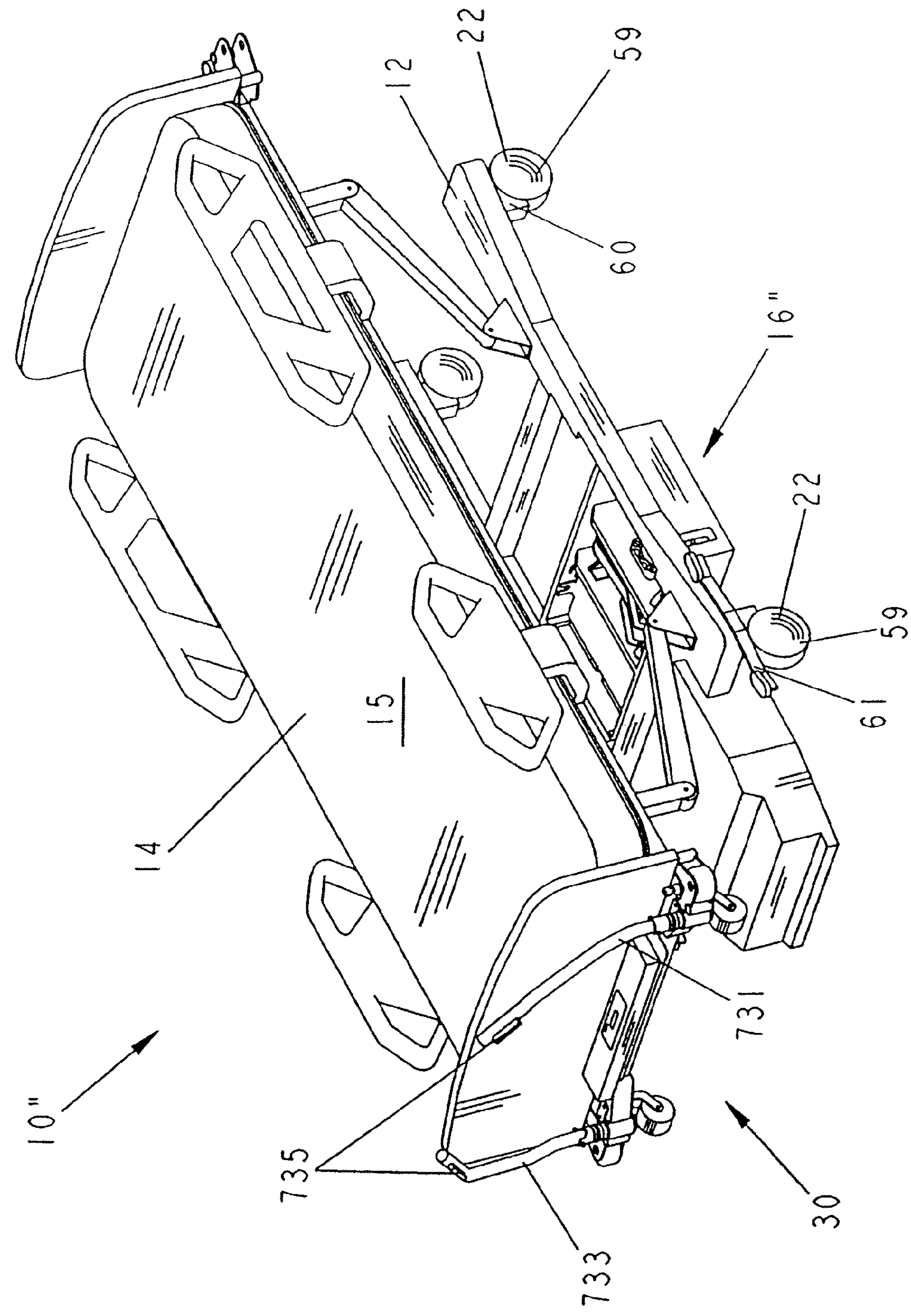
FIG. 41 is a perspective view of a third embodiment hospital bed showing the bed including a bedframe, a third embodiment propulsion device coupled to the bottom of the bedframe, and a pair of spaced-apart handles coupled to the bedframe and controlling the propulsion device.

Propulsion system 16 of FIG. 2 operates generally in the following manner. When a user wants to move bed 10 using propulsion system 16, the user first disconnects external power 50 from the patient support 10 and then places casters 22 in a steer mode through pivoting movement of pedal 61 in a clockwise direction as illustrated in FIG. 41. In response, traction engagement controller 28 lowers traction device 26 to floor 24. The user then activates the third user, or enabling, device 35 by providing an enabling command 51 thereto. Next, the user applies force to handle 30 so that propulsion system 16 receives the first input force 39 and the second input force 41 from first and second handle members 38, 40, respectively. The motor 42 provides motor horsepower 47 to traction device 26 based on first input force 39 and second input force 41. Accordingly, a user selectively applies a desired amount of motor horsepower 47 to traction device 26 by imparting a selected amount of force on handle 30. It should be readily appreciated that in this manner, the user causes patient support 10 of FIG. 1 to "self-propel" to the extent that the user applies force to handle 30.

Figure 6B:
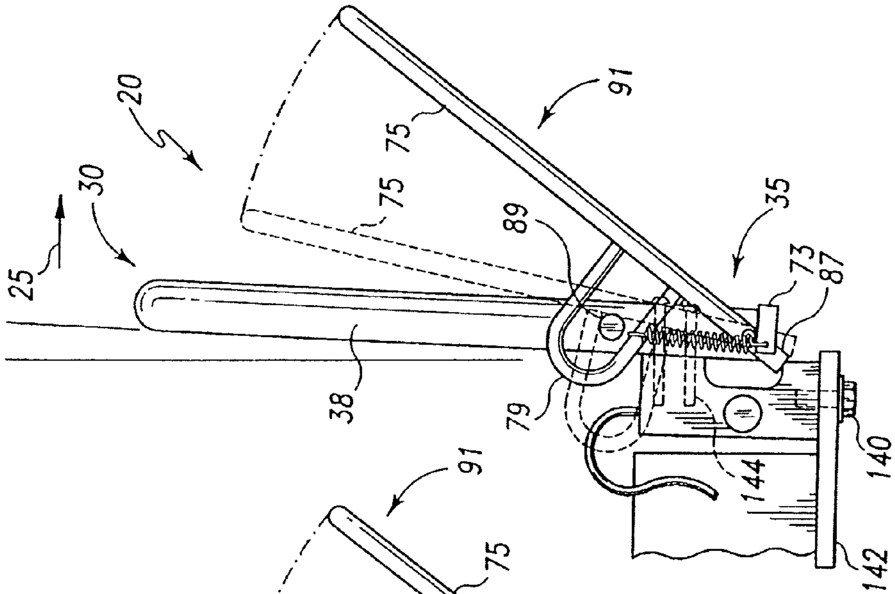
FIG. 6B is a view similar to FIG. 5 showing the handle pulled back and the bail bumped slightly forward to cause a spring to bias the bail to the raised off position.
Figure 6A:
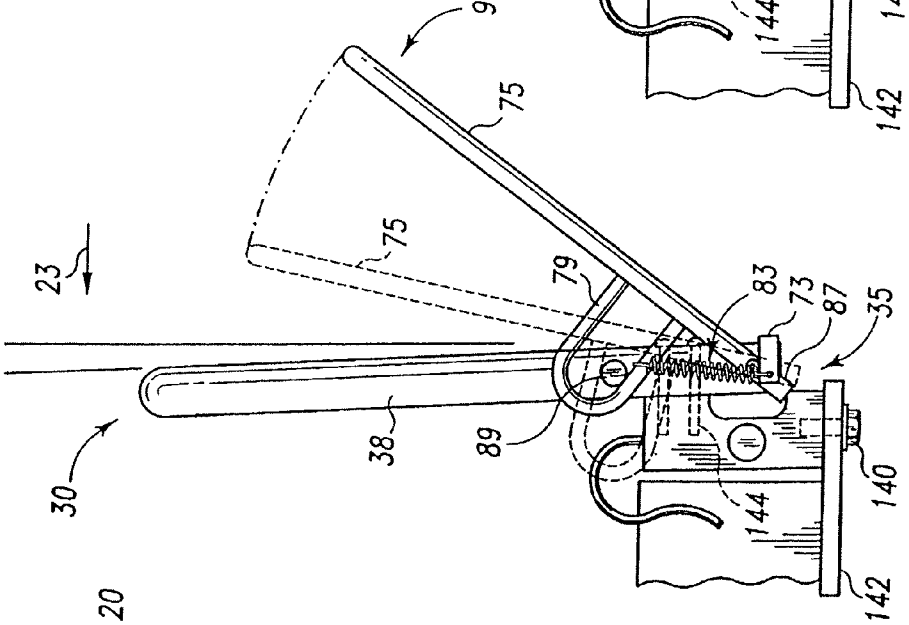
FIG. 6A is a view similar to FIG. 5 showing the handle pushed forward and the bail moved to a lowered on position to permit operation of the propulsion system.
Figure 5:
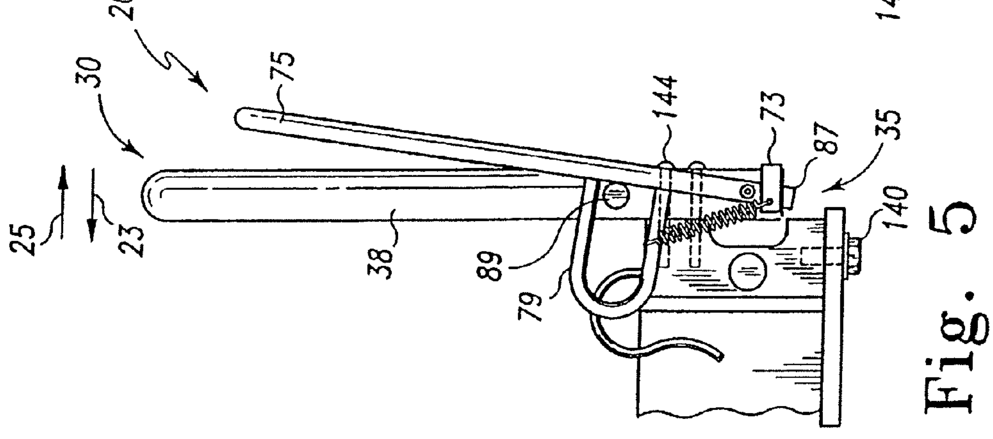
FIG. 5 is a side elevation view taken along line 5-5 of FIG. 1 showing an end of the U-shaped handle coupled to one of the load cells and a bail in a raised off position to prevent operation of the propulsion system.
Figure 7:
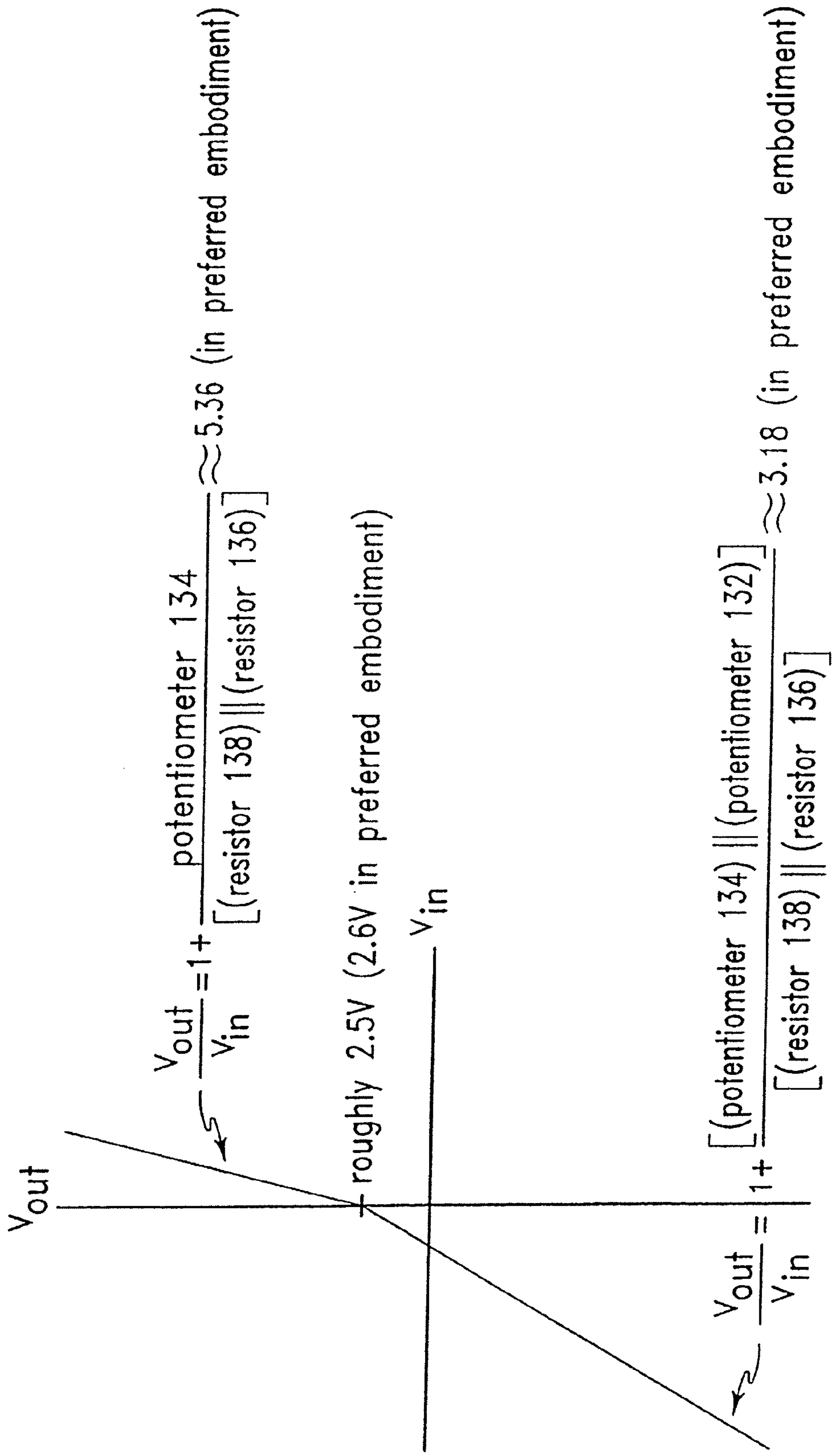
FIG. 7 is a graph depicting the relationship between an input voltage to a gain stage (horizontal axis) and an output voltage to the motor (vertical axis)

The user may push forward on handle 30 to move bed 10 in a forward direction 23 or pull back on handle 30 to move bed 10 in a reverse direction 25. In the preferred embodiment, first input force 39, second input force 41, motor horsepower 47, and actuation force 104 generally are each signed quantities; that is, each may take on a positive or a negative value with respect to a suitable neutral reference. For example, pushing on first handle member 38 of propulsion system 16 in forward direction 23, as shown in FIG. 6A for handle 30, generates a positive first input force 39 with respect to a neutral reference position, as shown in FIG. 5 for handle 30, while pulling on first end 38 in direction 25, as shown in FIG. 6B for preferred handle 30, generates a negative first input force with respect to the neutral position. The deflection shown in FIGS. 6A and 6B is exaggerated for illustration purposes only. In actual use, the deflection of the handle 30 is very slight.

Consequently, first force signal 43 from first user input device 32 and second force signal 45 from second user input device 34 are each correspondingly positive or negative with respect to a suitable neutral reference, which allows speed controller 36 to provide a correspondingly positive or negative speed control signal to motor drive 44. Motor drive 44 then in turn provides a correspondingly positive or negative drive power to motor 42. A positive drive power causes motor 42 to move traction device 26 in a forward direction, while the negative drive power causes motor 42 to move traction device 26 in an opposite reverse direction. Thus, it should be appreciated that a user causes patient support (FIG. 1) to move forward by pushing on handle 30, and causes the patient support to move in reverse by pulling on handle 30.

The speed controller 36 is configured to instruct motor drive 44 to power motor 42 at a reduced speed in a reverse direction as compared to a forward direction. In the illustrative embodiment, the negative drive power 53*a* is approximately one-half the positive drive power 53*b*. More particularly, the maximum forward speed of patient support 10 is between approximately 2.5 and 3.5 miles per hour, while the maximum reverse speed of patient support 10 is between approximately 1.5 and 2.5 miles per hour.

Additionally, speed controller 36 limits both the maximum forward and reverse acceleration of the patient support 10 in order to promote safety of the user and reduce damage to floor 24 as a result of sudden engagement and acceleration by traction device 26. The speed controller 36 limits the maximum acceleration of motor 42 for a predetermined time period upon initial receipt of force signals 43 and 45 by speed controller 36. In the illustrative embodiment, forward direction acceleration shall not exceed 1 mile per hour per second for the first three seconds and reverse direction acceleration shall not exceed 0.5 miles per hour per second for the first three seconds.

The illustrative embodiment provides motor horsepower 47 to traction device 26 proportional to the sum of the first and second input forces from first and second ends 38, 40, respectively, of handle 30. Thus, the illustrative embodiment generally increases the motor horsepower 47 when a user increases the sum of the first input force 39 and the second input force 41, and generally decreases the motor horsepower 47 when a user decreases the sum of the first and second input forces 39 and 41.

Motor horsepower 47 is roughly a constant function of torque and angular velocity. Forces which oppose the advancement of a platform over a plane are generally proportional to the mass of the platform and the incline of the plane. The illustrative embodiment also provides a variable speed control for a load bearing platform having a handle 30 for a user and a motor-driven traction device 26. For example, in relation to the patient support, when the user moves a patient of a particular weight, such as 300 lbs, the user pushes handle 30 of propulsion system 16 (see FIG. 2), and thus imparts a particular first input force 39 to first user input device 32 and a particular second input force 41 to second user input device 34.

The torque component of the motor horsepower 47 provided to traction device 26 assists the user in overcoming the forces which oppose advancement of patient support 10, while the speed component of the motor horsepower 47 ultimately causes patient support 10 to travel at a particular speed. Thus, the user causes patient support 10 to travel at a higher speed by imparting greater first and second input forces 39 and 41 through handle 30 (i.e., by pushing harder) and vice-versa.

The operation of handle 30 and the remainder of input system 20 and the resulting propulsion of patient support 10 propelled by traction device 26 provide inherent feedback (not shown) to propulsion system 16 which allows the user to easily cause patient support 10 to move at the pace of the user so that propulsion system 16 tends not to "outrun" the user. For example, when a user pushes on handle 30 and causes traction device 26 to move patient support 10 forward, patient support 10 moves faster than the user which, in turn, tends to reduce the pushing force applied on handle 30 by the user. Thus, as the user walks (or runs) behind patient support 10 and pushes against handle 30, patient support 10 tends to automatically match the pace of the user. For example, if the user moves faster than the patient support, more force will be applied to handle 30 and causes traction device 26 to move patient support 10 faster until patient support 10 is moving at the same speed as the user. Similarly, if patient support 10 is moving faster than the user, the force applied to handle 30 will reduce and the overall speed of patient support 10 will reduce to match the pace of the user.

The illustrative embodiment also provides coordination between the user and patient support 10 propelled by traction device 26 by varying the motor horsepower 47 with differential forces applied to handle 30, such as are applied by a user when pushing or pulling patient support 10 around a corner. The typical manner of negotiating a turn involves pushing on one end of handle 30 with greater force than on the other end, and for sharp turns, typically involves pulling on one end while pushing on the other. For example, when the user pushes patient support 10 straight ahead, the forces applied to first end 38 and second end 40 of handle 30 are roughly equal in magnitude and both are positive; but when the user negotiates a turn, the sum of the first force signal 43 and the second force signal 45 is reduced, which causes reduced motor horsepower 47 to be provided to traction device 26. This reduces the motor horsepower 47 provided to traction device 26, which in turn reduces the velocity of patient support 10, which in turn facilitates the negotiation of the turn.

It is further envisioned that a second traction device (not shown) may be provided and driven independently from the first traction device 26. The second traction device would be laterally offset from the first traction device 26. The horsepower provided to the second traction device would be weighted in favor of the second force signal 45 to further facilitate negotiating of turns.

Figure 4A:
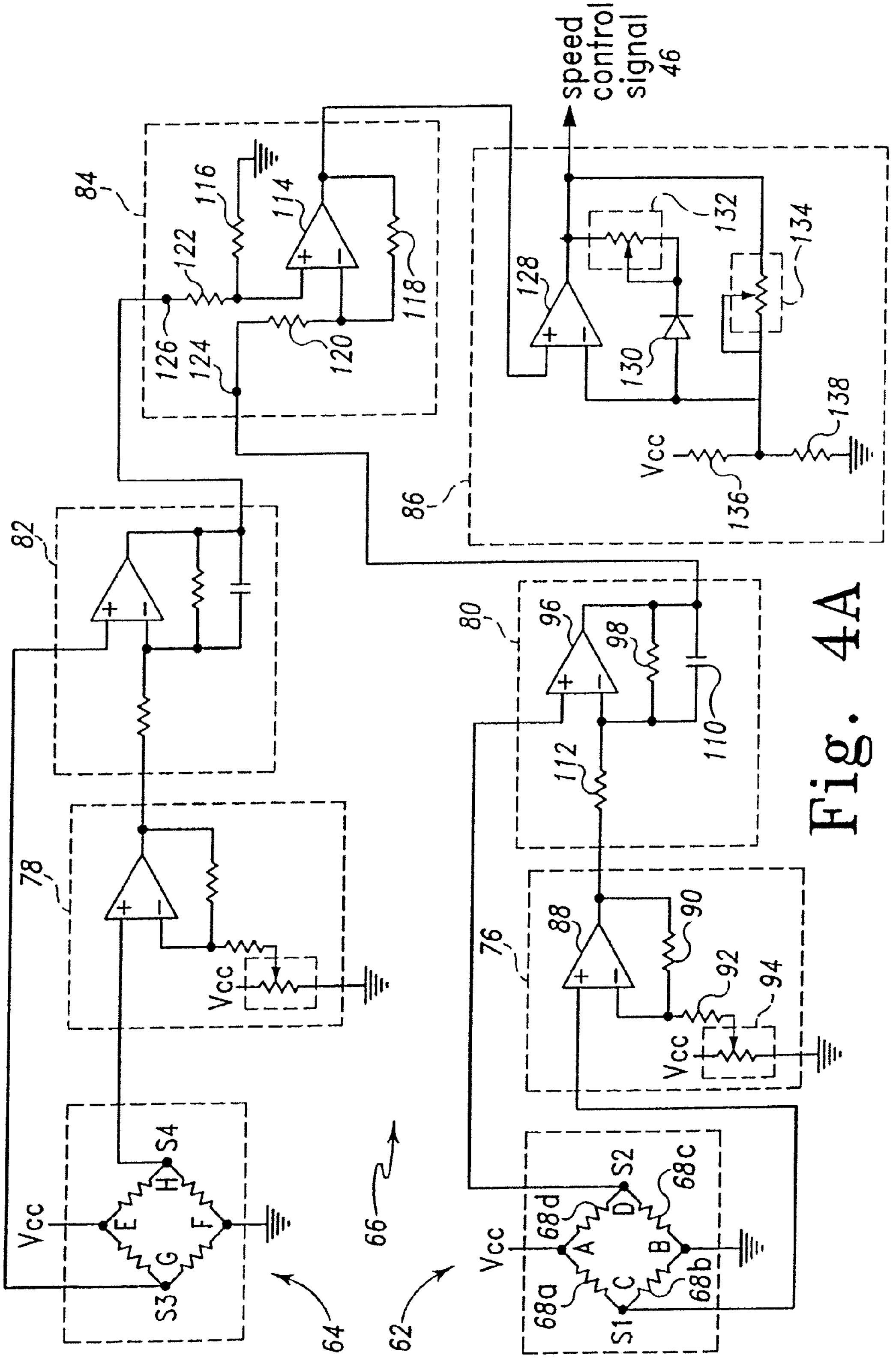
FIG. 4A is a schematic diagram showing an illustrative input system of the control system of FIG. 2.

Next, FIG. 4A is an electrical schematic diagram showing selected aspects of one embodiment of input system 20 of propulsion system 17 of FIG. 2. In particular, FIG. 4A depicts a first load cell 62, a second load cell 64, and a summing control circuit 66. Regulated 8.5 V power ("Vcc") to these components is supplied by the illustrative embodiment of power reservoir 48 as discussed above in connection with FIG. 2. First load cell 62 includes four strain gauges illustrated as resistors: gauge 68*a*, gauge 68*b*, gauge 68*c*, and gauge 68*d*. As shown in FIG. 4A, these four gauges 68*a*, 68*b*, 68*c*, 68*d* are electrically connected within load cells 62, 64 to form a Wheatstone bridge.

In one embodiment, each of the load cells 62, 64 is a commercially available HBM Co. Model No. MED-400 06101. These load cells 62, 64 of FIG. 4A are an embodiment of first and second user input devices 32, 34 of FIG. 2. According to alternative embodiments, the user inputs are other elastic or sensing elements configured to detect the force on the handle, deflection of the handle, or other position or force related characteristics.

In a manner which is well known, Vcc is electrically connected to node A of the bridge, ground (or common) is applied to node B, a signal S1 is obtained from node C, and a signal S2 is obtained from node D. The power to second load cell 64 is electrically connected in like fashion to first load cell 62. Thus, nodes E and F of second load cell 64 correspond to nodes A and B of first load cell 62, and nodes G and H of second load cell 64 correspond to nodes C and D of first load cell 62. However, as shown, signal S3 (at node G) and signal S4 (at node H) are electrically connected to summing control circuit 66 in reverse polarity as compared to the corresponding respective signals S1 and S2.

Summing control circuit 66 of FIG. 4A is one embodiment of the speed controller 36 of FIG. 2. Accordingly, it should be readily appreciated that a first differential signal (S1–S2) from first load cell 62 is one embodiment of the first force signal 43 discussed above in connection with FIG. 2, and, likewise, a second differential signal (S3–S4) from second load cell 64 is one embodiment of the second force signal 45 discussed above in connection with FIG. 2. The summing control circuit 66 includes a first buffer stage 76, a second buffer stage 78, a first pre-summer stage 80, a second pre-summer stage 82, a summer stage 84, and a directional gain stage 86.

First buffer stage 76 includes an operational amplifier 88, a resistor 90, a resistor 92, and a potentiometer 94 which are electrically connected to form a high input impedance, noninverting amplifier with offset adjustability as shown. The noninverting input of operational amplifier 88 is electrically connected to node C of first load cell 62. Resistor 90 is very small relative to resistor 92 so as to yield practically unity gain through buffer stage 76. Accordingly, resistor 90 is 1 k ohm, and resistor 92 is 100 k ohm. Potentiometer 94 allows for calibration of summing control circuit 66 as discussed below. Accordingly, potentiometer 94 is a 20 k ohm linear potentiometer. It should be readily understood that second buffer stage 78 is configured in identical fashion to first buffer stage 76; however, the noninverting input of the operational amplifier in the second buffer stage 78 is electrically connected to node H of second load cell 64 as shown.

First pre-summer stage 80 includes an operational amplifier 96, a resistor 98, a capacitor 110, and a resistor 112 which are electrically connected to form an inverting amplifier with low pass filtering as shown. The noninverting input of operational amplifier 96 is electrically connected to the node D of first load cell 62. Resistor 98, resistor 112, and capacitor 110 are selected to provide a suitable gain through first pre-summer stage 80, while providing sufficient noise filtering. Accordingly, resistor 98 is 110 k ohm, resistor 112 is 1 k ohm, and capacitor 110 is 0.1 μF. It should be readily appreciated that second pre-summer stage 82 is configured in identical fashion to first pre-summer stage 80; however, the noninverting input of the operational amplifier in second pre-summer stage 82 is electrically connected to node G of second load cell 64 as shown.

Summer stage 84 includes an operational amplifier 114, a resistor 116, a resistor 118, a resistor 120, and a resistor 122 which are electrically connected to form a differential amplifier as shown. Summer stage 84 has a inverting input 124 and a noninverting input 126. Inverting input 124 is electrically connected to the output of operational amplifier 96 of first pre-summer stage 80 and noninverting input 126 is electrically connected to the output of the operational amplifier of second pre-summer stage 82. Resistor 116, resistor 118, resistor 120, and resistor 122 are selected to provide a roughly balanced differential gain of about 10. Accordingly, resistor 116 is 100 k ohm, resistor 118 is 100 k ohm, resistor 120 is 10 k ohm, and resistor 122 is 12 k ohm. If an ideal operational amplifier is used in the summer stage, resistors 120, 122 would have the same value (for example, 12 K ohms) so that both the noninverting and inverting inputs of the summer stage are balanced; however, to compensate for the slight imbalance in the actual noninverting and inverting inputs, resistors 120, 122 are slightly different in the illustrative embodiment.

Directional gain stage 86 includes an operational amplifier 128, a diode 130, a potentiometer 132, a potentiometer 134, a resistor 136, and a resistor 138 which are electrically connected to form a variable gain amplifier as shown. The noninverting input of operational amplifier 128 is electrically connected to the output of operational amplifier 114 of summer stage 84. Potentiometer 132, potentiometer 134, resistor 136, and resistor 138 are selected to provide a gain through directional gain stage 86 which varies with the voltage into the noninverting input of operational amplifier 128 generally according to the relationship between the voltage out of operational amplifier 128 and the voltage into the noninverting input of operational amplifier 128 as depicted in FIG. 4A. Accordingly, potentiometer 132 is trimmed to 30 k ohm, potentiometer 134 is trimmed to 30 k ohm, resistor 136 is 22 k ohm, and resistor 138 is 10 k ohm. All operational amplifiers are preferably National Semiconductor type LM258 operational amplifiers.

In operation, the components shown in FIG. 4A provide the speed control signal 46 to motor drive 44 generally in the following manner. First, the user calibrates speed controller 36 (FIG. 2) to provide the speed control signal 46 within limits that are consistent with the configuration of motor drive 44. As discussed above in the illustrative embodiment, motor drive 44 responds to a voltage input range from roughly 0.3 VDC (for full reverse motor drive) to roughly 4.7 VDC (for full forward motor drive) with roughly 2.3-2.7 VDC input null reference/deadband (corresponding to zero motor speed). Thus, with no load on first load cell 62, the user adjusts potentiometer 94 of first buffer stage 76 to generate 2.5 V at inverting input 124 of summer stage 84, and with no load on second load cell 64, the user adjusts the corresponding potentiometer in second buffer stage 78 to generate 2.5 V at noninverting input 126 of summer stage 84.

The no load condition occurs when the user is neither pushing nor pulling handle 30 as shown in FIGS. 1 and 5. A voltage of 2.5 V at inverting input 124 of summer stage 84 and 2.5 V at noninverting input 126 of summer stage 84 (simultaneously) causes summer stage 84 to generate very close to 0 V at the output of operational amplifier 114 (the input of operational amplifier 128 of the directional gain stage 86), which in turn causes directional gain stage 86 to generate a roughly 2.5 V speed control signal on the output of operational amplifier 128. Thus, by properly adjusting the potentiometers of first and second buffer stages 76, 78, the user ensures that no motor horsepower is generated at no load conditions.

Calibration also includes setting the desirable forward and reverse gains by adjusting potentiometer 132 and potentiometer 134 of directional gain stage 86. To this end, it should be appreciated that diode 130 becomes forward biased when the voltage at the noninverting input of operational amplifier 128 begins to drop sufficiently below the voltage at the inverting input of operational amplifier 128. Further, it should be appreciated that the voltage at the inverting input of operation amplifier 128 is roughly 2.5 V as a result of the voltage division of the 8.5 V Vcc between resistor 136 and resistor 138.

As depicted in FIG. 4A, directional gain stage 86 may be calibrated to provide a relatively higher gain for voltages out of differential stage 84 which exceed the approximate 2.5 V null reference/deadband of motor drive 44 than it provides for voltages out of differential stage 84 which are less than roughly 2.5 V. Thus, the user calibrates directional gain stage 86 by adjusting potentiometer 132 and potentiometer 134 as desired to generate more motor horsepower per unit force on handle 30 in the forward direction than in the reverse direction. Patient supports are often constructed such that they are more easily moved by pulling them in reverse than by pushing them forward. The variable gain calibration features provided in directional gain stage 86 tend to compensate for the directional difference.

After calibration, the user ensures that external power input 50 (FIG. 2) is not connected to a power line, and then places casters 22 into a steer mode through operation of pedal 61 which causes caster mode detector 54 to generate a representative signal 56. In response, an illustrative embodiment of traction engagement controller 28 provides an actuation force 104 which causes an illustrative embodiment of traction device 26 to contact floor 24. Next, the user inputs an enable command through third user input device 35 (activates a switch). Then, the user pushes or pulls on first handle member 38 and/or second handle member 40, which imparts a first input force 39 to first load cell 62 and/or a second input force 41 to second load cell 64, causing a first differential signal (S1−S2) and/or a second differential signal (S3−S4) to be transmitted to first pre-summer stage 80 and/or second pre-summer stage 82, respectively. Although first load cell 62 and second load cell 64 are electrically connected in relatively reversed polarities, summer stage 84 effectively inverts the output of second pre-summer stage 82, which provides that the signs of the forces imparted to first member 38 and second member 40 of handle 30 are ultimately actually consistent relevant to the actions of pushing and/or pulling patient support 10 of FIG. 1.

First buffer stage 76 and second buffer stage 78 facilitate obtaining first differential signal (S1−S2) and second differential signal (S3−S4) from first load cell 62 and second load cell 64. The differential signals from the Wheatstone bridges of load cells 62, 64 reject signals which might otherwise be undesirably generated by torsional type pushing or pulling on members 38, 40 of handle 30. Thus, the user can increase the magnitude of the sum of the forces imparted to first and second handle members 38, 40, respectively, to increase the speed control signal 46 or decrease the magnitude of the sum to decrease the speed control signal 46. These changes in the speed control signal 46 cause traction device 26 to propel patient support 10 in either the forward or reverse direction as desired.

Figure 4B:
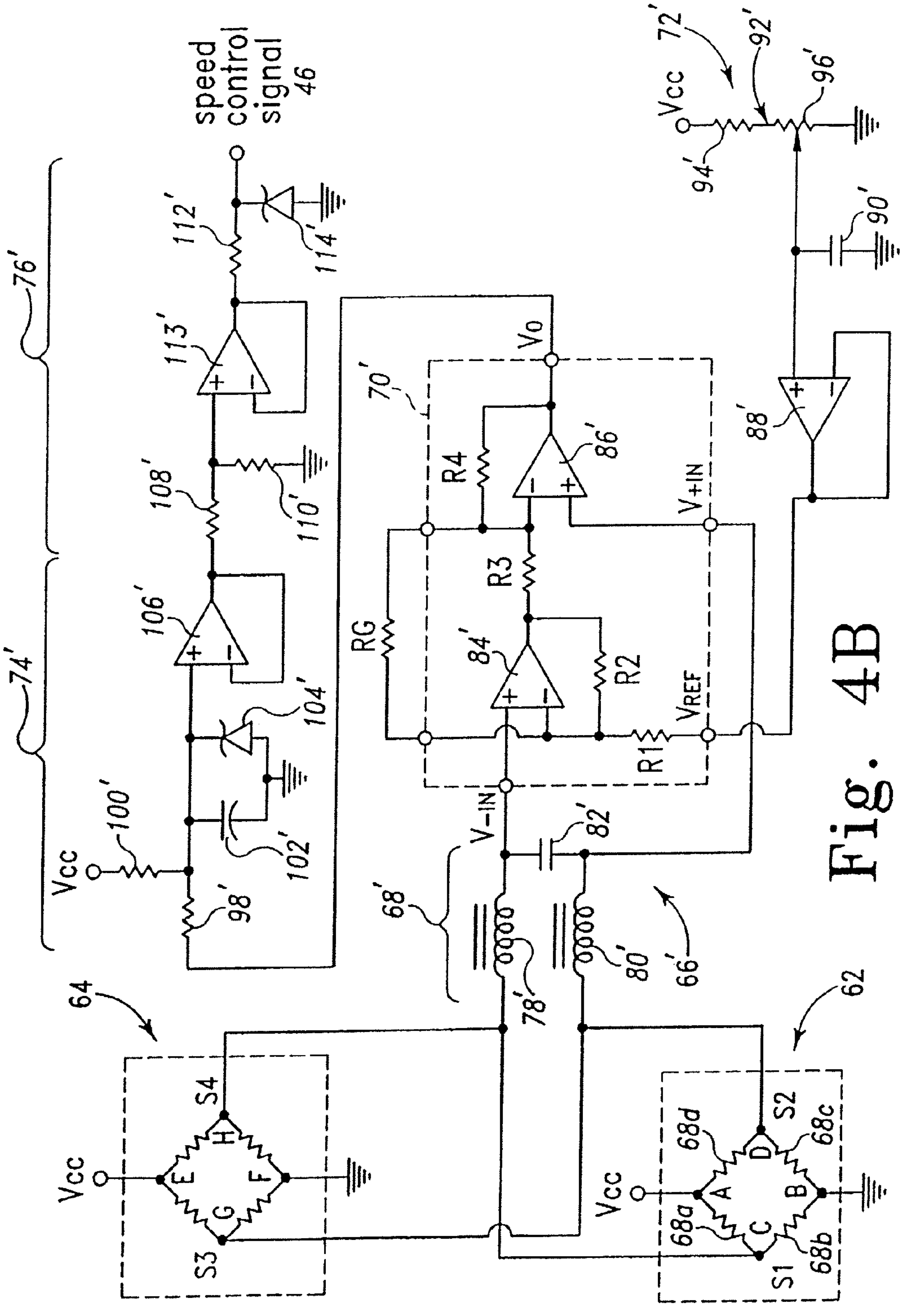
FIG. 4B is a schematic diagram showing a further illustrative input system of the control system of FIG. 2.

FIG. 4B shows an alternate embodiment of aspects of input system 20 of propulsion system 17 of FIG. 2. Like the circuit of FIG. 4A, the circuit of FIG. 4B includes first load cell 62 and second load cell 64, both of which are identical to those described above. The circuit of FIG. 4B further includes a summing control circuit 66' for generating the speed control signal described above. Summing control circuit 66' generally includes a noise filtering stage 68', an instrumentation amplifier 70', a voltage reference circuit 72', a first buffering stage 74', and a second buffering stage 76'.

Noise filtering stage 68' includes a first inductor 78', which is connected at one end to signal S1 from node C of first load cell 62 and signal S4 from node H of second load cell 64, and a second inductor 80', which is connected at one end to signal S2 from node D of first load cell 62 and signal S3 from node G of second load cell 64. The other end of first inductor 78' is connected to the negative input pin ($V_{-IN}$) of instrumentation amplifier 70' and to one side of capacitor 82'. Similarly, the other end of second inductor 80' is connected to the positive input pin ($V_{+IN}$) of instrumentation amplifier 70' and to the other side of capacitor 82'.

Instrumentation amplifier 70' is a commonly available precision instrumentation amplifier for measuring low noise differential signals such as an INA 122 amplifier manufactured by Texas Instruments and other integrated circuit manufacturers. Instrumentation amplifier 70' includes two internal operational amplifiers 84', 86' connected to one another and to internal resistors R1-R4 in the manner shown in FIG. 4B. External resistor $R_G$ is connected between the inverting inputs of operational amplifiers 84', 86' and establishes the gain of instrumentation amplifier 70' according to the equation GAIN=5+(200K/$R_G$). In one embodiment of the invention, $R_G$ is 73.2 ohms. The output voltage ($V_O$) of instrumentation amplifier 70' conforms to the equation $V_O$=($V_{+IN}$ (−)$V_{-IN}$) GAIN).

As shown in FIG. 4B, the reference voltage input ($V_{REF}$) of instrumentation amplifier 70' is connected to the output of voltage reference circuit 72'. Voltage reference circuit 72' includes operational amplifier 88', capacitor 90', and voltage divider circuit 92' connected to the noninverting input of amplifier 88' as shown. According to one embodiment of the invention, the resistors 94', 96' of voltage divider circuit 92' are selected to provide a +2.5 volt output from amplifier 88'. Accordingly, in such an embodiment, $V_{REF}$=+2.5 volts, and $V_O$ of instrumentation amplifier 70' varies above and below +2.5 volts depending upon the polarity of the difference between the positive and negative inputs, $V_{+IN}$ and $V_{-IN}$, respectively.

First buffering stage 74' includes resistors 98' and 100', capacitor 102', diode 104' and amplifier 106' connected in the manner shown in FIG. 4B. Second buffering stage 76' includes resistors 108', 110', and 112', operational amplifier 113', and diode 114' connected in the manner shown in FIG. 4B. The output of second buffering stage 76' corresponds to speed control signal 46 of FIG. 2. The configuration and component values of first and second buffering stages 74', 76' provide isolation between the output of instrumentation amplifier 70' and the input to motor drive 44 (FIG. 2) according to well-known principles in the art.

In operation, when the user is neither pushing nor pulling handle 30 (i.e., under no load conditions as shown in FIGS. 1 and 5), the output of instrumentation amplifier 70' ($V_O$) is +2.5 volts because $V_{+IN}$=$V_{-IN}$, and no horsepower is generated at motor drive 44. When the user places casters 22 into a steer mode through operation of pedal 61, causing traction device 26 to contact floor 24, and inputs an enable command through third user input device 35, the user may push or pull on first handle member 38 and/or second handle member 40 to move patient support 10. Specifically, the forces 39, 41 applied to first and second load cells 62, 64, respectively, cause voltages at nodes C, D, G, and H that combine to result in either a positive $V_O$ from instrumentation amplifier 70' or a negative $V_O$ from instrumentation amplifier 70'. As indicated above, $V_O$ (once passed through buffering stages 74', 76') corresponds to speed control signal 46. The polarity and magnitude of speed control signal 46 determines the direction and speed of patient support 10 as described in detail above.

The input system of the present disclosure may be used on motorized support frames other than beds. For example, the input system may be used on carts, pallet movers, or other support frames used to transport items from one location to another.

As shown in FIGS. 1, 5, 6A, and 6B, each load cell 62, 64 is directly coupled to bedframe 12 by a bolt 140 extending through a plate 142 of bedframe 12 into each load cell 62, 64. First and second handle members 38, 40 of handle 30 are coupled to respective load cells 62, 64 by bolts 71 so that handle 30 is coupled to bedframe 12 through load cells 62, 64.

An embodiment of third user input device 35 is shown in FIGS. 1, 5, 6A, 6B, 15, and 16. Input device 35 includes a bail 75 pivotally coupled to a lower portion of handle 30, a spring mount 73 coupled to first handle member 38 of handle 30, a pair of loops 79, 81 coupled to bail 75, and a spring 83 coupled to spring mount 73 and loop 79. Bail 75 and loops 79, 81 are pivotable between an on/enable position, shown in FIGS. 6A and 6B, and an off/disable position as shown in FIG. 5.

User input device 35 further includes a pair of pins 89 coupled to handle 30 to limit the range of motion of loops 79, 81 and bail 75. When bail 75 is in the on/enable position, the weight of bail 75 acts against the bias provided by spring 83. However, if a slight force is applied against bail 75 in direction of arrow 91, spring 83 with the assistance of said force will pull bail 75 to the off/disable position to shut down propulsion system 16. Thus, if bail 75 if accidentally bumped, bail 75 will flip to the off/disable position to disable use of propulsion system 16. According to alternative embodiments of the present disclosure, spring 83 is coupled to the upper arm of loop 79.

Figure 15:
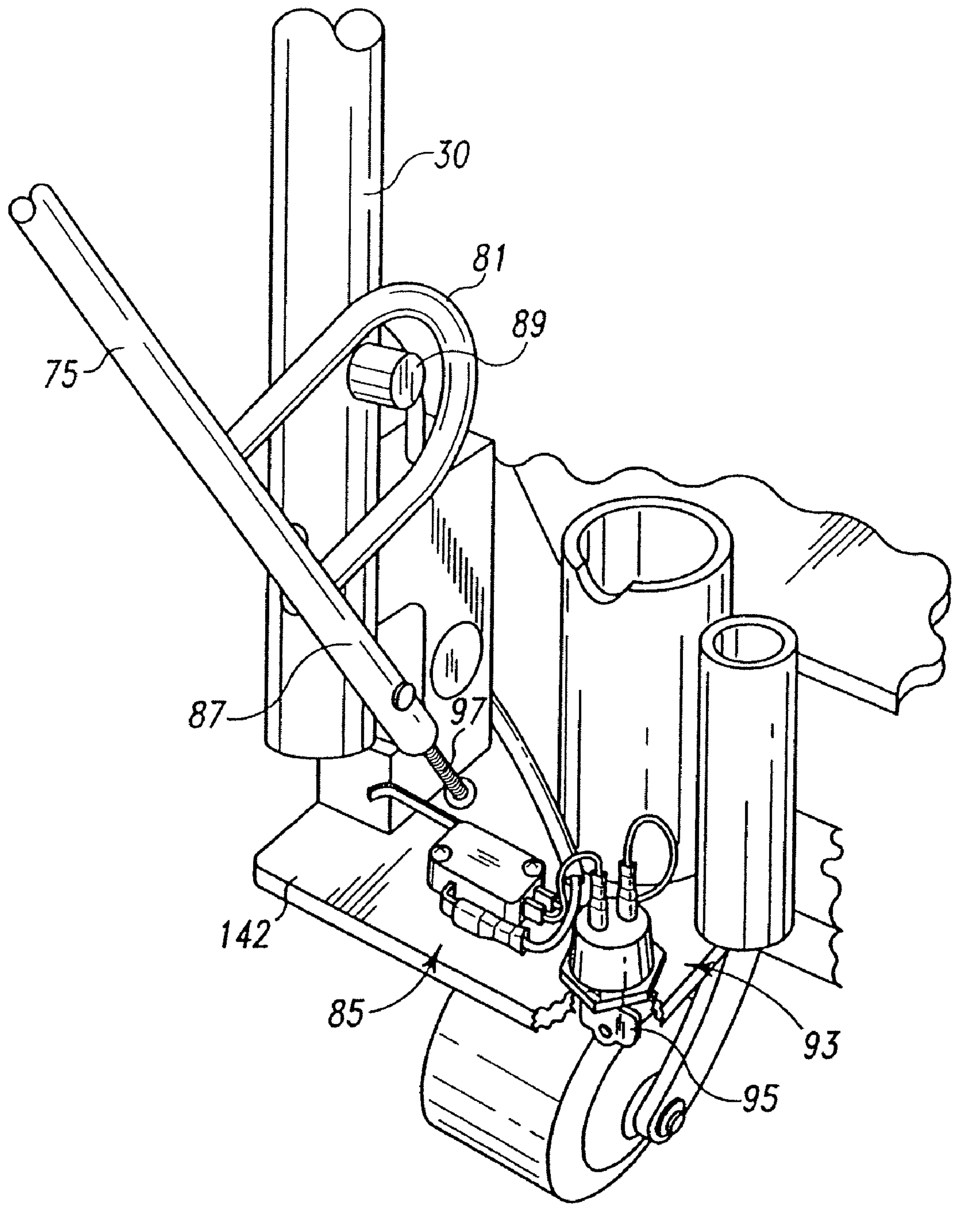
FIG. 15 is a perspective view of a relay switch and keyed lockout switch for controlling enablement of the propulsion device showing a pin coupled to the bail spaced apart from the relay switch to enable the propulsion device.

User input device 35 further includes a relay switch 85 positioned adjacent a pin 97 coupled to first end 87 of bail 75 and a keyed lockout switch 93 coupled to plate 142 as shown in FIG. 15. Relay switch 85 and keyed lockout switch 93 are coupled in series to provide the enable and disable commands. Keyed lockout switch 93 must be turned to an "on" position by a key 95 for an enable command and relay switch must be in a closed position for an enable command. It should be appreciated that the keyed lockout switch 93 is optional and may be eliminated if not desired.

Figure 16:
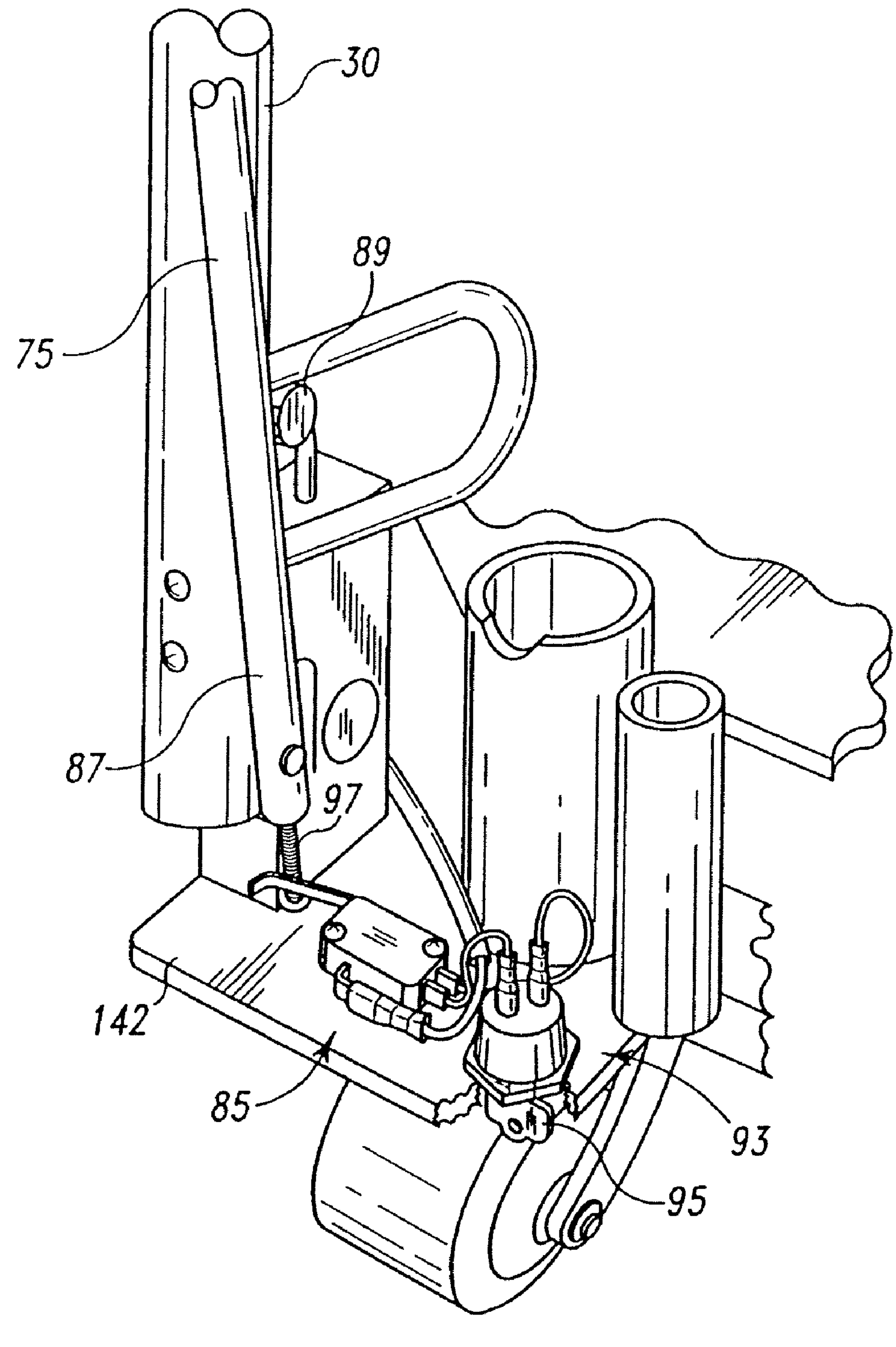
FIG. 16 is a view similar to FIG. 15 showing the pin in contact with the relay switch to disable the propulsion device from operating.
Figure 17:
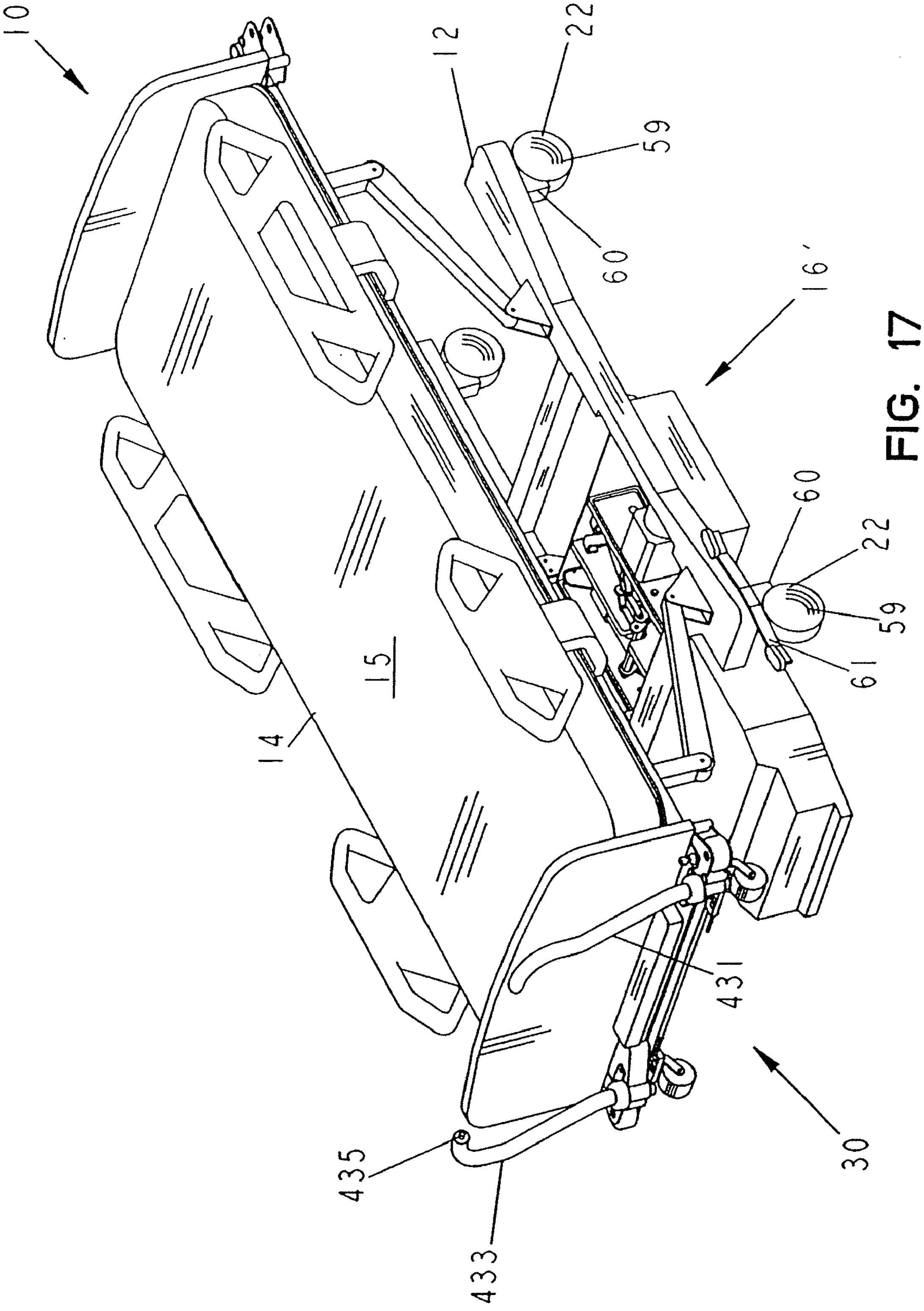
FIG. 17 is a perspective view of a second embodiment hospital bed showing the bed including a bedframe, a second embodiment propulsion device coupled to the bottom of the bedframe, and a pair of spaced-apart handles coupled to the bedframe through a pair of load cells for controlling the propulsion device.
Figure 18:
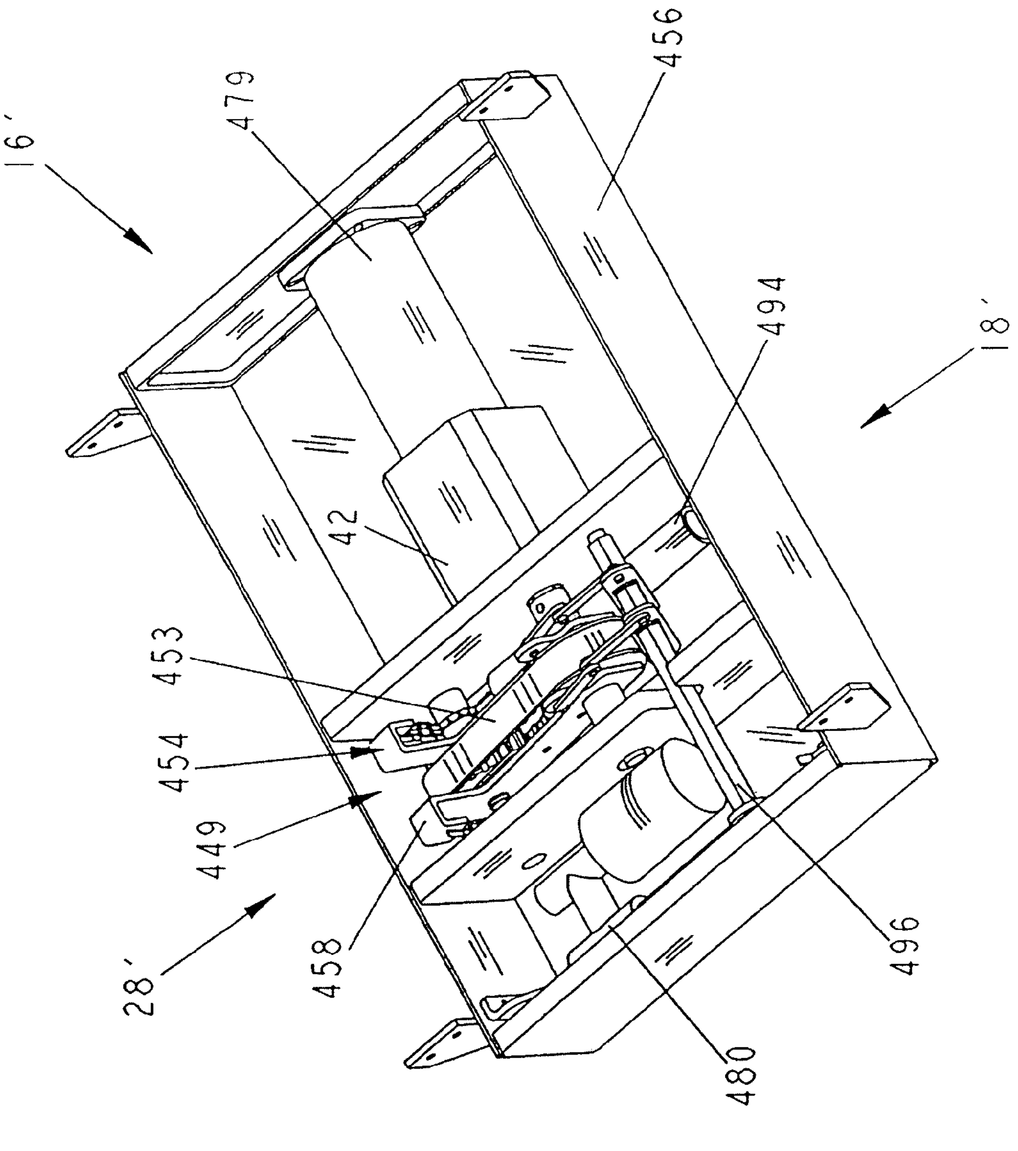
FIG. 18 is a perspective view showing the second embodiment propulsion device including a traction belt supported by a belt mount, an actuator, an arm coupled to the actuator, and a biasing device coupled to the arm and the belt mount.
Figure 19:
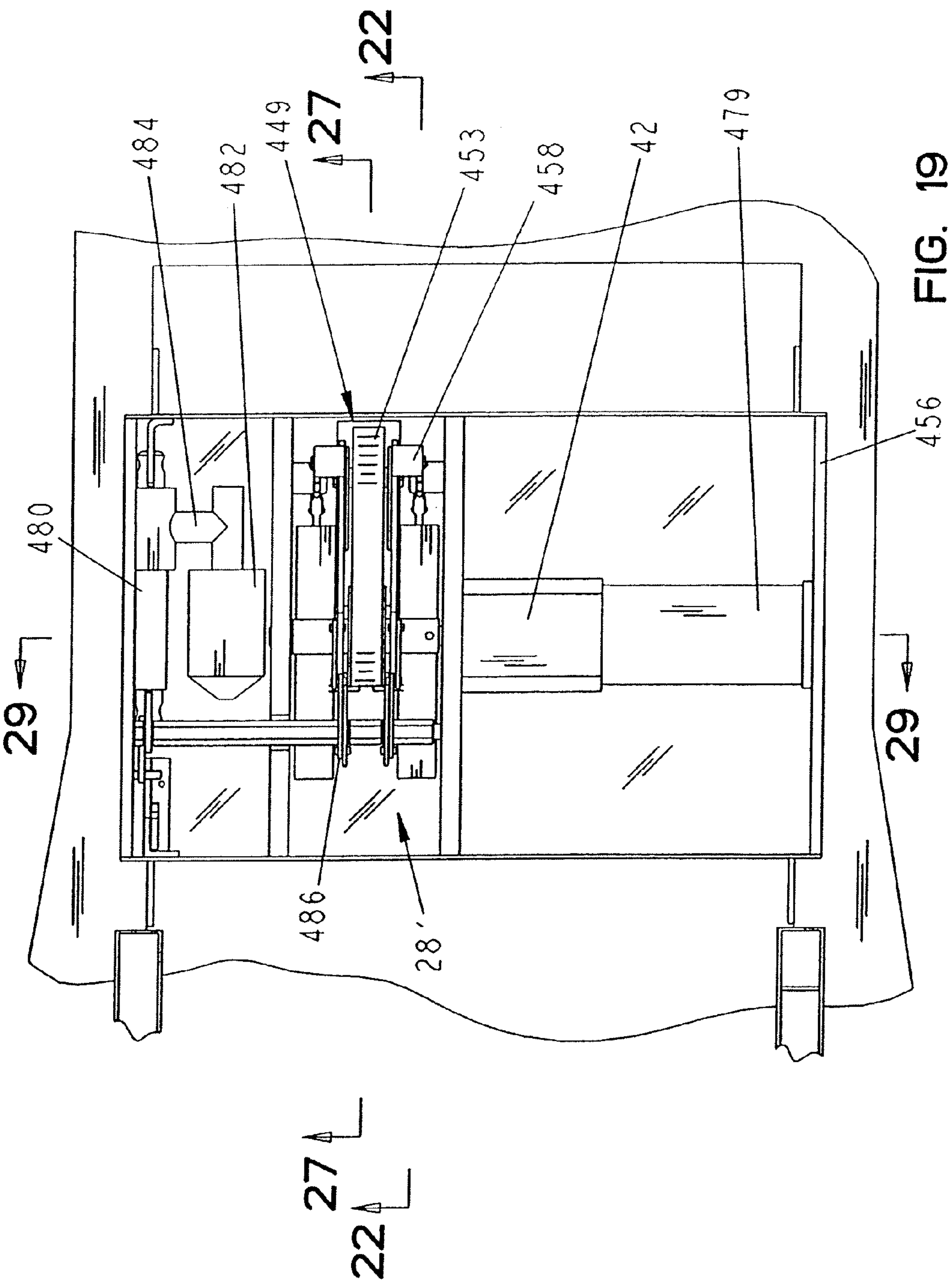
FIG. 19 is a top plan view of the of the propulsion device of FIG. 18.
Figure 20:
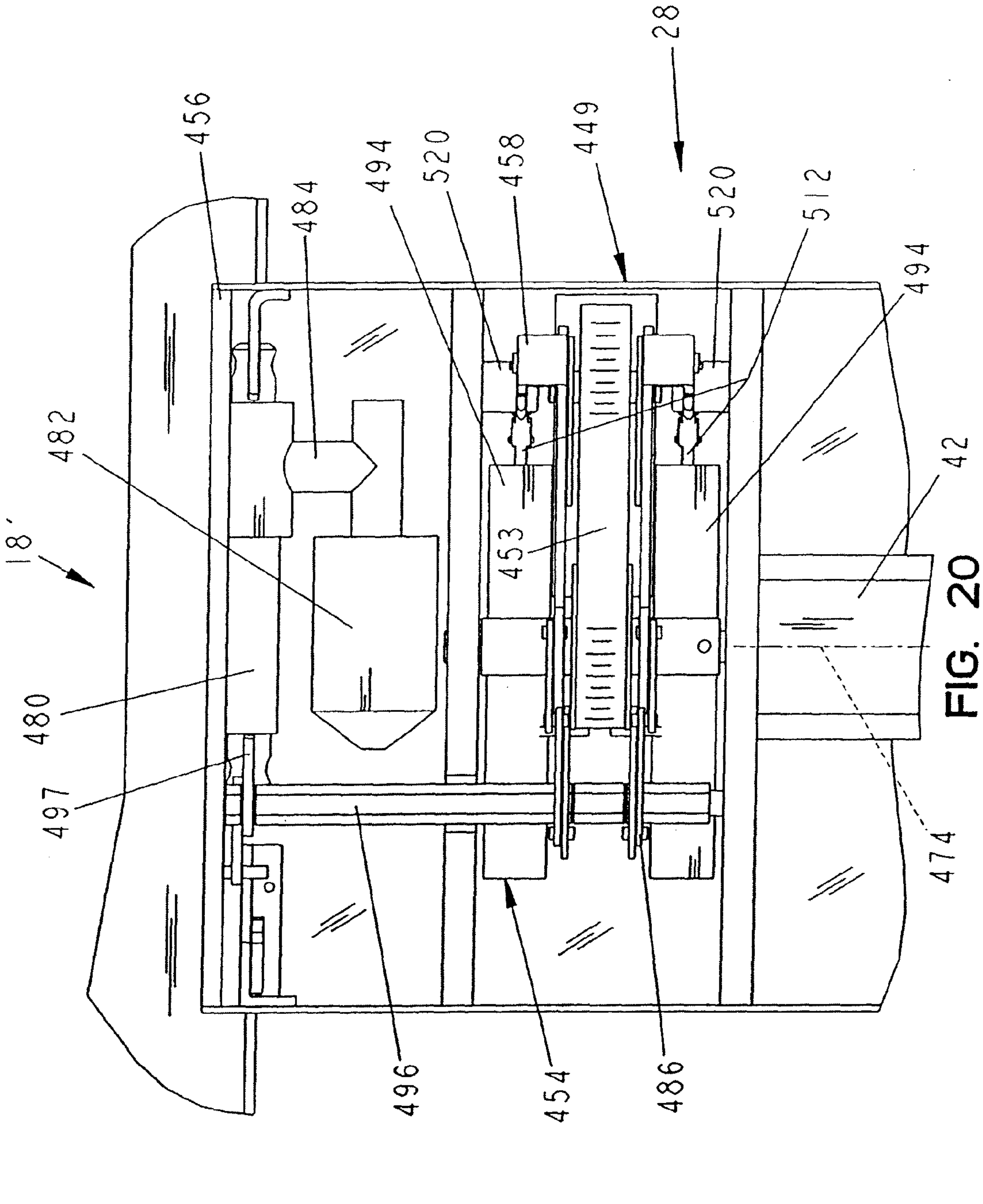
FIG. 20 is a detail view of FIG. 19.

When bail 75 moves to the disable position as shown in FIG. 16, pin 97 moves switch 85 to an open position to generate a disable command. When bail 75 moves to the enable position as shown in FIG. 15, pin 97 moves away from switch 85 to permit switch 85 to move to the closed position to generate an enable command when keyed lockout switch 93 is in the on position permitting lowering of the illustrative embodiment of traction device 26 into contact with floor 24. Thus, if bail 75 is moved to the raised/disable position or key 95 is not in keyed lockout switch 93 or not turned to the "on" position, traction device 26 will not lower into contact with floor 24.

User input device 35 further includes a pair of pins 89 coupled to handle 30 to limit the range of motion of loops 79, 81 and bail 75. When bail 75 is in the on/enable position, the weight of bail 75 acts against the bias provided by spring 83. However, if a slight force is applied against bail 75 in direction 91, spring 83 with the assistance of said force will pull bail 75 to the off/disable position to shut down propulsion system 16. Thus, if bail 75 if accidentally bumped, bail 75 will flip to the off/disable position to disable use of propulsion system 16. For example, if a caregiver leans over the headboard to attend to a patient, the caregiver would likely bump bail 75 causing it to flip to the off/disable position. Thus, even if the caregiver applies force to handle 30 while leaning over the headboard, propulsion device 18 will not operate.

An illustrative embodiment propulsion device 18 is shown in FIGS. 1 and 8-14. Propulsion device 18 includes an illustrative embodiment traction device 26 comprising a wheel 150, an illustrative embodiment traction engagement controller 28 comprising a traction device mover, illustratively a wheel lifter 152, and a chassis 151 coupling wheel lifter 152 to bedframe 12. According to alternative embodiments as described in greater detail below, other traction devices or rolling supports such as multiple wheel devices, track drives, or other devices for imparting motion to a patient support are used as the traction device. Furthermore, according to alternative embodiments, other configurations of traction engagement controllers are provided, such as the wheel lifter described in U.S. Pat. Nos. 5,348,326 to Fullenkamp, et al., 5,806,111 to Heimbrock, et al., and 6,330,926 to Heimbrock, et al., the disclosures of which are expressly incorporated by reference herein.

Figure 8:
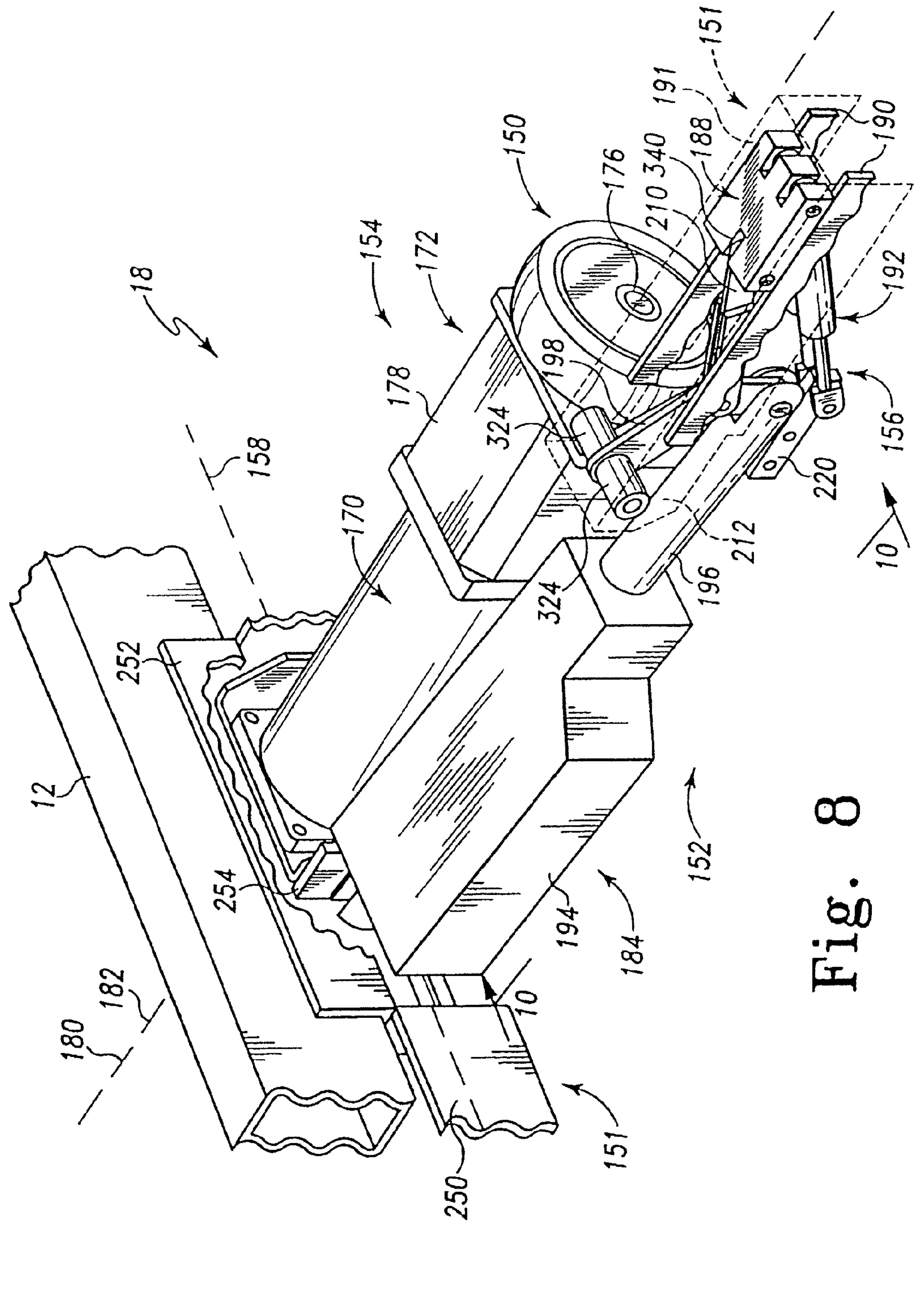
FIG. 8 is a perspective view showing a propulsion device including a wheel coupled to a wheel mount, a linear actuator, a pair of links coupled to the linear actuator, a shuttle coupled to one of the links, and a pair of gas springs coupled to the shuttle and the wheel mount.
Figure 10:
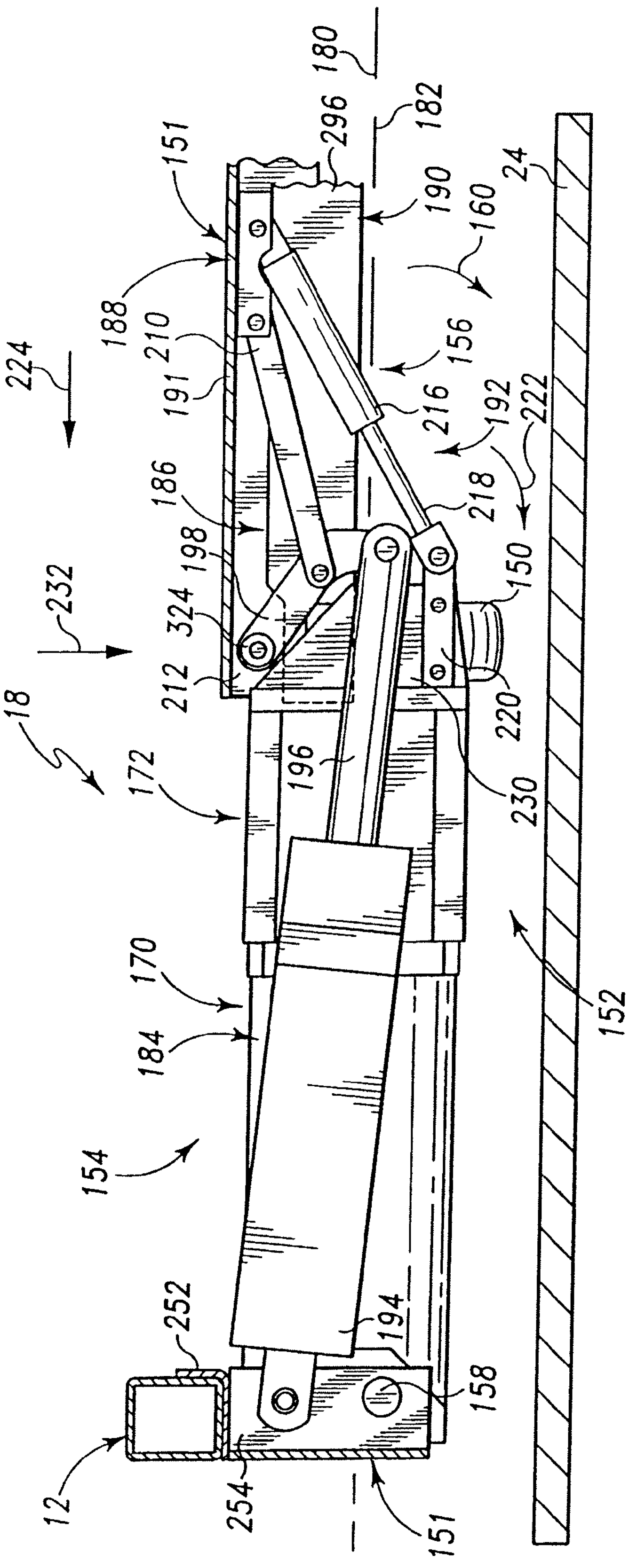
FIG. 10 is a sectional view taken along lines 10-10 of FIG. 8 showing the propulsion device with the wheel spaced apart from the floor.
Figure 11:
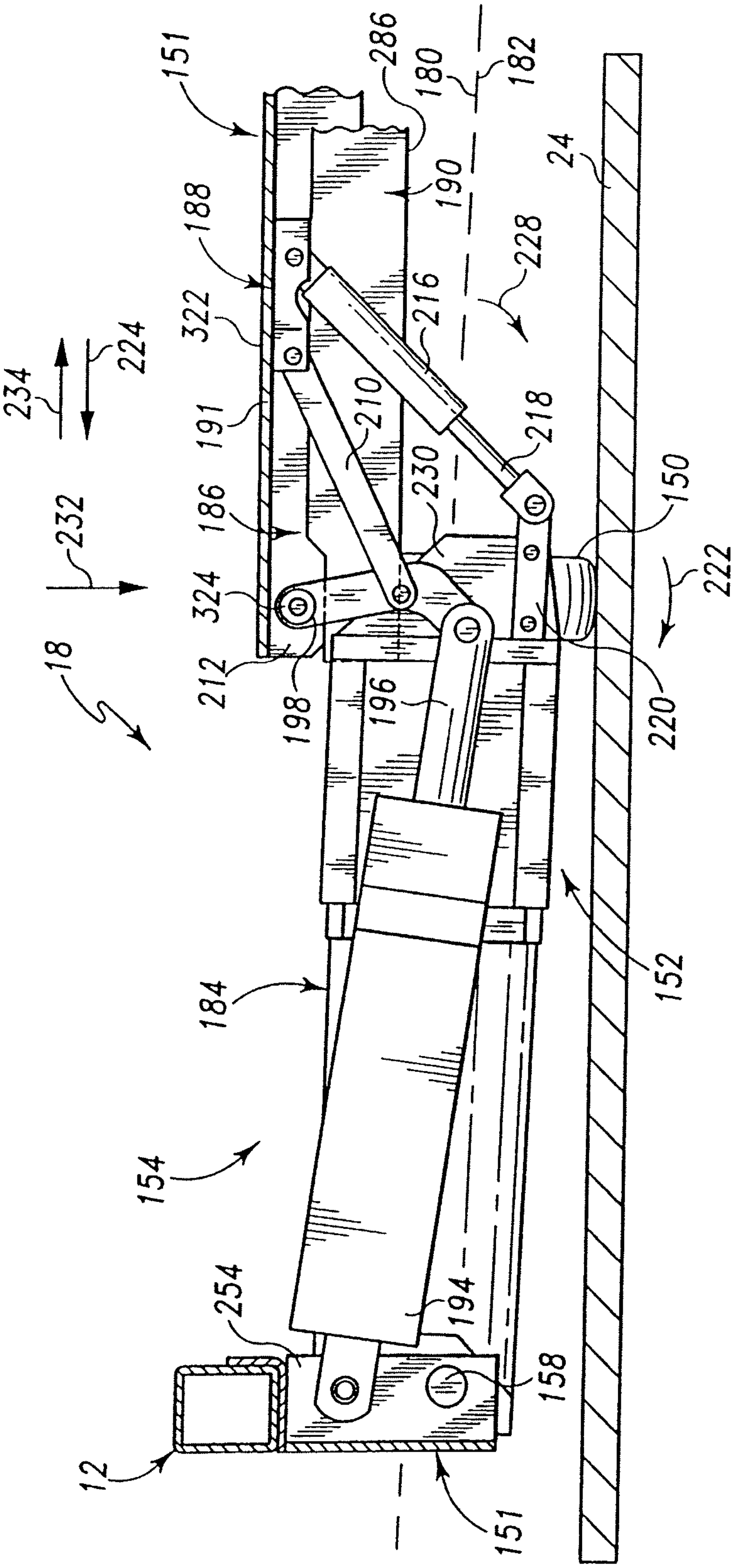
FIG. 11 is a view similar to FIG. 10 showing the linear actuator having a shorter length than in FIG. 10 with the shuttle pulled to the left through the action of the links, and movement of the shuttle moving the wheel into contact with the floor.
Figure 12:
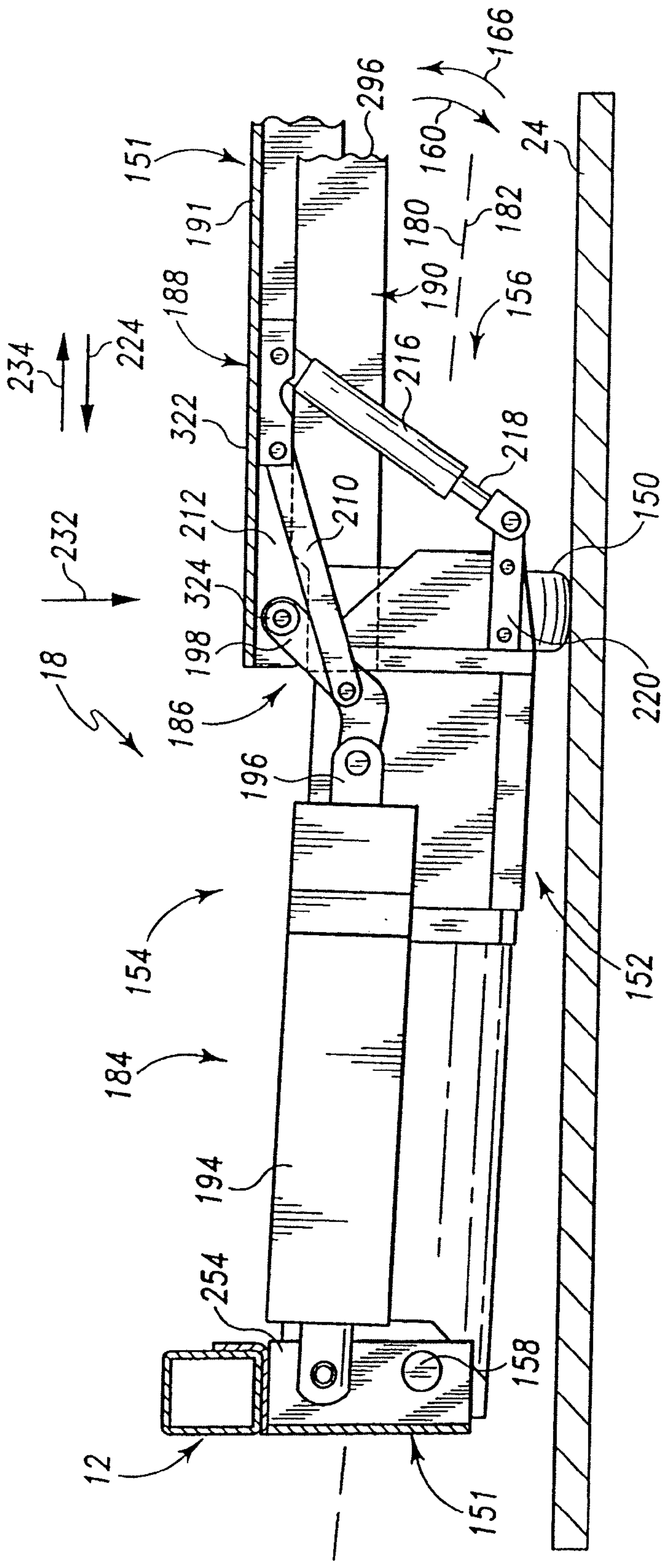
FIG. 12 is a view similar to FIG. 10 showing the linear actuator having a shorter length than in FIG. 11 with the shuttle pulled to the left through the action of the links, and additional movement of the shuttle compressing the gas springs.
Figure 13:
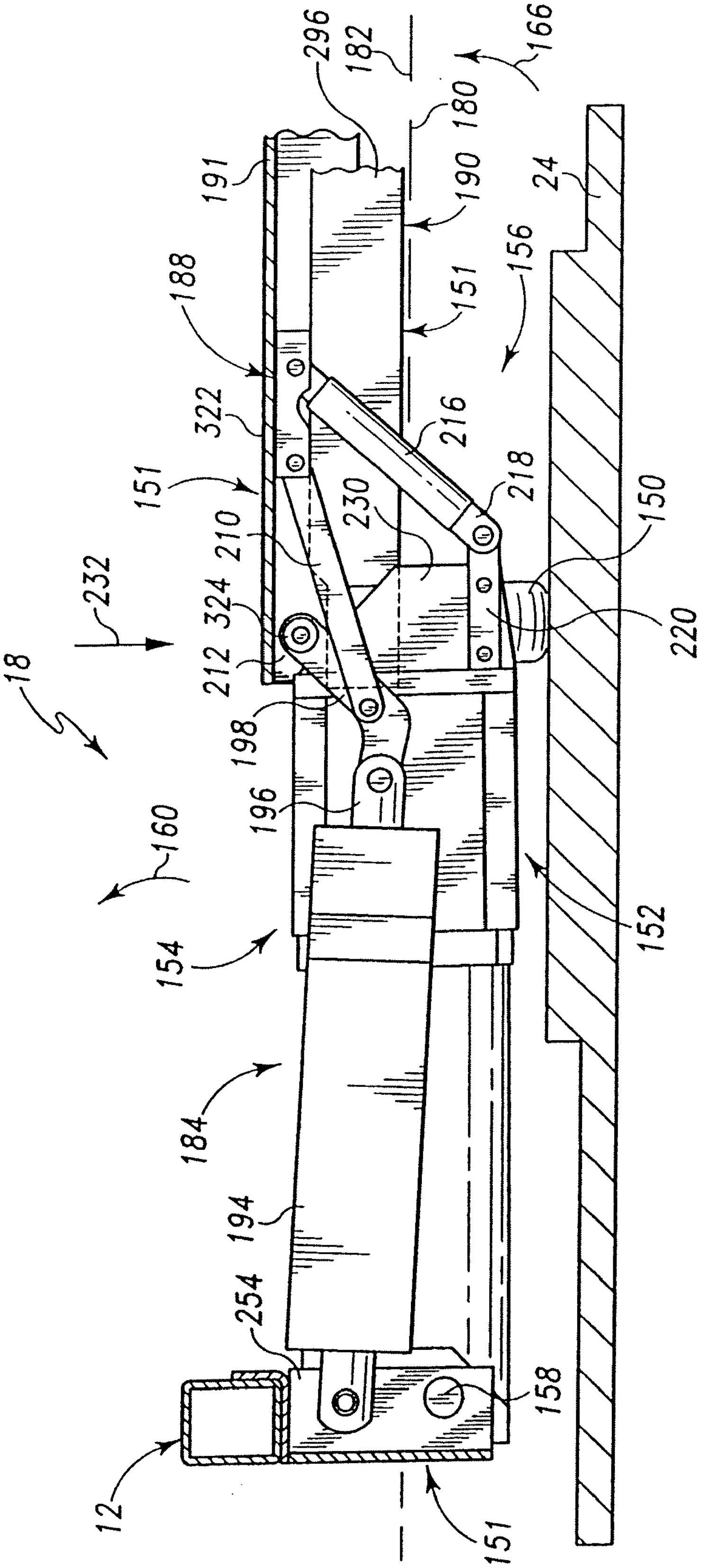
FIG. 13 is a view similar to FIG. 12 showing the gas springs further compressed as the patient support rides over a "bump" in the floor.
Figure 14:
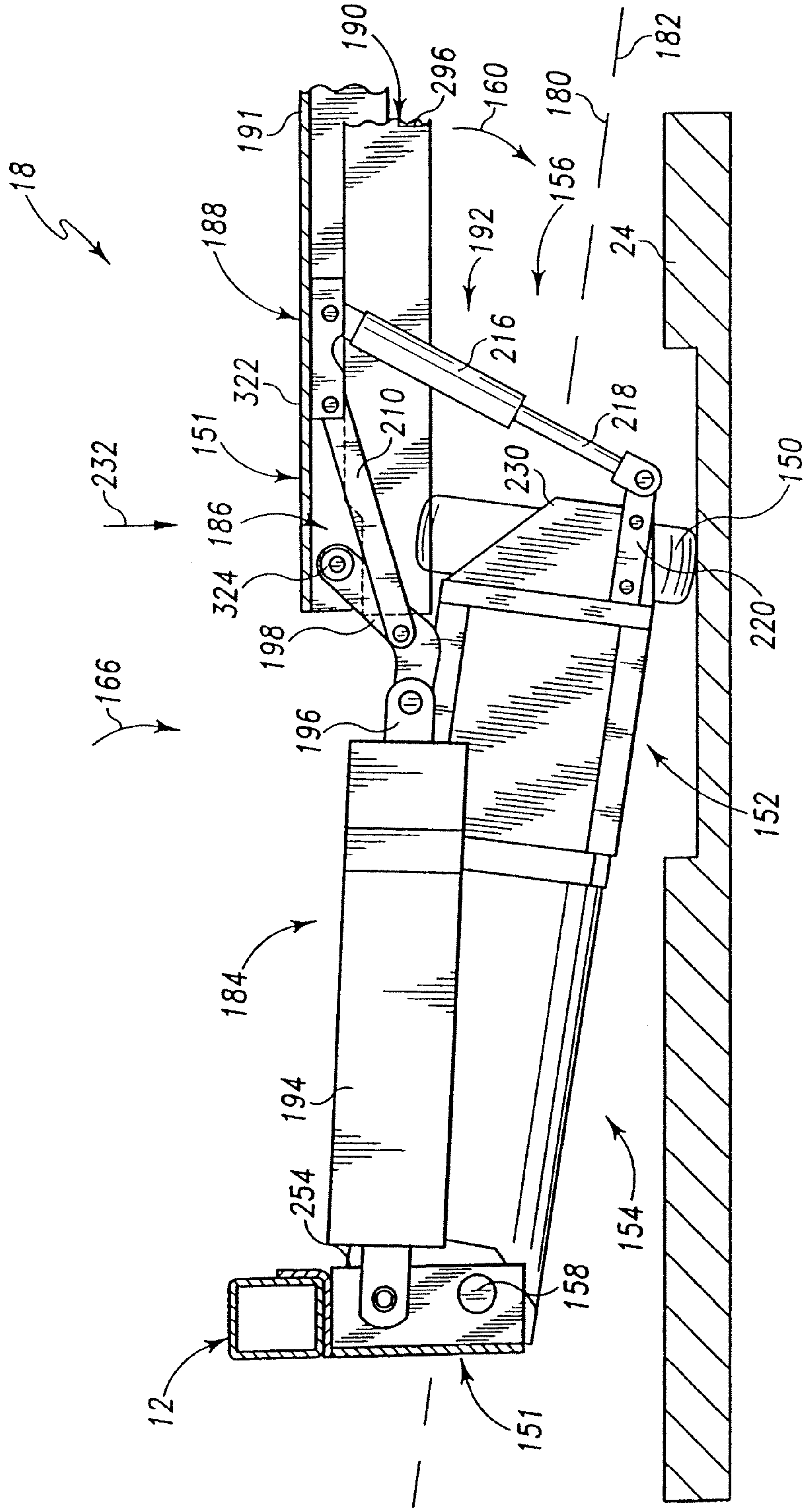
FIG. 14 is a view similar to FIG. 12 showing the gas springs extended as the patient support rides over a "dip" in the floor to maintain contact of the wheel with the floor.

Wheel lifter 152 includes a wheel mount 154 coupled to chassis 151 and a wheel mount mover 156 coupled to wheel mount 154 and chassis 151 at various locations. Motorized wheel 150 is coupled to wheel mount 154 as shown in FIG. 8. Wheel mount mover 156 is configured to pivot wheel mount 154 and motorized wheel 150 about a pivot axis 158 to move motorized wheel 150 between storage and use positions as shown in FIGS. 10-12. Wheel mount 154 is also configured to permit motorized wheel 150 to raise and lower during use of patient support 10 to compensate for changes in elevation of patient support 10. For example, as shown in FIG. 13, wheel mount 154 and wheel 150 may pivot in a clockwise direction 160 about pivot axis 158 when bedframe 12 moves over a bump in floor 24. Similarly, wheel mount 154 and motorized wheel 150 are configured to pivot about pivot axis 158 in a counterclockwise 166 direction when bedframe 12 moves over a recess in floor 24 as shown in FIG. 14. Thus, wheel mount 154 is configured to permit motorized wheel 150 to remain in contact with floor 24 during changes in elevation of floor 24 relative to patient support 10.

Wheel mount 154 is also configured to provide the power to rotate motorized wheel 150 during operation of propulsion system 16. Wheel mount 154 includes a motor mount 170 coupled to chassis 151 and an illustrative embodiment electric motor 172 coupled to motor mount 170 as shown in FIG. 8. In the illustrative embodiment, motor 172 is a commercially available Groschopp Iowa Permanent Magnet DC Motor Model No. MM8018.

Motor 172 includes a housing 178 and an output shaft 176 and a planetary gear (not shown). Motor 172 rotates shaft 176 about an axis of rotation 180 and motorized wheel 150 is directly coupled to shaft 176 to rotate about an axis of rotation 182 that is coaxial with axis of rotation 180 of output shaft 176. Axes of rotation 180, 182 are transverse to pivot axis 158.

As shown in FIG. 8, wheel mount mover 156 further includes an illustrative embodiment linear actuator 184, a linkage system 186 coupled to actuator 184, a shuttle 188 configured to slide horizontally between a pair of rails 190 and a plate 191, and a pair of gas springs 192 coupled to shuttle 188 and wheel mount 154. Linear actuator 184 is illustratively a Linak model number LA12.1-100-24-01 linear actuator. Linear actuator 184 includes a cylinder body 194 pivotally coupled to chassis 151 and a shaft 196 telescopically received in cylinder body 194 to move between a plurality of positions.

Linkage system 186 includes a first link 198 and a second link 210 coupling shuttle 188 to actuator 184. First link 198 is pivotably coupled to shaft 196 of actuator 184 and pivotably coupled to a portion 212 of chassis 151. Second link 210 is pivotably coupled to first link 198 and pivotably coupled to shuttle 188. Shuttle 188 is positioned between rails 190 and plate 191 of chassis 151 to move horizontally between a plurality of positions as shown in FIGS. 10-12. As shown in FIG. 10, each of gas springs 192 include a cylinder 216 pivotably coupled to shuttle 188 and a shaft 218 coupled to a bracket 220 of wheel mount 154. According to the alternative embodiments, the linear actuator is directly coupled to the shuttle.

Actuator 184 is configured to move between an extended position as shown in FIG. 10 and a retracted position as shown in FIG. 12-14. Movement of actuator 184 from the extended to retracted position moves first link 198 in a clockwise direction 222. This movement of first link 198 pulls second link 210 and shuttle 188 to the left in direction 224 as shown in FIG. 11. Movement of shuttle 188 to the left in direction 224 pushes gas springs 192 downward and to the left in direction 228 and pushes a distal end 230 of wheel mount 154 downward in direction 232 as shown in FIG. 11.

After wheel 150 contacts floor 24, linear actuator 184 continues to retract so that shuttle 188 continues to move to the left in direction 224. This continued movement of shuttle 188 and the contact of motorized wheel 150 with floor 24 causes gas springs 192 to compress so that less of shaft 218 is exposed, as shown in FIG. 12, until linear actuator 184 reaches a fully retracted position. This additional movement creates compression in gas springs 192 so that gas springs 192 are compressed while wheel 150 is in the normal use position with bedframe 12 at a normal distance from floor 24. This additional compression creates a greater normal force between floor 24 and wheel 150 so that wheel 150 has increased traction with floor 24.

As previously mentioned, bedframe 12 will move to different elevations relative to floor 24 during transport of patient support 10 from one position in the care facility to another position in the care facility. For example, when patient support 10 is moved up or down a ramp, portions of bedframe 12 will be at different positions relative to floor 24 when opposite ends of patient support 10 are positioned on and off of the ramp. Another example is when patient support 10 is moved over a raised threshold or over a depression in floor 24, such as a utility access plate (not shown). The compression in gas springs 192 creates a downward bias on wheel mount 154 in direction 232 so that when bedframe 12 is positioned over a “recess” in floor 24, gas springs 192 move wheel mount 154 and wheel 150 in clockwise direction 160 so that wheel 150 remains in contact with floor 24. When bedframe 12 moves over a “bump” in floor 24, the weight of patient support 10 will compress gas springs 192 so that wheel mount 154 and motorized wheel 150 rotate in counterclockwise direction 166 relative to chassis 151 and bedframe 12, as shown for example, in FIG. 14.

To return wheel 150 to the raised position, actuator 184 moves to the extended position as shown in FIG. 10. Through linkage system 186, shuttle 188 is pushed to the right in direction 234. As shuttle 188 moves in direction 234, the compression in gas springs 192 is gradually relieved until shafts 196 of gas springs 192 are completely extended and gas springs 192 are in tension. The continued movement of shuttle 188 in direction 234 causes gas springs 192 to raise motor mount 154 and wheel 150 to the raised position shown in FIG. 10. The compression of gas springs 192 assists in raising wheel 150. Thus, actuator 184 requires less energy and force to raise wheel 150 than to lower wheel 150.

Figure 9:
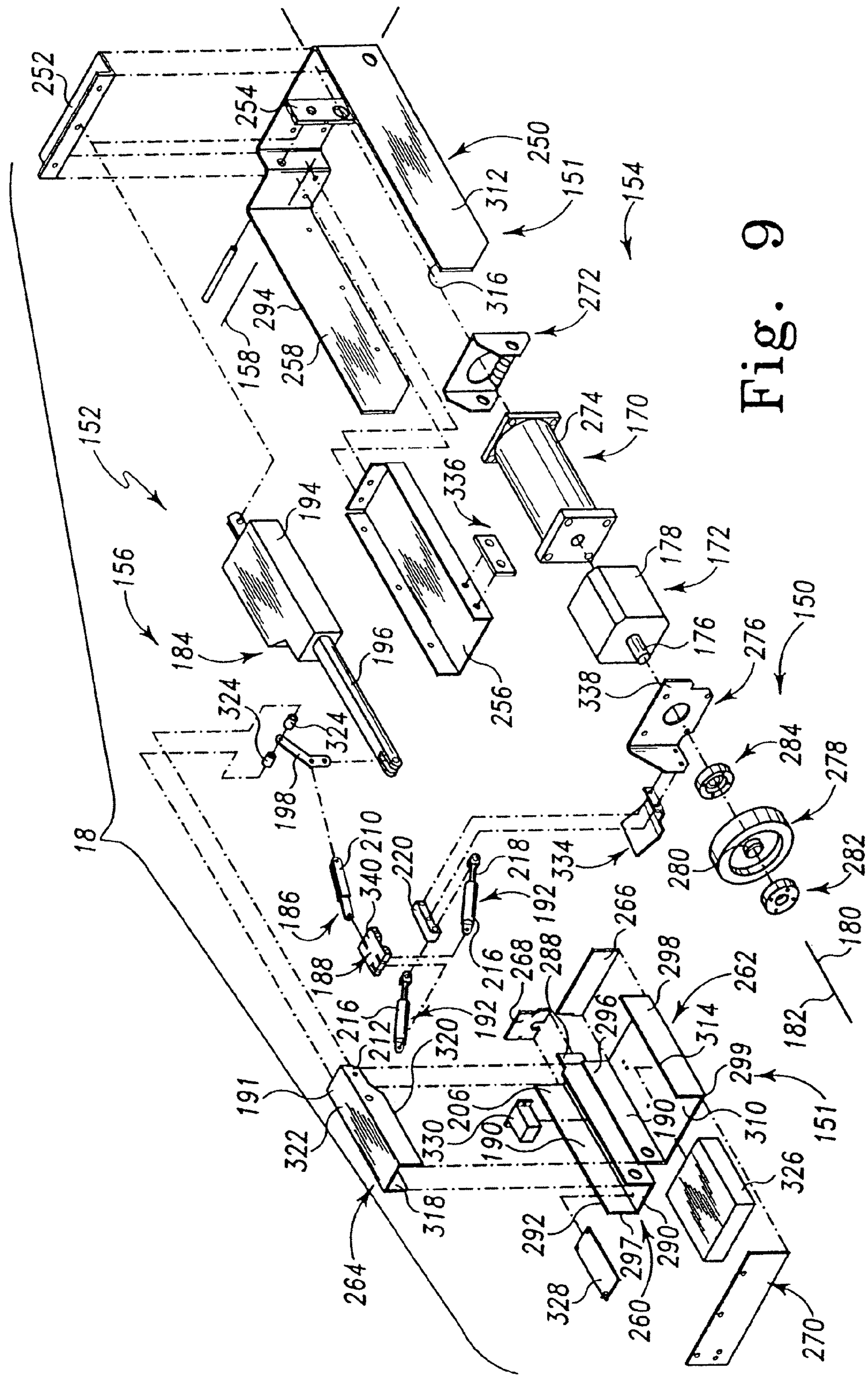
FIG. 9 is an exploded perspective view of various components of the propulsion device of FIG. 8.

An exploded assembly view of chassis 151, wheel 150, and wheel lifter 152 is provided in FIG. 9. Chassis 151 includes a chassis body 250, a bracket 252 coupled to chassis body 250 and bedframe 12, an aluminum pivot plate 254 coupled to chassis body 250, a pan 256 coupled to a first arm 258 of chassis body 250, a first rail member 260, a second rail member 262, a containment member 264, a first stiffening plate 266 coupled to second rail member 262, a second stiffening plate 268 coupled to first rail member 260, and an end plate 270 coupled to bedframe 12 and first and second rail members 260, 262. Wheel mount 154 further includes a first bracket 272 pivotably coupled to chassis body 250 and pivot plate 254, an extension body 274 coupled to bracket 272 and motor 172, and a second bracket 276 coupled to motor 172.

Wheel 150 includes a wheel member 278 having a central hub 280 and a pair of locking members 282, 284 positioned on each side of central hub 280. To couple wheel 150 to shaft 176 of motor 172, first locking member 282 is positioned over shaft 176, then wheel member 278 is positioned over shaft 176, then second locking member 284 is positioned over shaft 176. Bolts (not shown) are used to draw first and second locking members 282, 284 together. Central hub 280 has a slight taper and inner surfaces of first and second locking members 282, 284 have complimentary tapers. Thus, as first and second locking members 282, 284 are drawn together, central hub 280 is compressed to grip shaft 176 of motor 172 to securely fasten wheel 150 to shaft 176.

First rail member 260 includes first and second vertical walls 286, 288 and a horizontal wall 290. Vertical wall 286 is welded to first arm 258 of chassis body 250 so that an upper edge 292 of first vertical wall 286 is adjacent to an upper edge 294 of first arm 258. Similarly, second rail member 262 includes a first vertical wall 296, a second vertical wall 298, and a horizontal wall 310. Second vertical wall 298 is welded to a second arm 312 of chassis body 250 so that an upper edge 314 of second vertical wall 298 is adjacent to an upper edge 316 of second arm 312. End plate 270 is welded to ends 297, 299 of first and second rail members 260, 262.

Containment member 264 includes a first vertical wall 318, a second vertical wall 320, and a horizontal wall 322. Second wall 288 of first rail member 260 is coupled to an interior of first vertical wall 318 of containment member 264. Similarly, first vertical wall 296 of second rail member 262 is coupled to an interior of second vertical wall 320. As shown in FIG. 10, shuttle 188 is trapped between horizontal wall 322 and vertical walls 288, 296 so that vertical walls 288, 286 define rails 190 and horizontal wall 322 defines plate 191.

Wheel lifter 152 further includes a pair of bushings 324 having first link 198 sandwiched therebetween. A pin pivotally couples bushings 324 and first link 198 to containment member 264 so that containment member 264 defines portion 212 of chassis 151 as shown in FIG. 10.

When fully assembled, first and second rail members 260, 262 include a couple of compartments. Motor controller 326 containing the preferred motor driver circuitry is positioned within first rail member 260 and circuit board 328 containing the preferred input system circuitry and relay 330 are positioned in first rail member 260.

Shuttle 188 includes a first slot 340 for pivotally receiving an end of second link 210. Similarly, shuttle 188 includes second and third slots 342 for pivotally receiving ends of gas spring 292 as shown in FIG. 9. Bracket 220 is coupled to the second bracket 276 with a deflection guard 334 sandwiched therebetween. Gas springs 292 are coupled to bracket 220 as shown in FIG. 9.

A plate 336 is coupled to pan 256 to provide a stop that limits forward movement of wheel mount 154. Furthermore, second bracket 276 includes an extended portion 338 that provides a second stop for wheel mount 154 that limits backward movement of wheel mount 154.

Referring now to FIGS. 17-40, a second embodiment patient support 10' is illustrated as including a second embodiment propulsion system 16' coupled to the bedframe 12 in a manner similar to that identified above with respect to the previous embodiment. The propulsion system 16' operates substantially in the same manner as the first embodiment propulsion system 16 illustrated in FIG. 2 and described in detail above. According to the second embodiment, the propulsion system 16' includes a propulsion device 18' and an input system 20' coupled to the propulsion device 18'. In the manner described above with respect to the first embodiment, the input system 20' is provided to control the speed and direction of the propulsion device 18' so that a caregiver may direct the patient support 10' to the proper position in the care facility.

The input system 20' of the second embodiment patient support 10' is substantially the same as the input system 20 of the above-described embodiment as illustrated in FIG. 2. However, as illustrated in FIGS. 36-40 and as described in greater detail below, a user interface or handle 430 is provided as including first and second handle members 431 and 433 positioned in spaced relation to each other and supported for relative independent movement in response to the application of first and second input forces 39 and 41 (FIG. 2). The first handle member 431 is coupled to a first user input device 32' while the second handle member 433 is coupled to a second user input device 34'. The handle members 431 and 433 are configured to transmit first input force 39 from the first handle member 431 to the first user input device 32' and to transmit second input force 41 from the second handle member 433 to the second user input device 34'.

Referring further to FIGS. 36-40, the first and second handle members 431 and 433 comprise elongated tubular members 434 extending between opposing upper and lower ends 436 and 437. The upper end 436 of each first and second handle member 431 and 433 includes a third user input, or enabling, device 435, preferably a normally open push button switch requiring continuous depression in order for the motor drive 44 to supply power to the motor 42. A conventional handgrip (not shown) formed from a resilient material may be coupled to the upper end 436 of the handle members 431 and 433 for improving caregiver comfort and frictional engagement. The lower end 437 of each first and second handle member 431 and 433 is concentrically received within a mounting tube 438 fixed to the bedframe 12. More particularly, with reference to FIG. 40, a pin 440 passes through each tubular member 434 and into the sidewalls of the mounting tube 438 in order to secure the first and second handle members 431 and 433 thereto. A collar 442 may be concentrically received around an upper end of the mounting tube 438 in order to shield the pin 440.

A mounting block 443 is secured to a lower surface of the bedframe 12 and connects the casters 22 thereto. A load cell 62, 64 of the type described above is secured to the mounting block 443, typically through a conventional bolt 444, and is in proximity to the lower end 437 of each first and second handle members 431 and 433. Each load cell 62, 64 is physically connected to a lower end of the tubular member 434 by a bolt 444 passing through a pair of slots 446 formed within lower end 437. As may be readily appreciated, force applied proximate the upper end 436 of the first and second handle members 431 and 433 is transmitted downwardly to the lower end 437, through the bolt 444 and into the load cell 62, 64 for operation in the manner described above with respect to FIGS. 4A and 4B. It should be appreciated that the independent supports and the spaced relationship of the first and second handle members 431 and 433 prevent the transmission of forces directly from one handle member 431 to the other handle member 433. As such, the speed controller 36 is configured to operate upon receipt of a single force signal 43 or 45 due to application of only a single force 39 or 41 to a single user input device 32 or 34.

A keyed lockout switch 93 configured to receive a lockout key 95, of the type described above, is illustratively supported on the bedframe 12 proximate the first and second handle members 38 and 40 and may be used to prevent unauthorized operation of the patient support 10. Again, the keyed lockout switch 93 is optional and may be eliminated if not desired.

The alternative embodiment propulsion device 18' is shown in greater detail in FIGS. 18-30. The propulsion device 18' includes a rolling support in the form of a drive track 449 having rotatably supported first and second rollers 450 and 452 supporting a track or belt 453 for movement. The first roller 450 is driven by motor 42 while the second roller 452 is an idler. The second embodiment traction engagement controller 28' includes a traction device mover, illustratively a rolling support lifter 454, and a chassis 456 coupling the rolling support lifter 454 to bed frame 12.

The rolling support lifter 454 includes a rolling support mount 458 coupled to the chassis 456 and a rolling support mount mover, or simply rolling support mover 460, coupled to rolling support mount 458 and chassis 456 at various locations. The rollers 450 and 452 are rotatably supported intermediate side plates 462 and spacer plates 464 forming the rolling support mount 458. The rollers 450 and 452 preferably include a plurality of circumferentially disposed teeth 466 for cooperating with a plurality of teeth 468 formed on an inner surface 470 of the belt 453 to provide positive engagement therewith and to prevent slipping of the belt 453 relative to the rollers 450 and 452. Each roller 450 and 452 likewise preferably includes a pair of annular flanges 472 disposed near a periphery thereof to assist in tracking or guiding belt 453 in its movement.

A drive shaft 473 extends through the first roller 450 while a bushing 475 is received within the second roller 452 and receives a nondriven shaft 476. A plurality of brackets 477 are provided to facilitate connection of the chassis 456 of bedframe 12.

Figure 22:
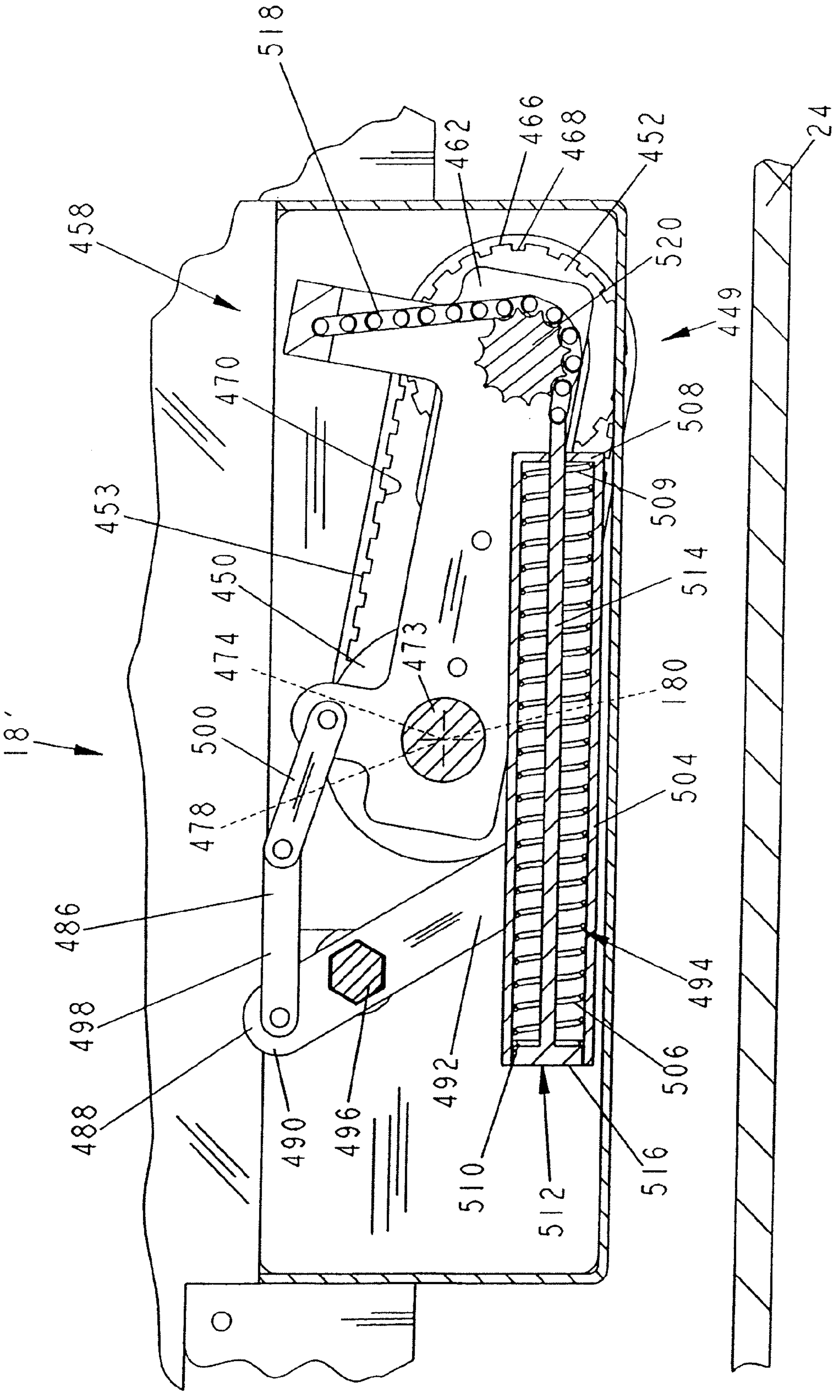
FIG. 22 is a sectional view taken along lines 22-22 of FIG. 19 showing the second embodiment propulsion device of FIG. 18 with the track drive spaced apart from the floor.
Figure 23:
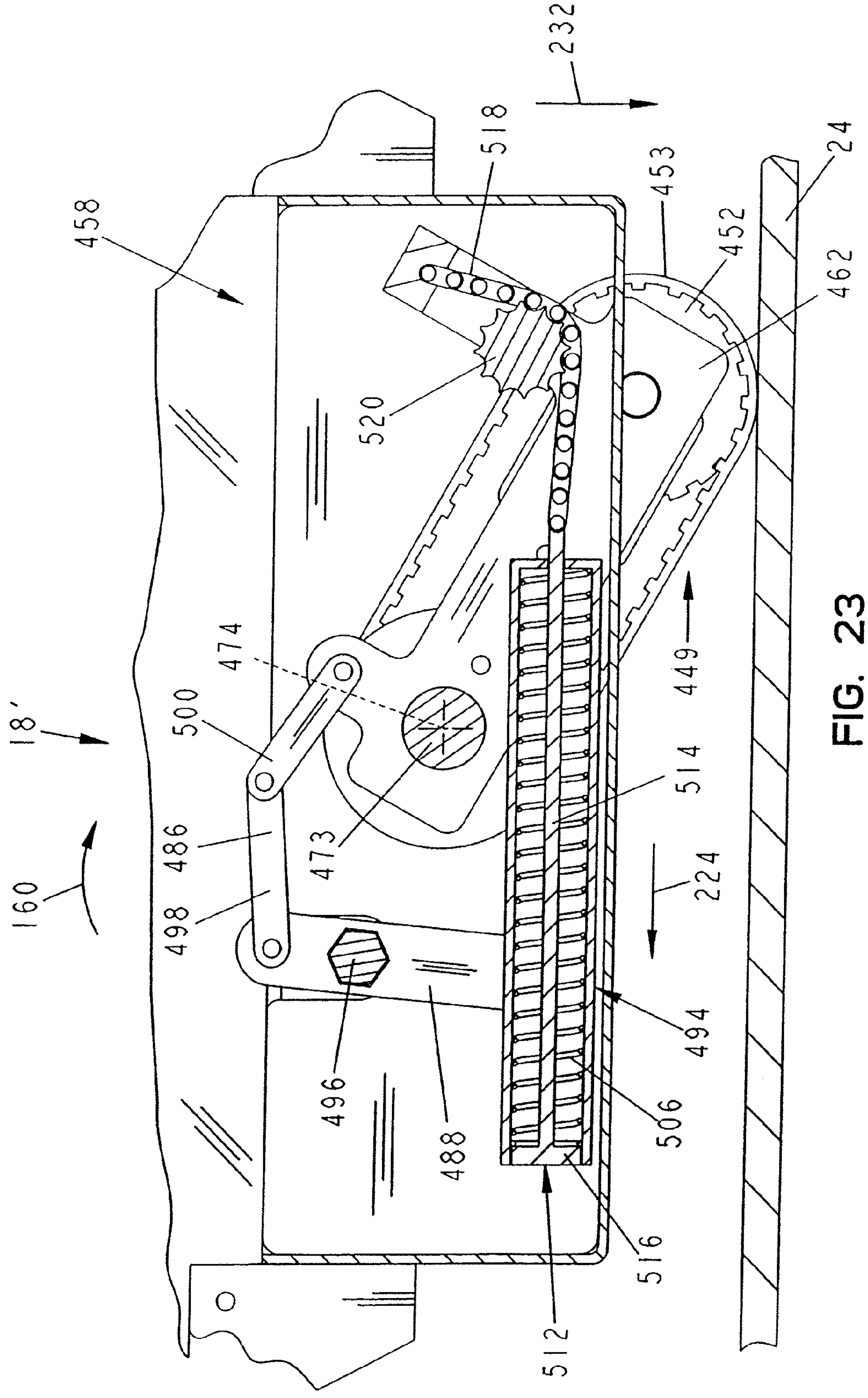
FIG. 23 is a view similar to FIG. 22 showing the biasing device moved to the left through action of the arm, thereby moving the traction belt into contact with the floor.
Figure 24:
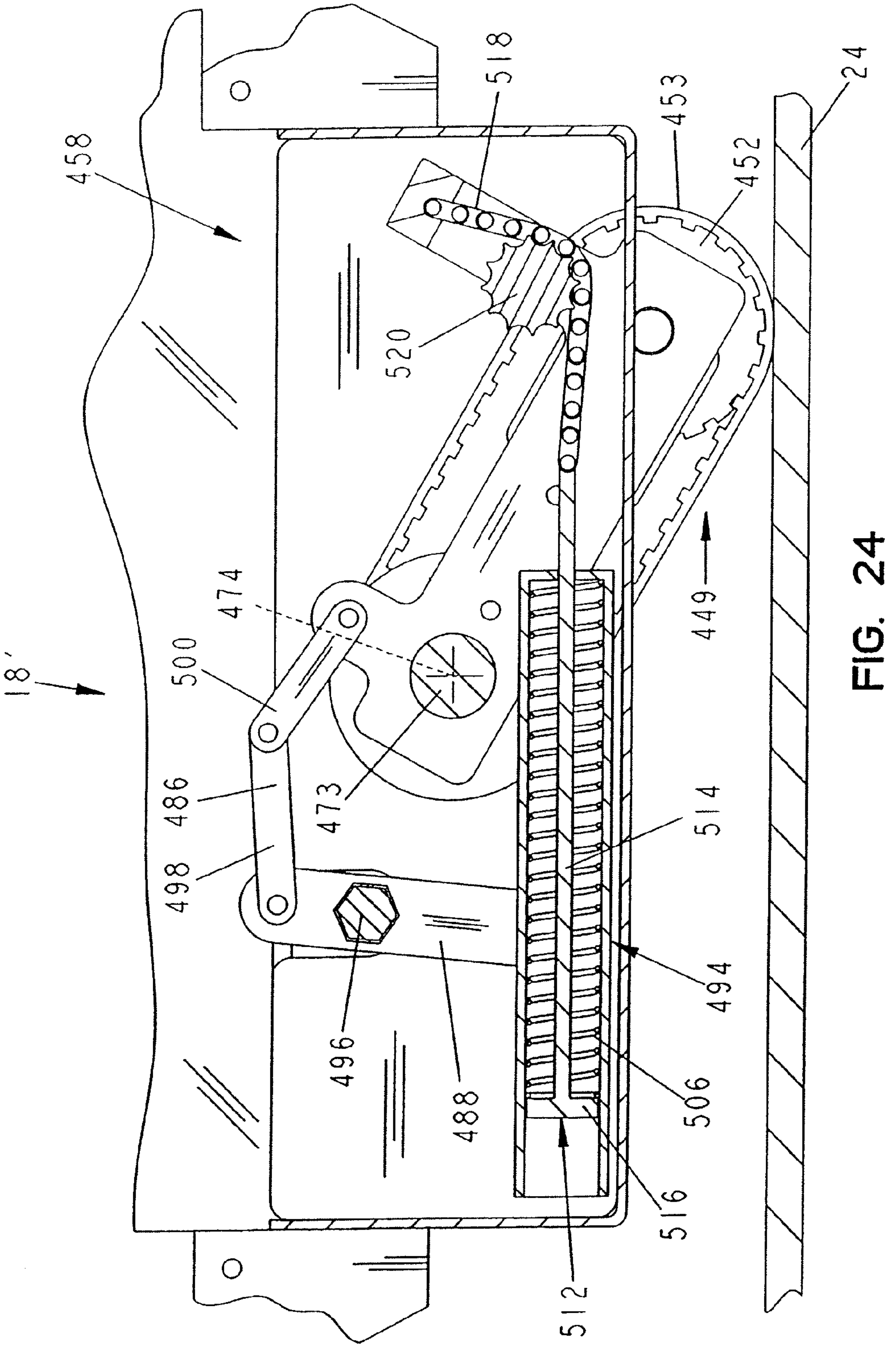
FIG. 24 is a view similar to FIG. 22 showing the biasing device moved further to the left than in FIG. 23 through action of the arm, and additional movement of the biasing device compressing a spring received within a tubular member.
Figure 25:
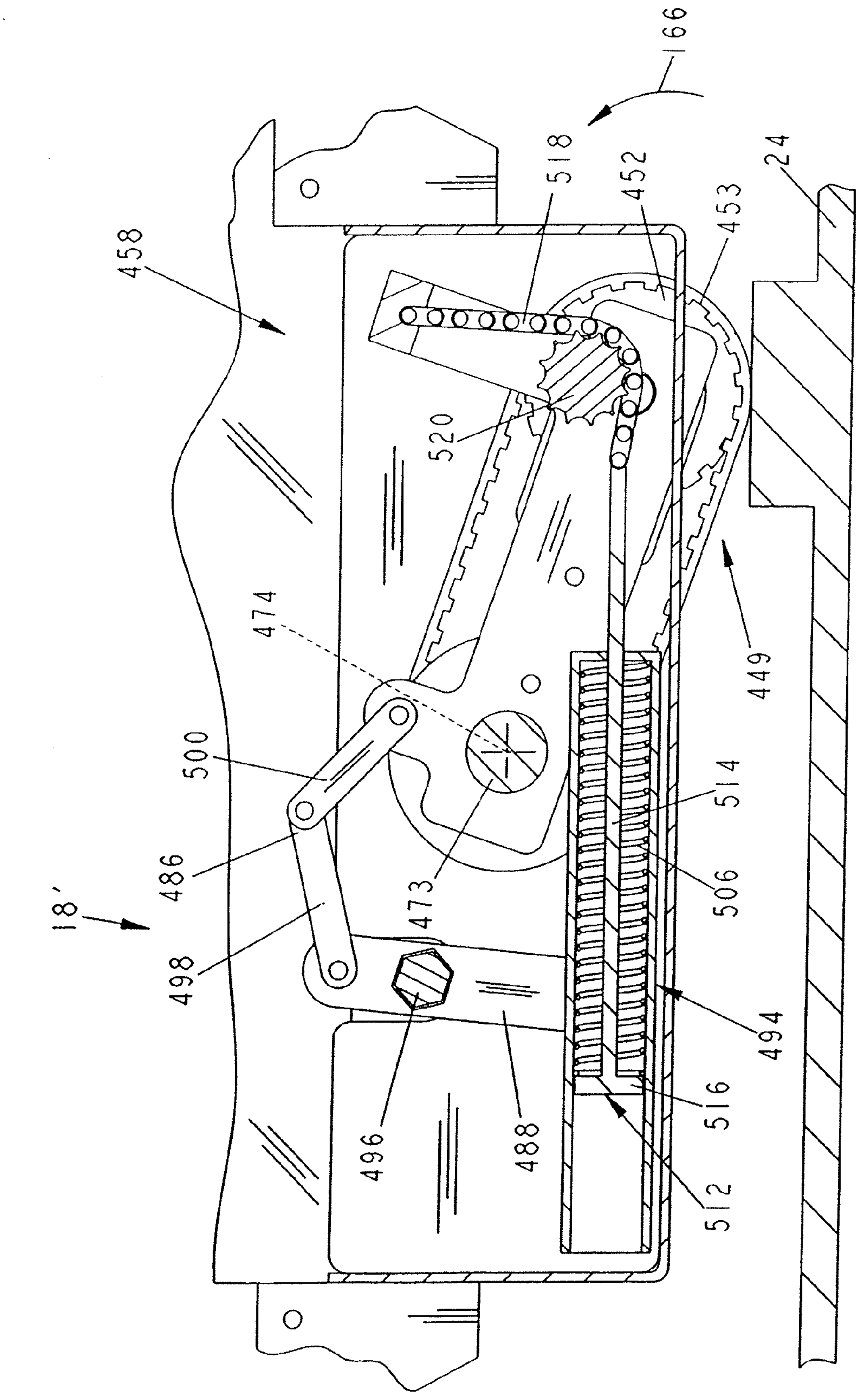
FIG. 25 is a view similar to FIG. 24 showing the spring further compressed as the patient support rides over a "bump" in the floor.
Figure 26:
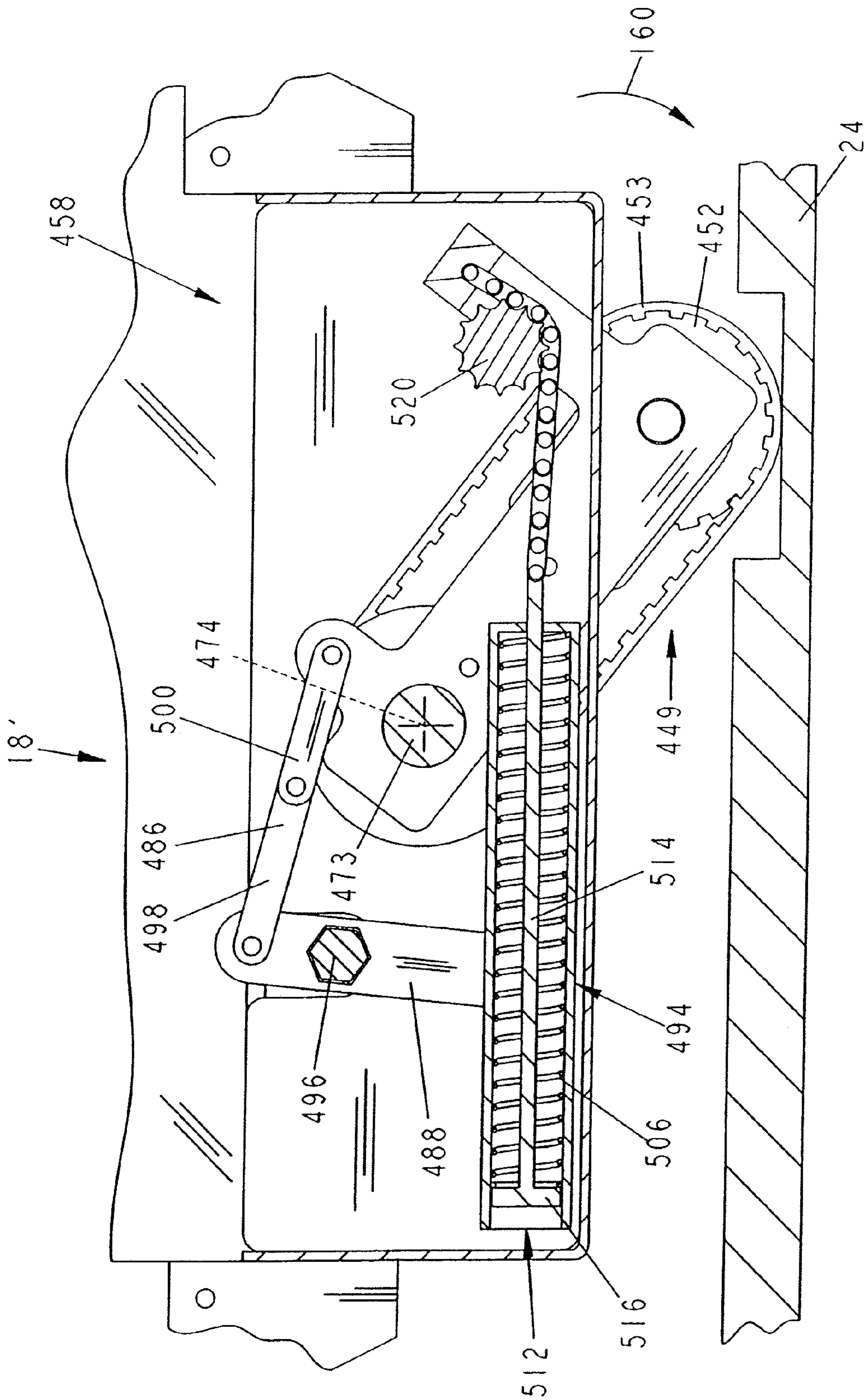
FIG. 26 is a view showing the spring extended from its position in FIG. 24 as the patient support rides over a "dip" in the floor to maintain contact of the traction belt with the floor.
Figure 27:
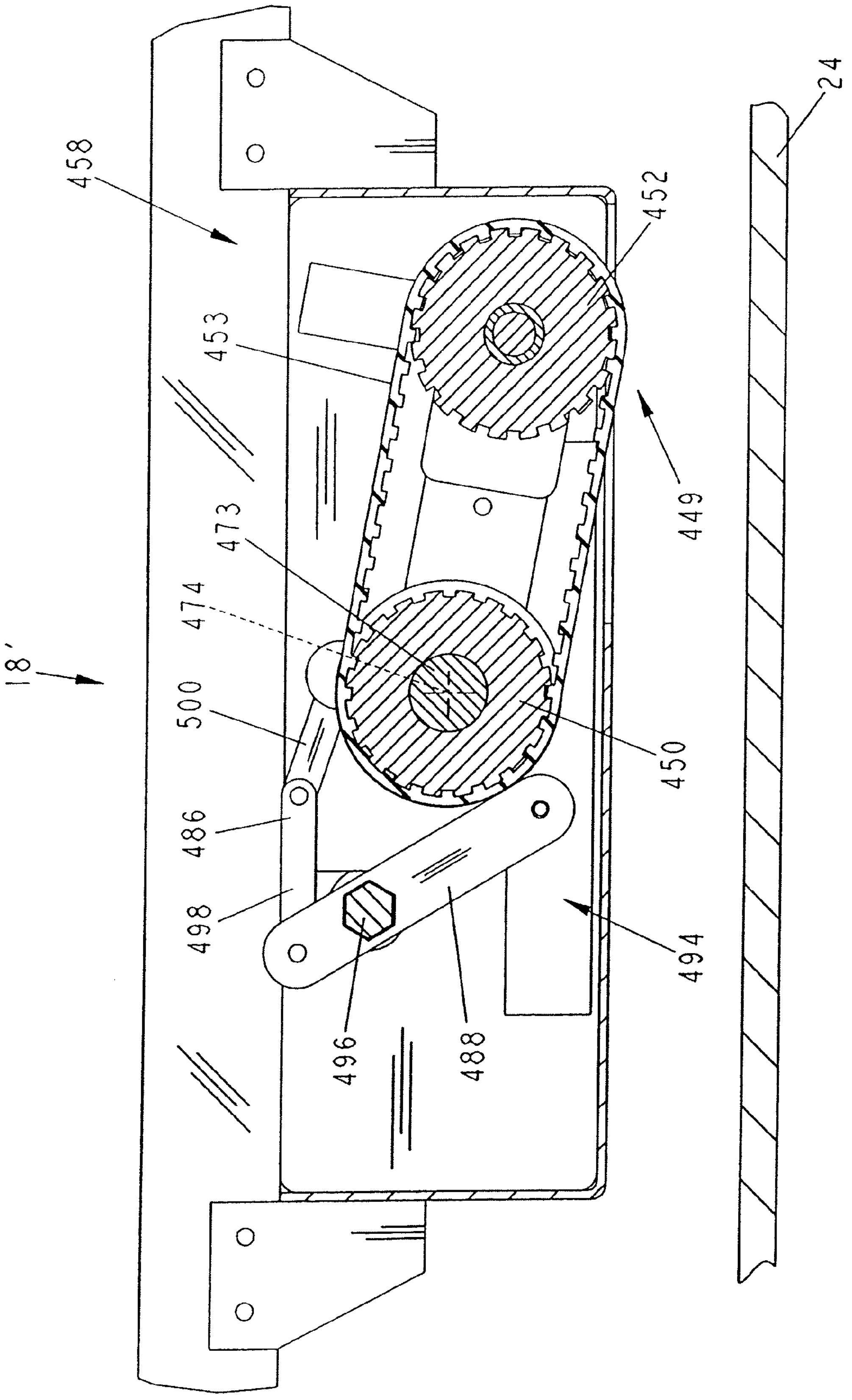
FIG. 27 is a sectional view taken along lines 27-27 of FIG. 19 showing the second embodiment propulsion device of FIG. 18 with the track drive spaced apart from the floor.
Figure 28:
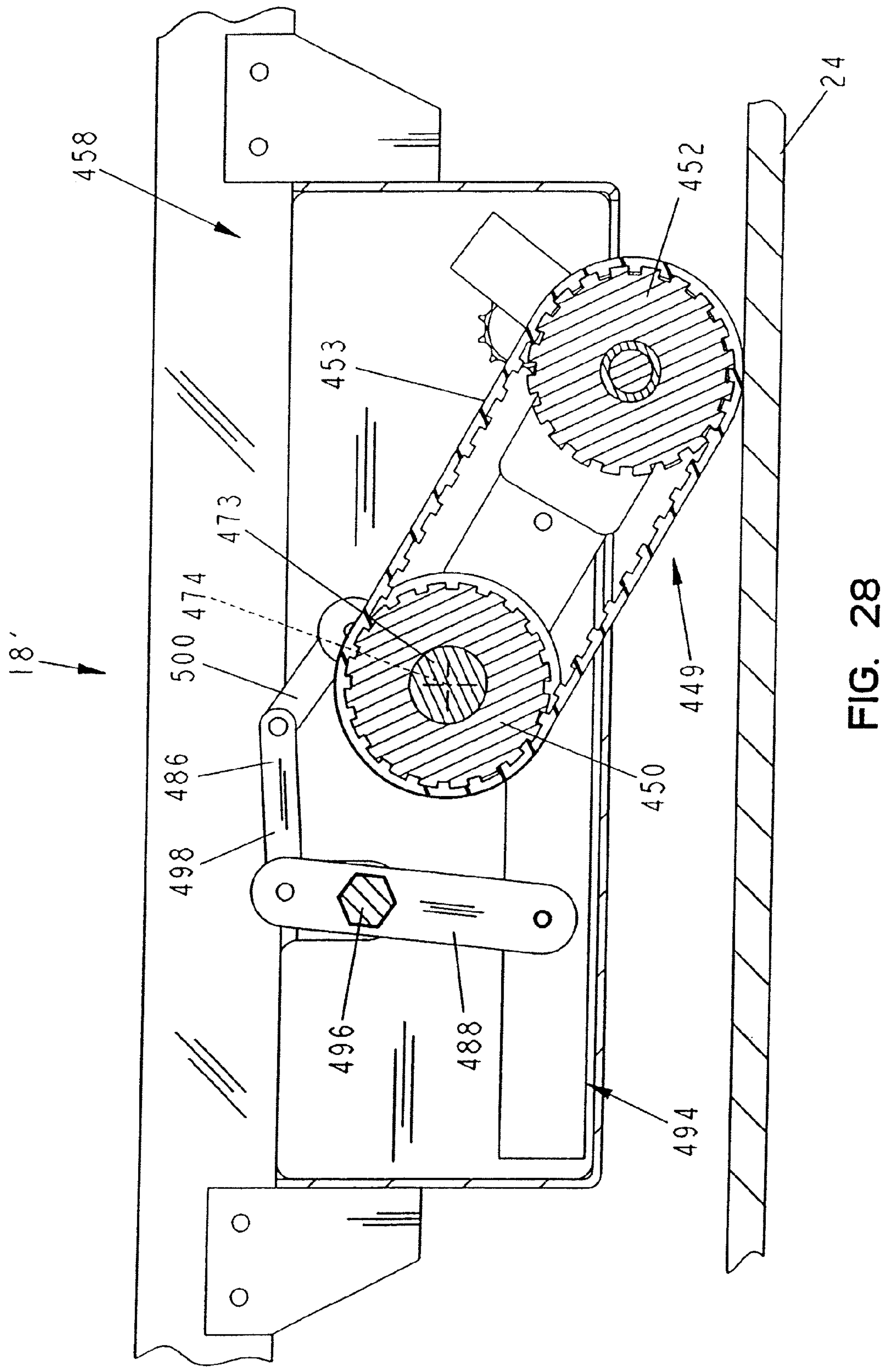
FIG. 28 is a view similar to FIG. 27 showing the traction belt in contact with the floor as illustrated in FIG. 24.
Figure 29:
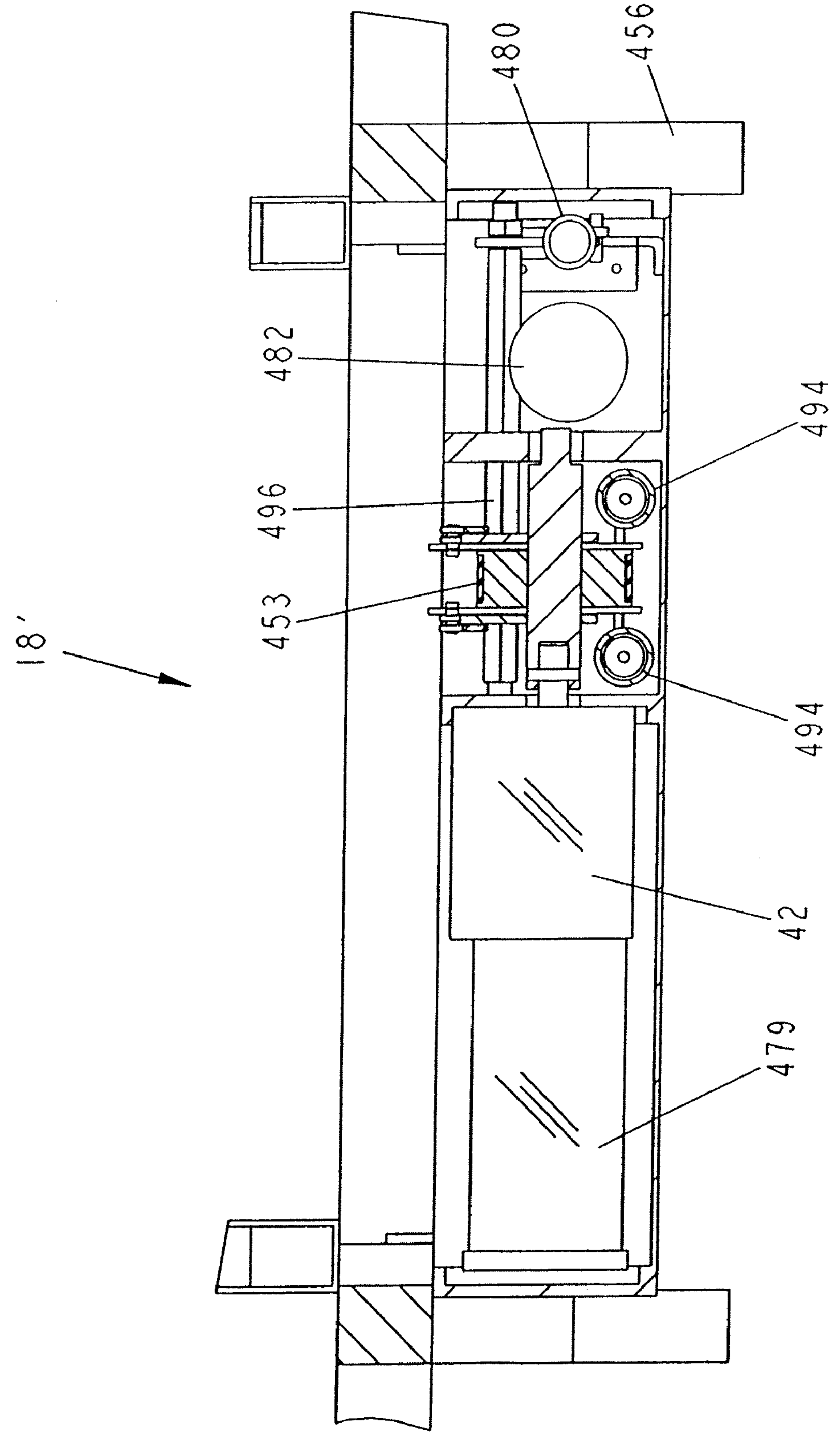
FIG. 29 is a sectional view taken along lines 29-29 of FIG. 19.
Figure 30:
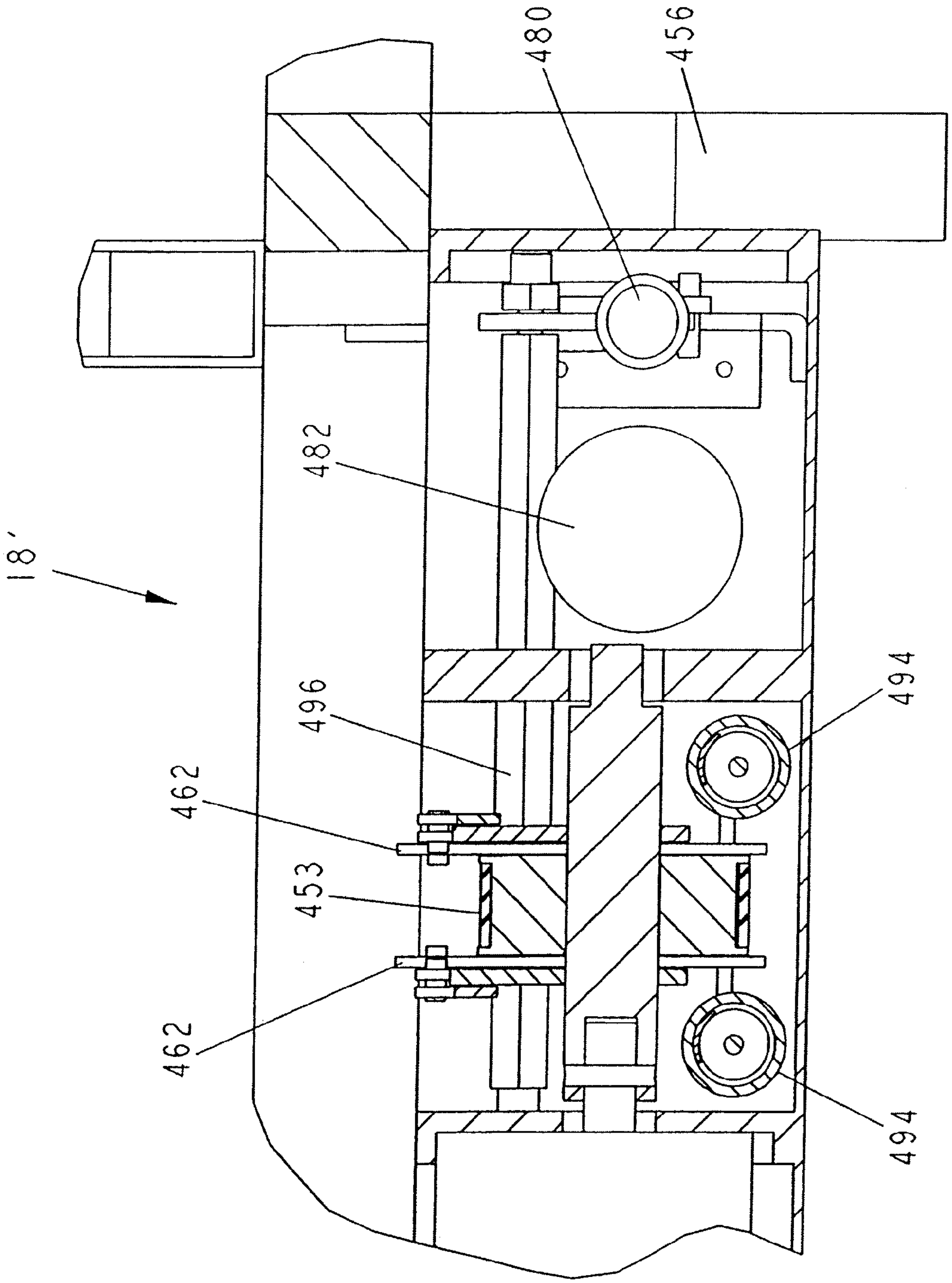
FIG. 30 is a detail view of FIG. 29.

The rolling support mover 460 is configured to pivot the rolling support mount 458 and motorized track drive 449 about a pivot axis 474 to move the traction belt 453 between a storage position spaced apart from floor 24 and a use position in contact with floor 24 as illustrated in FIGS. 22-24. Rolling support mount 458 is further configured to permit the track drive 449 to raise and lower during use of the patient support 10' in order to compensate for changes in elevation of the patient support 10'. For example, as illustrated in FIG. 25, rolling support mount 458 and track drive 449 may pivot in a counterclockwise direction 166 about pivot axis 474 when bedframe 12 moves over a bump in floor 24. Similarly, rolling support mount 458 and motorized track drive 449 are configured to pivot about pivot axis 474 in a clockwise direction 160 when bedframe 12 moves over a recess in floor 24 as illustrated in FIG. 26. Thus, rolling support mount 458 is configured to permit traction belt 453 to remain in contact with floor 24 during changes in elevation of floor 24 relative to patient support 10.

The rolling support mount 458 further includes a motor mount 479 supporting motor 42 and coupled to chassis 456 in order to provide power to rotate the first roller 450 and, in turn, the traction belt 453. The motor 42 may be of the type described in greater detail above. Moreover, the motor 172 includes an output shaft 176 supported for rotation about an axis of rotation 180. The first roller 450 is directly coupled to the shaft 176 to rotate about an axis of rotation 478 that is coaxial with the axis of rotation 180 of the output shaft 176. The axes of rotation 180 and 478 are likewise coaxially disposed with the pivot axis 474.

The rolling support mount mover 460 further includes a linear actuator 480 connected to a motor 482 through a conventional gearbox 484. A linkage system 486 is coupled to the actuator 480 through a pivot arm 488. Moreover, a first end 490 of the pivot arm 488 is connected to the linkage system 486 while a second end 492 of the arm 488 is connected to a shuttle 494. The shuttle 494 is configured to move substantially horizontally in response to pivoting movement of the arm 488. The arm 488 is operably connected to the actuator 480 through a hexagonal connecting shaft 496 and link 497.

The linkage system 486 includes a first link 498 and a second link 500 coupling the actuator 480 to the rolling support mount 458. The first link 498 includes a first end which is pivotally coupled to the arm 488 and a second end which is pivotally coupled to a first end of the second link 500. The second link 500, in turn, includes a second end which is pivotally coupled to the side plate 462 of the rolling support mount 458.

The shuttle 494 comprises a tubular member 504 receiving a compression spring 506 therein. The body of the shuttle 494 includes an end wall 508 for engaging a first end 509 of the spring 506. A second end 510 of the spring 506 is adapted to be engaged by a piston 512. The piston 512 includes an elongated member or rod 514 passing coaxially through the spring 506. An end disk 516 is connected to a first end of member 514 for engaging the second end 510 of the spring 506.

A second end of the elongated member 514 is coupled to a flexible linkage, preferably a chain 518. The chain 518 is guided around a cooperating sprocket 520 supported for rotation by side plate 462. A first end of the chain 518 is connected to the elongated member 514 through a pin 521 while a second end of the chain 518 is coupled to an upwardly extending arm 522 of the side plate 462.

The actuator 480 is configured to move between a retracted position as shown in FIG. 22 and an extended position as shown in FIGS. 24-26 in order to move the connecting link 497 and connecting shaft 496 in a clockwise direction 160. This movement of the arm 522 moves the shuttle 494 to the left in the direction of arrow 224 as illustrated in FIG. 23. Movement of the shuttle 494 to the left results in similar movement of the spring 506 and piston 512 which, in turn, pulls the chain 518 around the sprocket 520. This movement of the chain 518 around the sprocket 520 in a clockwise direction 160 results in the rolling support mount 458 being moved in a downward direction as illustrated by arrow 232 in FIG. 23.

Figure 34:
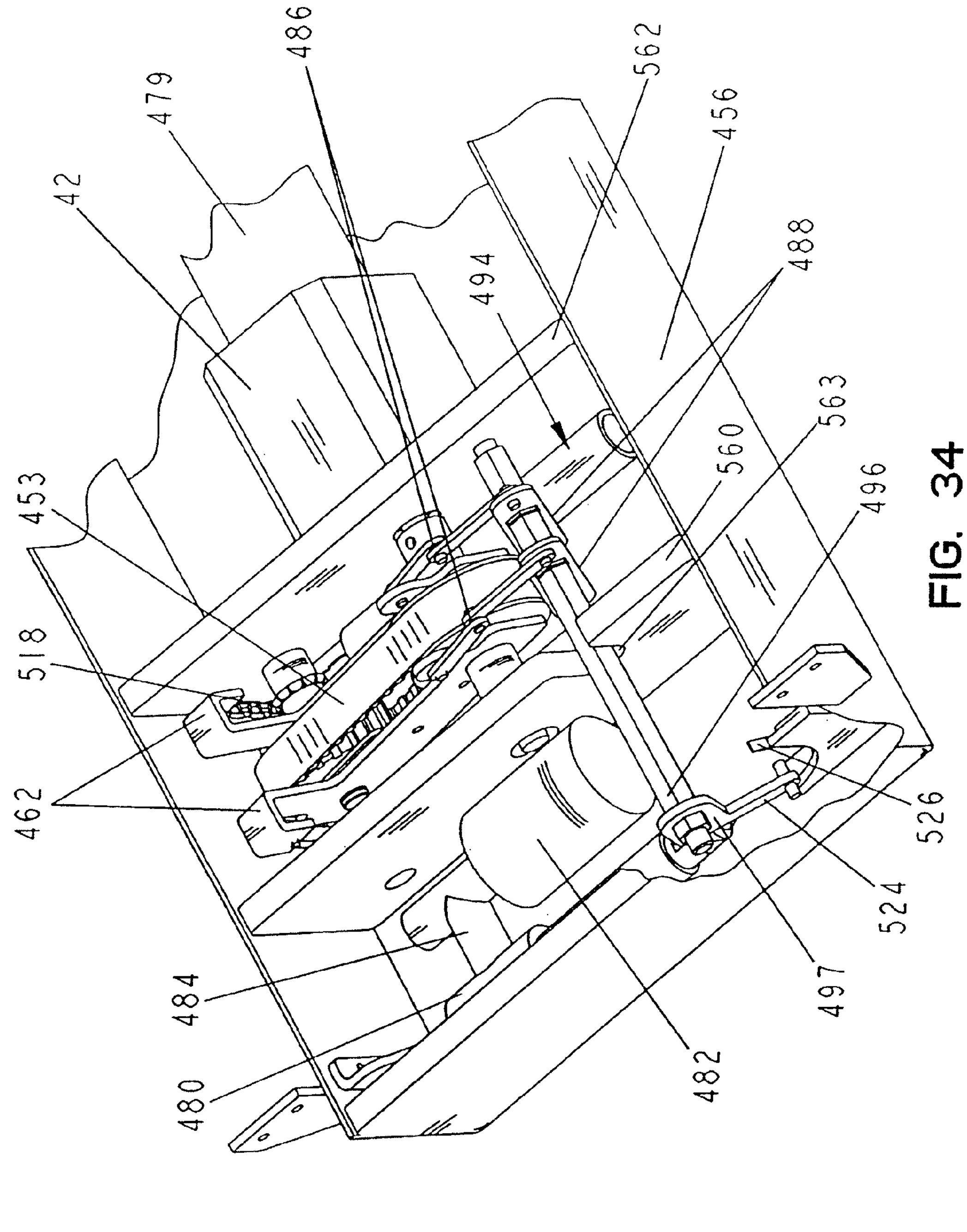
FIG. 34 is a perspective view of the second embodiment propulsion device of FIG. 17 showing the track drive spaced apart from the floor as in FIG. 22.
Figure 35:
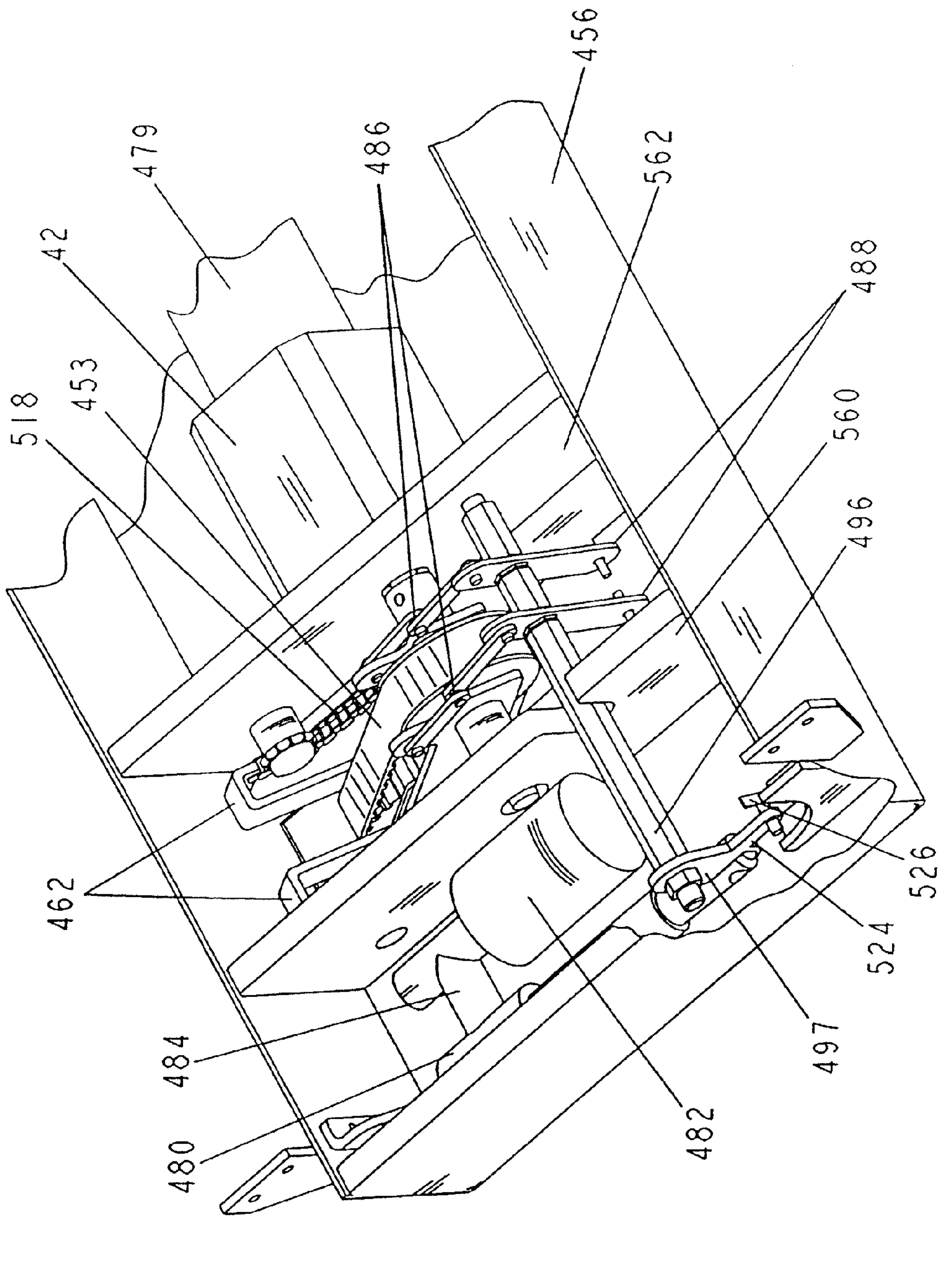
FIG. 35 is a view similar to FIG. 34 showing the traction belt in contact with the floor as in FIG. 24.
Figure 36:
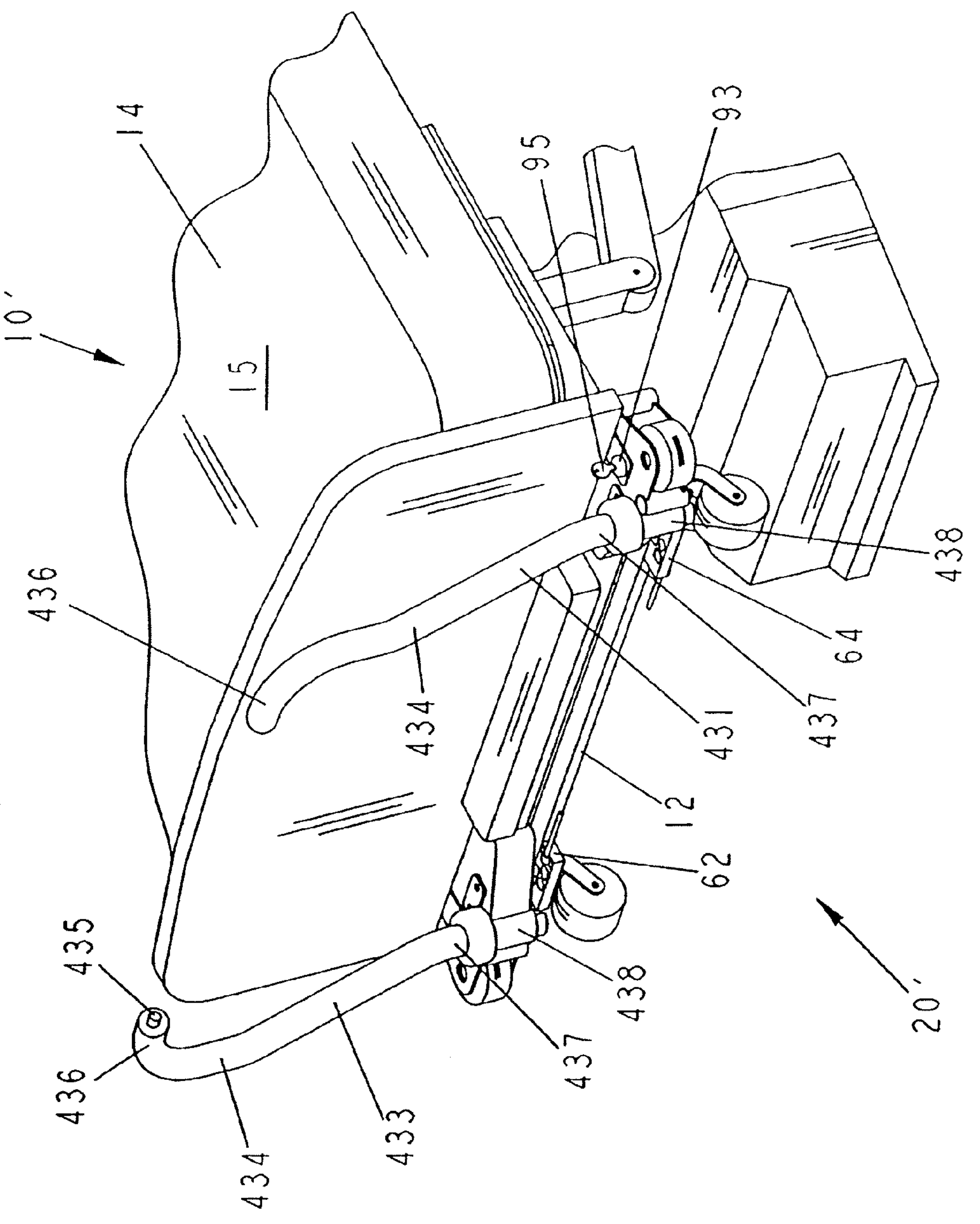
FIG. 36 is a partial perspective view of the second embodiment hospital bed of FIG. 17 as seen from the front and right side, showing a second embodiment input system.
Figure 37:
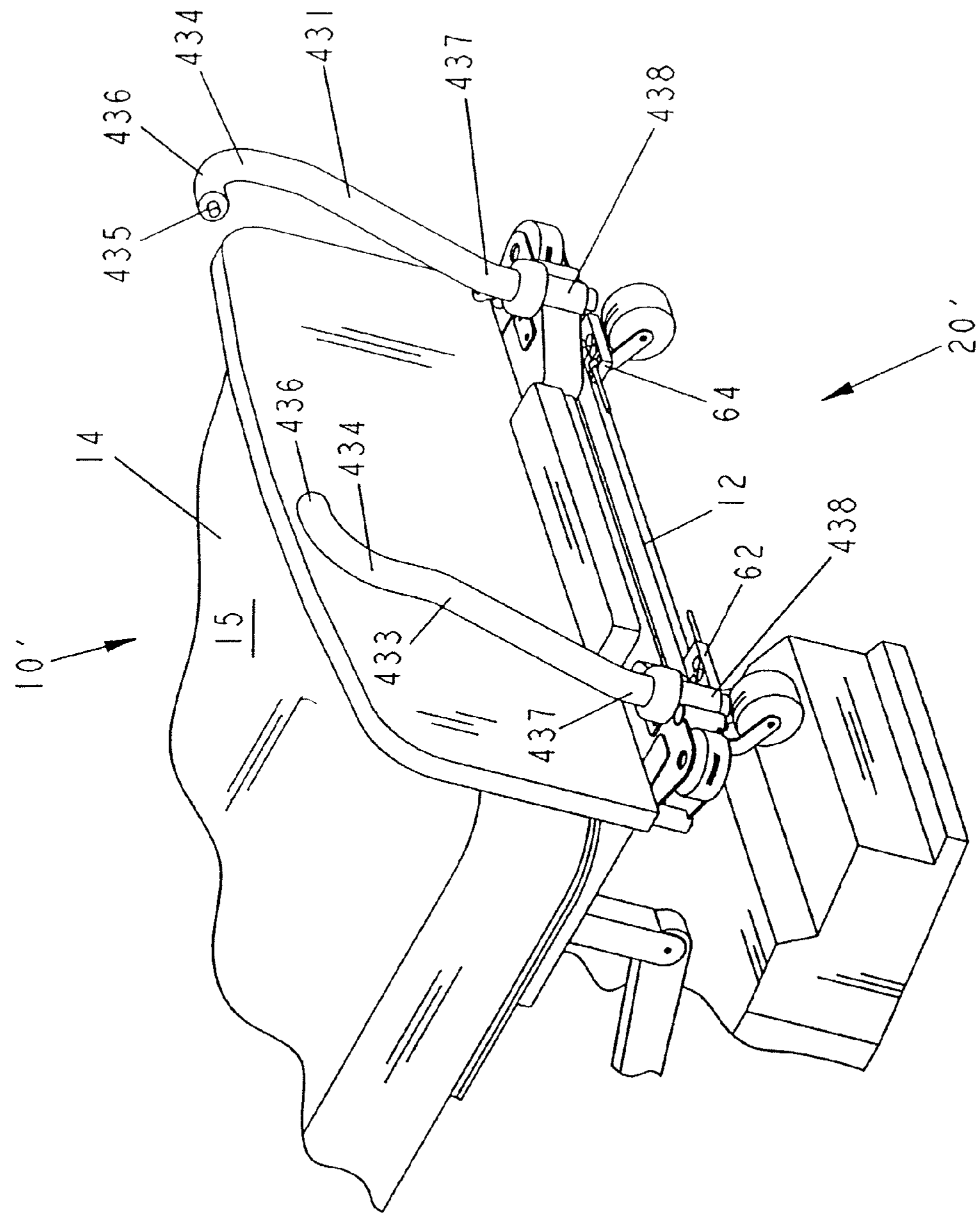
FIG. 37 is a perspective view similar to FIG. 36 as seen from the front and left side.
Figure 38:
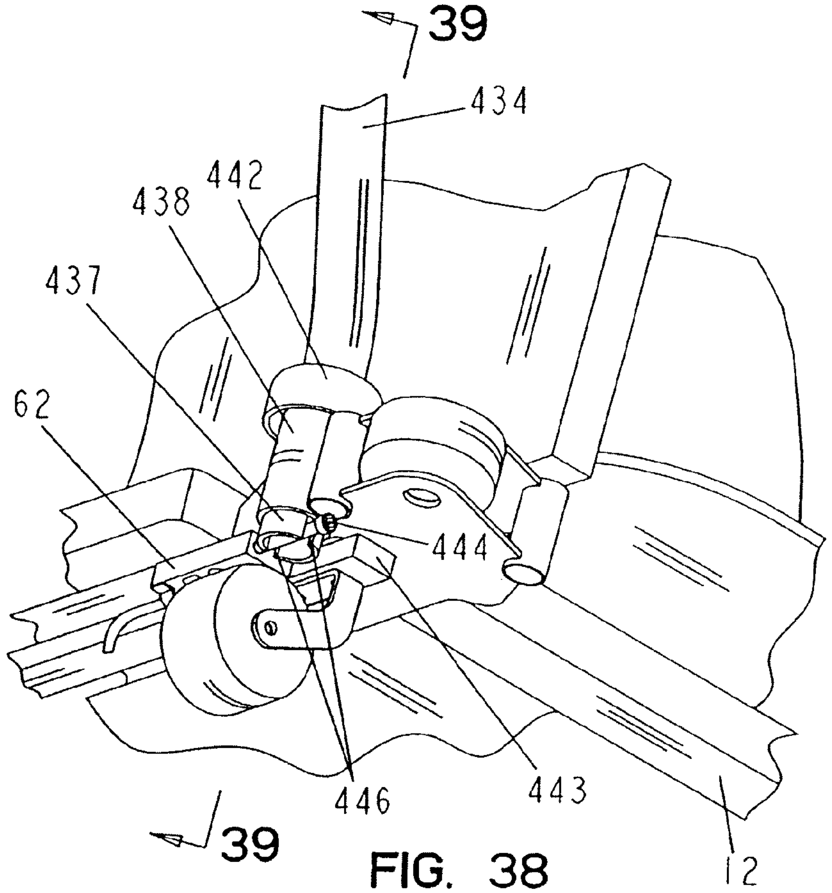
FIG. 38 is an enlarged partial perspective view of the second embodiment input system of FIG. 36 showing an end of a first handle coupled to a load cell.
Figure 39:
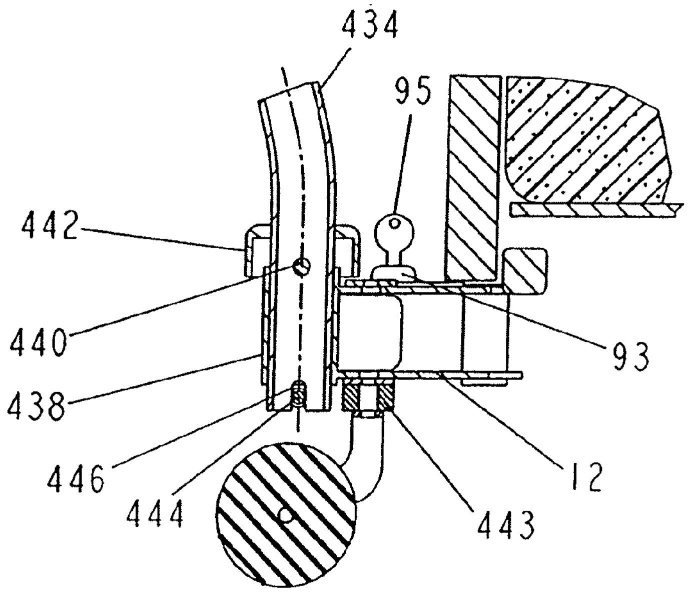
FIG. 39 is a sectional view taken along line 39-39 of FIG. 38.
Figure 40:
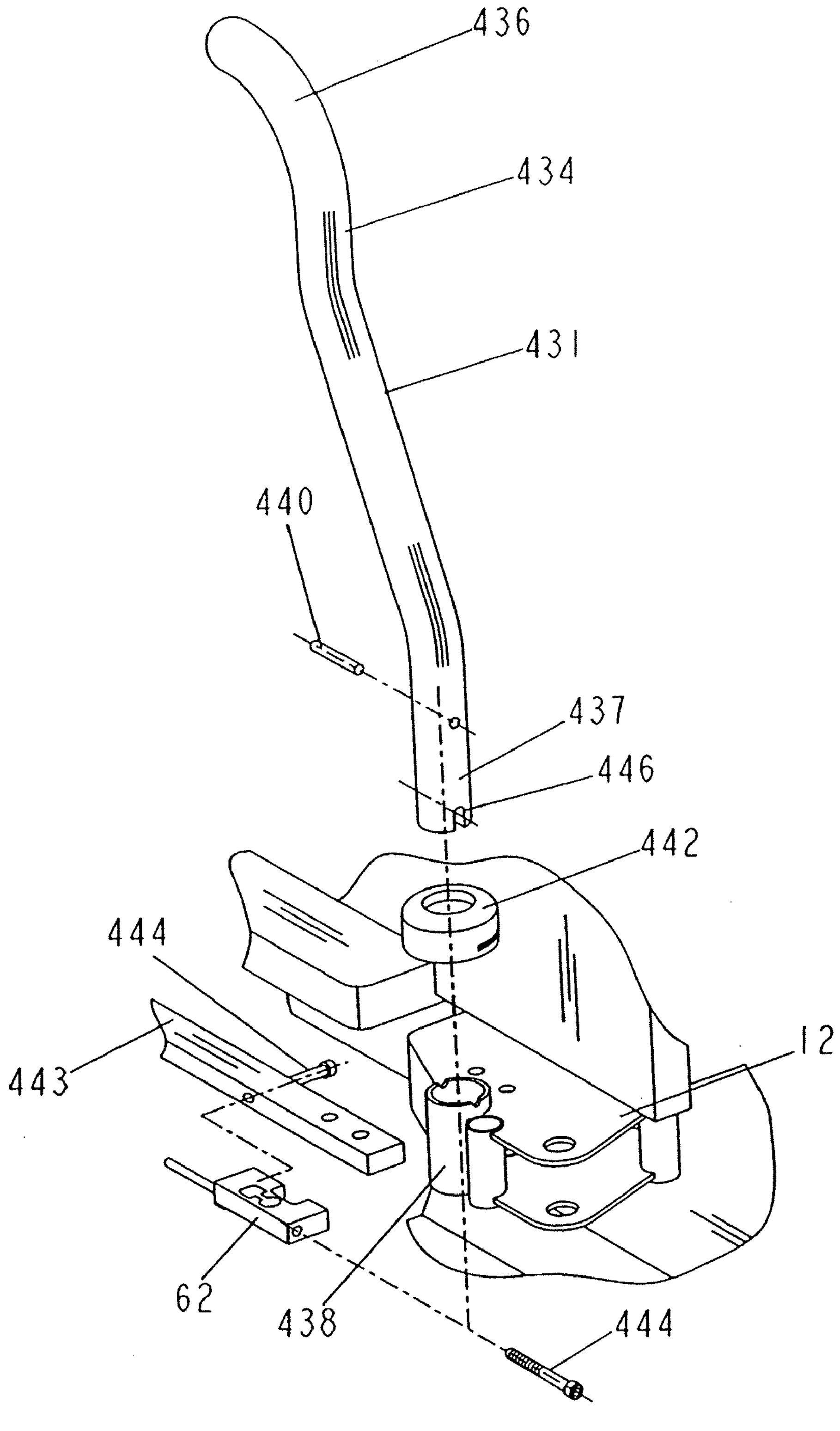
FIG. 40 is an exploded perspective view of the first handle of the second embodiment input system of FIG. 38.

Extension of the actuator 480 is stopped when an engagement arm 524 supported by connecting link 497 contacts a limit switch 526 supported by the chassis 456. A retracted position of actuator 480 is illustrated in FIG. 34 while an extended position of actuator 480 engaging the limit switch 526 is illustrated in FIG. 35.

After the traction belt 453 contacts floor 24, the actuator 480 continues to extend so that the tubular shuttle 494 continues to move to the left in direction of arrow 224. This continued movement of the shuttle 494 and the contact of motorized belt 453 with floor 24 causes compression of springs 506. Moreover, continued movement of the shuttle 494 occurs relative to the piston 512 which remains relatively stationary due to its attachment to the rolling support mount 458 through the chain 518. As such, continued movement of the shuttle 494 causes the end wall 508 to compress the spring 506 against the disk 516 of the piston 512. Such additional movement creates compression in the springs 506 such that the springs 506 are compressed while the belt 453 is in the normal use position with bedframe 12 at a normal distance from the floor 24. This additional compression creates a greater normal force between the floor 24 and belt 453 so that the belt 453 has increased traction with the floor. In order to further facilitate traction with the floor 24, the belt 453 may include a textured outer surface.

As mentioned earlier, the bedframe 12 will typically move to different elevations relative to floor 24 during transport of patient support 10' from one position in the care facility to another position in the care facility. For example, when patient support 10' is moved up or down a ramp, portions of bedframe 12 will be at different positions relative to the floor 24 when opposite ends of the patient support 10' are positioned on and off the ramp. Another example is when patient support 10 is moved over a raised threshold or over a depression in floor 24, such as an utility access plate (not shown). The compression in springs 506 create a downward bias on rolling support mount 458 in direction 232 so that when bedframe 12 is positioned over a "recess" in floor 24, spring 506 moves rolling support mount 458 and belt 453 in clockwise direction 160 about the pivot axis 474 so that the belt 453 remains in contact with the floor 24. Likewise, when bedframe 12 moves over a "bump" in floor 24, the weight of patient support 10 will compress springs 506 so that rolling support mount 458 and belt 453 rotate in counterclockwise direction 166 relative to chassis 456 and bedframe 12, as illustrated in FIG. 26.

To return the track drive 449 to the storage position, the actuator 480 moves to the retracted position as illustrated in FIG. 22 wherein the arm 488 is rotated counterclockwise by the connecting shaft 496. More particularly, as the actuator 480 retracts, the connecting link 497 causes the connecting shaft 496 to rotate in a counterclockwise direction, thereby imparting similar counterclockwise movement to the arm 488. The tubular shuttle 494 is thereby pushed to the right in direction 234. Simultaneously, the linkage 486 is pulled to the left thereby causing the rolling support mount 458 to pivot in a counterclockwise direction about the pivot axis 474 such that the track drive 449 are raised in a substantially vertical direction. As shuttle 494 moves in direction 234, the compression in springs 506 is gradually relieved until the springs 506 are again extended as illustrated in FIG. 22.

Figure 21:
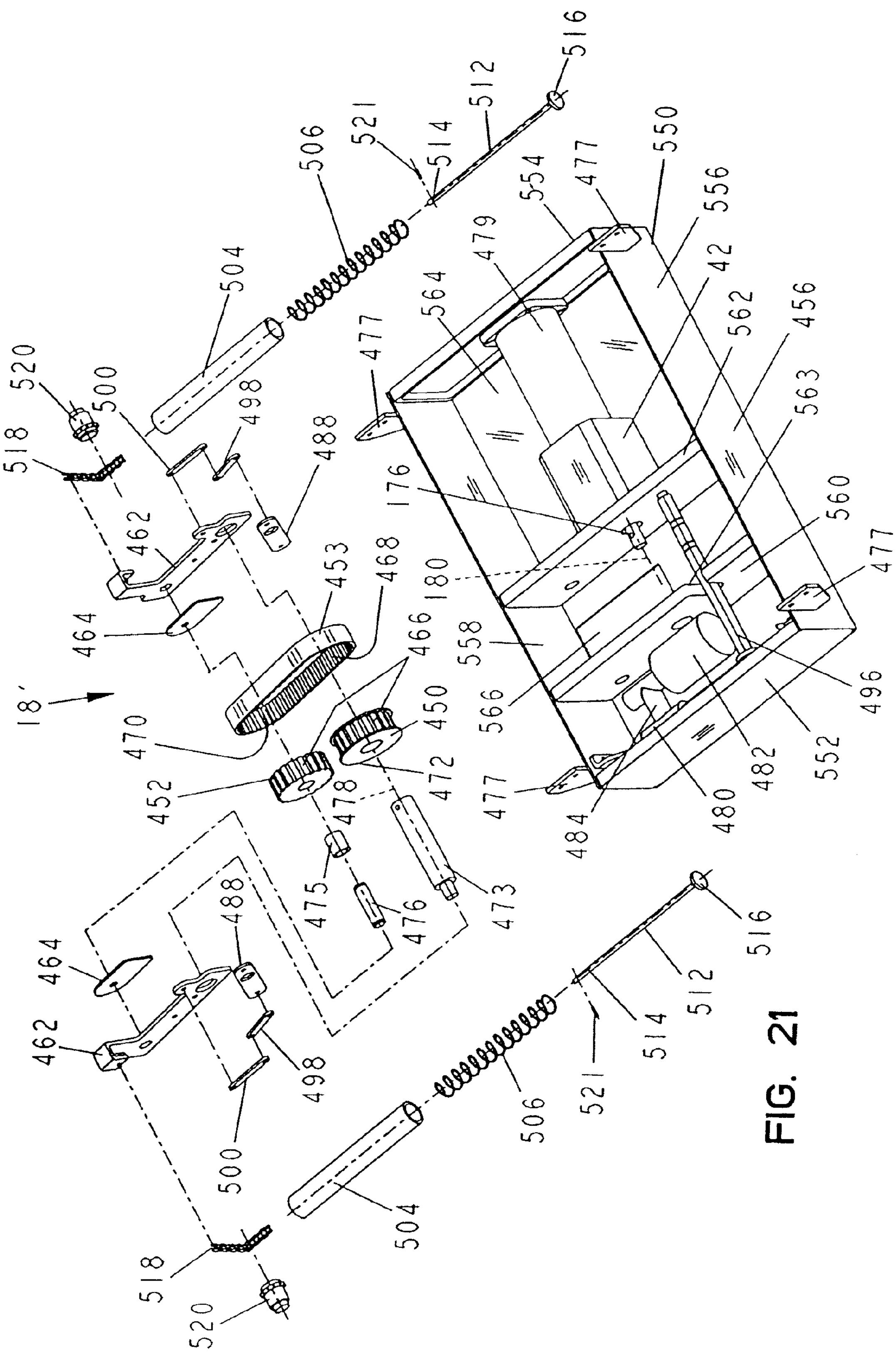
FIG. 21 is an exploded perspective view of the propulsion device of FIG. 18.

An exploded assembly view of chassis 456, track drive 449, and rolling support lifter 454 is provided in FIG. 21. Chassis 456 includes a chassis body 550 including a pair of spaced side arms 552 and 554 connected to a pair of spaced end arms 556 and 558 thereby forming a box-like structure. A pair of cross supports 560 and 562 extend between the end arms 556 and 558 and provide support for the motor 172 and actuator 480. The rolling support mount 458 is received between the cross supports 560 and 562. The hex connecting shaft 496 passes through a clearance 563 in the first cross support 560 and is rotatably supported by the second cross support 562. A pan 564 is secured to a lower surface of the chassis body 550 and includes an opening 566 for permitting the passage of the belt 453 therethrough. The sprockets 520 are rotatably supported by the cross supports 560 and 562.

A third embodiment patient support 10" is illustrated in FIGS. 41-63 as including an alternative embodiment propulsion system 16" coupled to the bedframe 12 in a manner similar to that identified above with respect to the previous embodiments. The alternative embodiment propulsion system 16" includes a propulsion device 18" and an input system 20" coupled to the propulsion device 18" in the manner described above with respect to the previous embodiments and as disclosed in FIG. 2.

The input system 20" of the third embodiment patient support 10" is substantially similar to the input system 20" of the second embodiment as described above in connection with FIGS. 36-40. As illustrated in FIGS. 57, 58, and 60-63, the user interface or handle 730 of the third embodiment includes first and second handle members 731 and 733 as in the second embodiment handle 430. However, these first and second handle members 731 and 733 are configured to be selectively positioned in an upright active position (in phantom in FIG. 63) or in a folded stowed position (in solid line in FIG. 63). Furthermore, the first and second user input devices 32 and 34 of input system 20" includes strain gauges 734 supported directly on outer surfaces of the handle members 731 and 733.

As in the second embodiment, the third user input device 735 of the third embodiment comprises a normally open push button switches of the type including a spring-biased button 736 in order to maintain the switch open when the button is not depressed. However, the switches 735 are positioned within a side wall of a tubular member 751 forming the handle members 731 and 733 such that the palms or fingers of the caregiver may easily depress the switches 735 when negotiating the bed 10". In the embodiment illustrated in FIGS. 57 and 58, the switch button 736 faces outwardly away from an end 9 of the patient support 10" such that an individual moving the bed 10" through the handle members 731 and 733 may have his or her palms contacting the button 736. Alternatively, the switch button 736 of each handle member 731 and 733 may be oriented approximately 180° relative to the position shown in FIGS. 57 and 58, thereby facing inwardly toward the mattress 14 such that an individual moving the bed 10" through the handle members 731 and 733 may have his or her fingers contacting the button 736.

With further reference to FIGS. 57, 58, and 60-63, lower ends 742 of the handle members 731 and 733 are supported for selective pivoting movement inwardly toward a center axis 744 of the bed 10". As such, when the bed 10" is not in use, the handle members 731 and 733 may be moved into a convenient and non-obtrusive position. A coupling 746 is provided between proximal and distal portions 748 and 750 of the handle members 731 and 733 in order to provide for the folding or pivoting of the handle members 731 and 733 into a stored position. More particularly, the distal portions 750 of the handle members 731 and 733 are received within the proximal portions 748 of the handle members 731 and 733. More particularly, both handle members 731 and 733 comprise elongated tubular members 751 including distal portions 750 which are slidably receivable within proximal portions 748.

Figure 61:
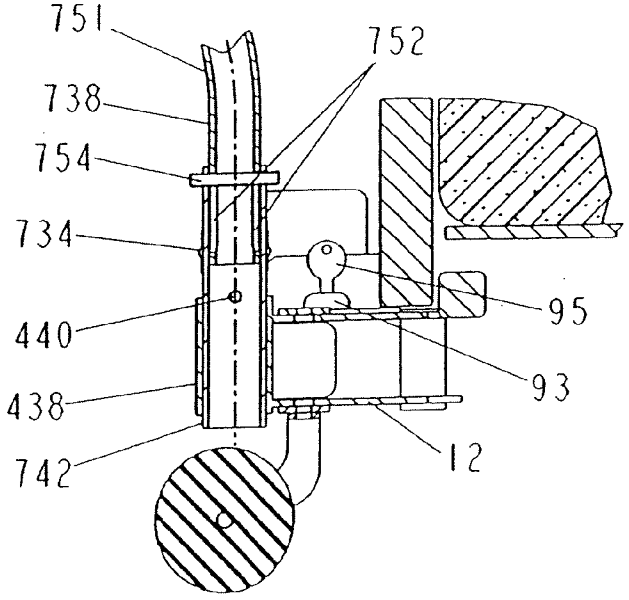
FIG. 61 is a sectional view taken along line 61-61 of FIG. 60.
Figure 62:
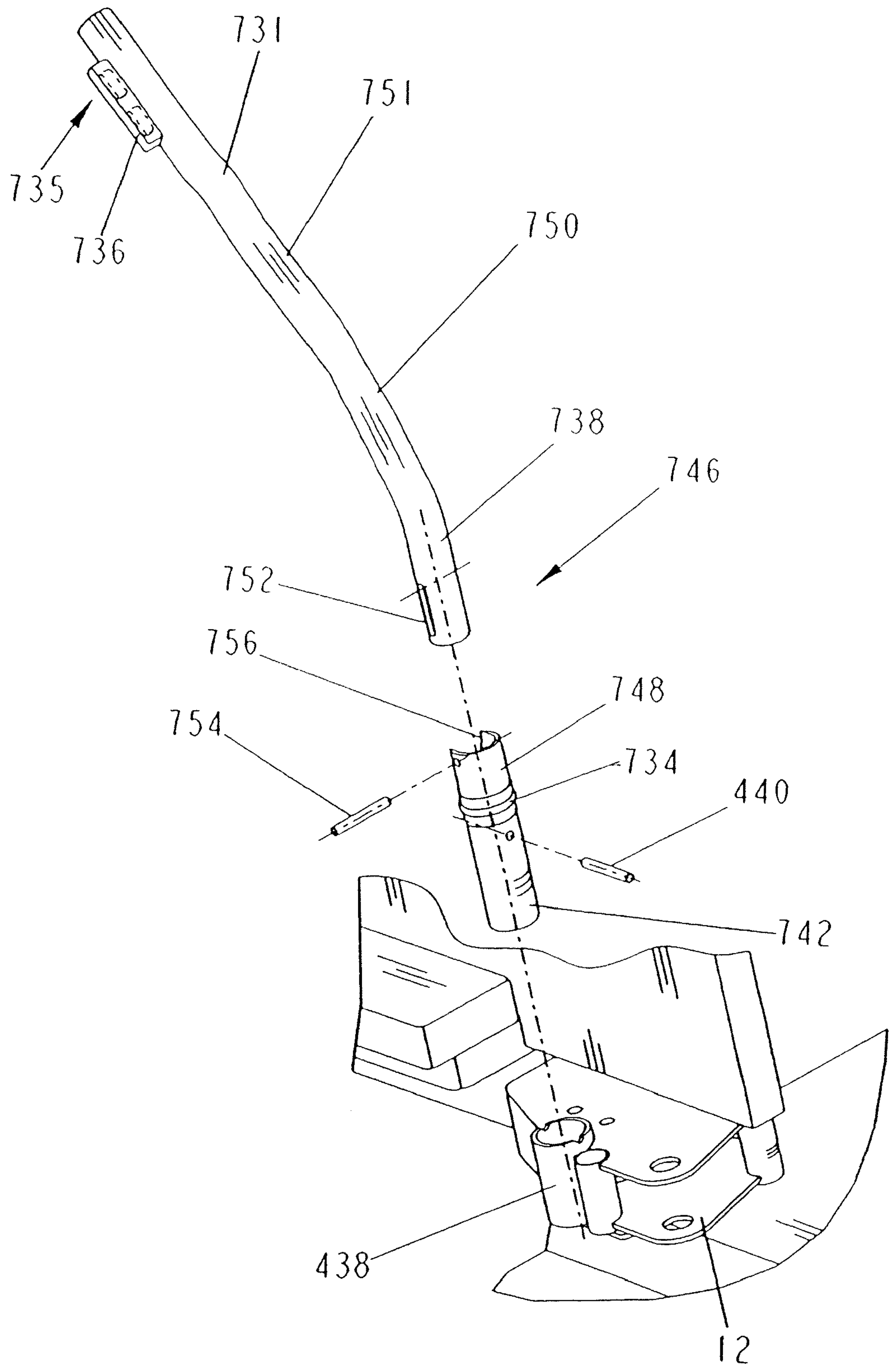
FIG. 62 is an exploded perspective view of the first handle of the third embodiment input system of FIG. 60.
Figure 63:
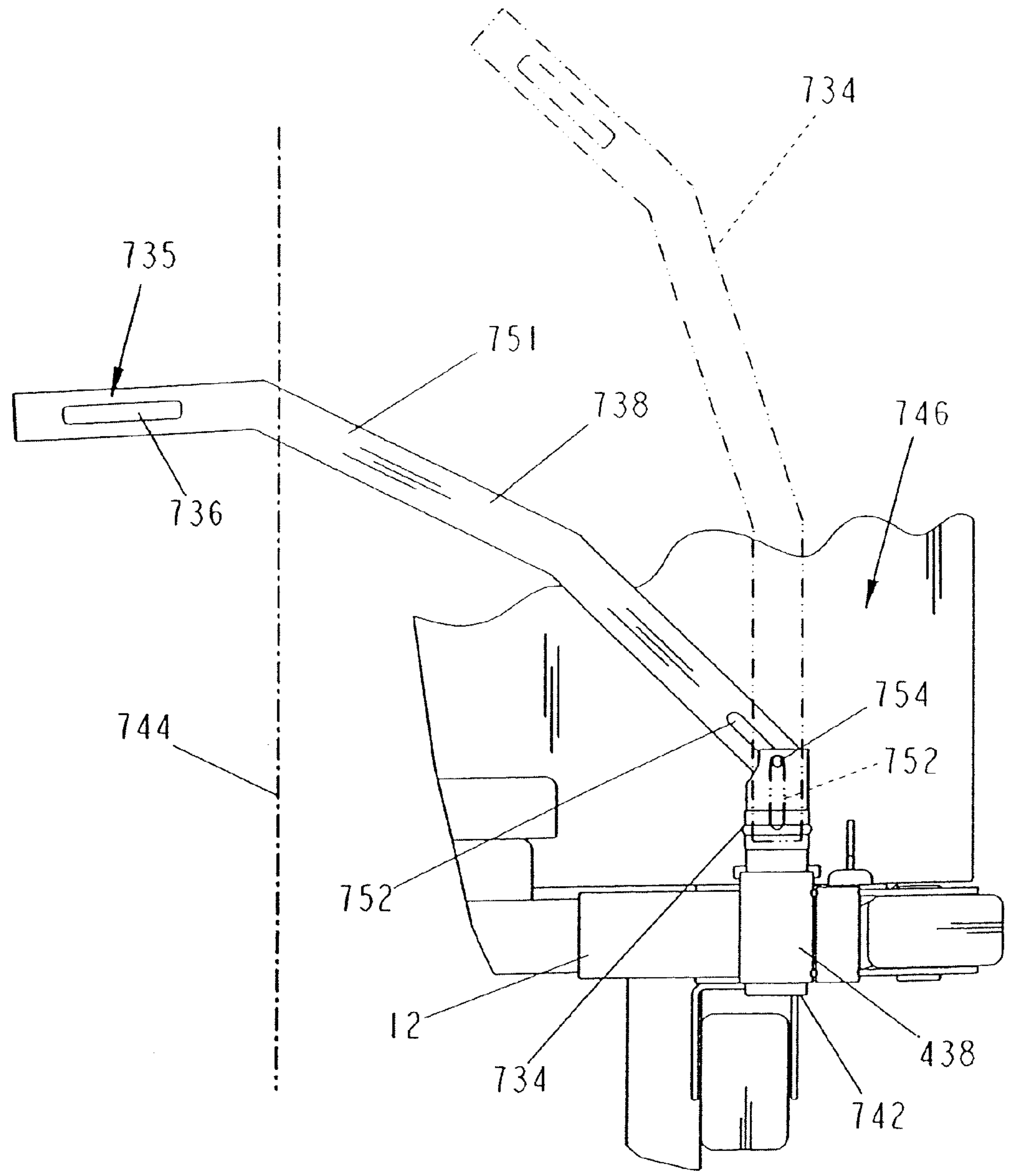
FIG. 63 is a partial end elevational view of the third embodiment input system of FIG. 57 showing selective pivotal movement of the first handle.

A pair of opposing elongated slots 752 are formed within the sidewall 738 of distal portion 750 of the handle members 731 and 733 (FIGS. 61-63). A pin 754 is supported within the proximal portion 748 of the handle members 731 and 733 and is slidably receivable within the elongated slots 752. As illustrated in FIG. 62, in order to pivot the handle members 731 and 733 downwardly toward the center axis 744 of the bed 10", the distal portion 750 is first pulled upwardly away from the proximal portion 748 wherein the pin 754 slides within the elongated slots 752. The distal portion 750 may then be folded downwardly into clearance notch 756 formed within the proximal portion 748 of the handle members 731 and 733. A conventional flexible bellows or sleeve (not shown) may be coupled to the handle members 731 and 733 to cover the coupling 746 while not interfering with pivotal movement between the proximal and distal portions 748 and 750 of the handle members 731 and 733.

The third embodiment propulsion device 18" is shown in greater detail in FIGS. 42-50. The propulsion device 18" includes a rolling support comprising a track drive 449 which is substantially identical to the track drive 449 disclosed above with respect to the second embodiment of propulsion device 18".

Figure 46:
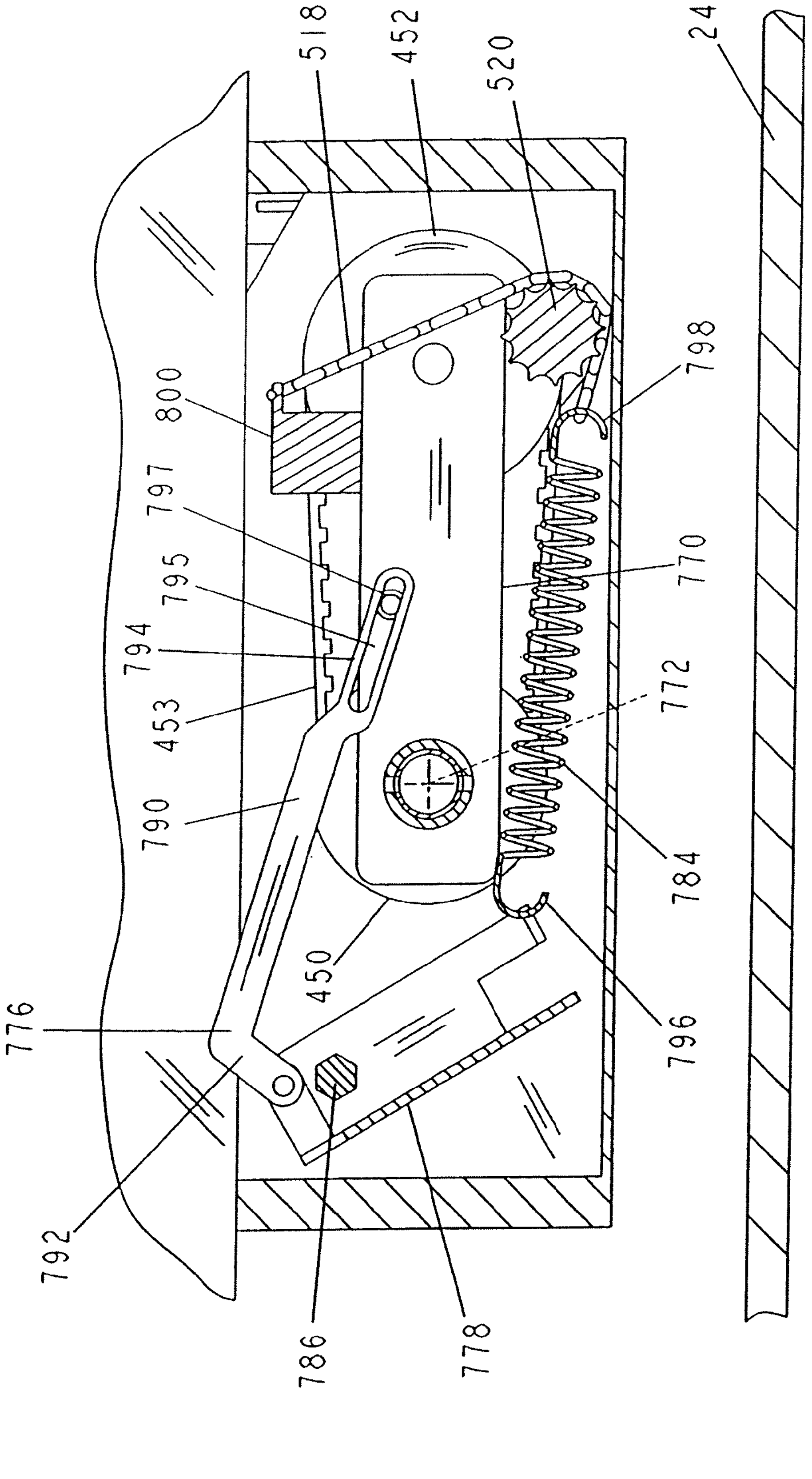
FIG. 46 is a sectional view taken along lines 46-46 of FIG. 43 showing the alternative embodiment propulsion device of FIG. 42 with the track drive spaced apart from the floor.
Figure 47:
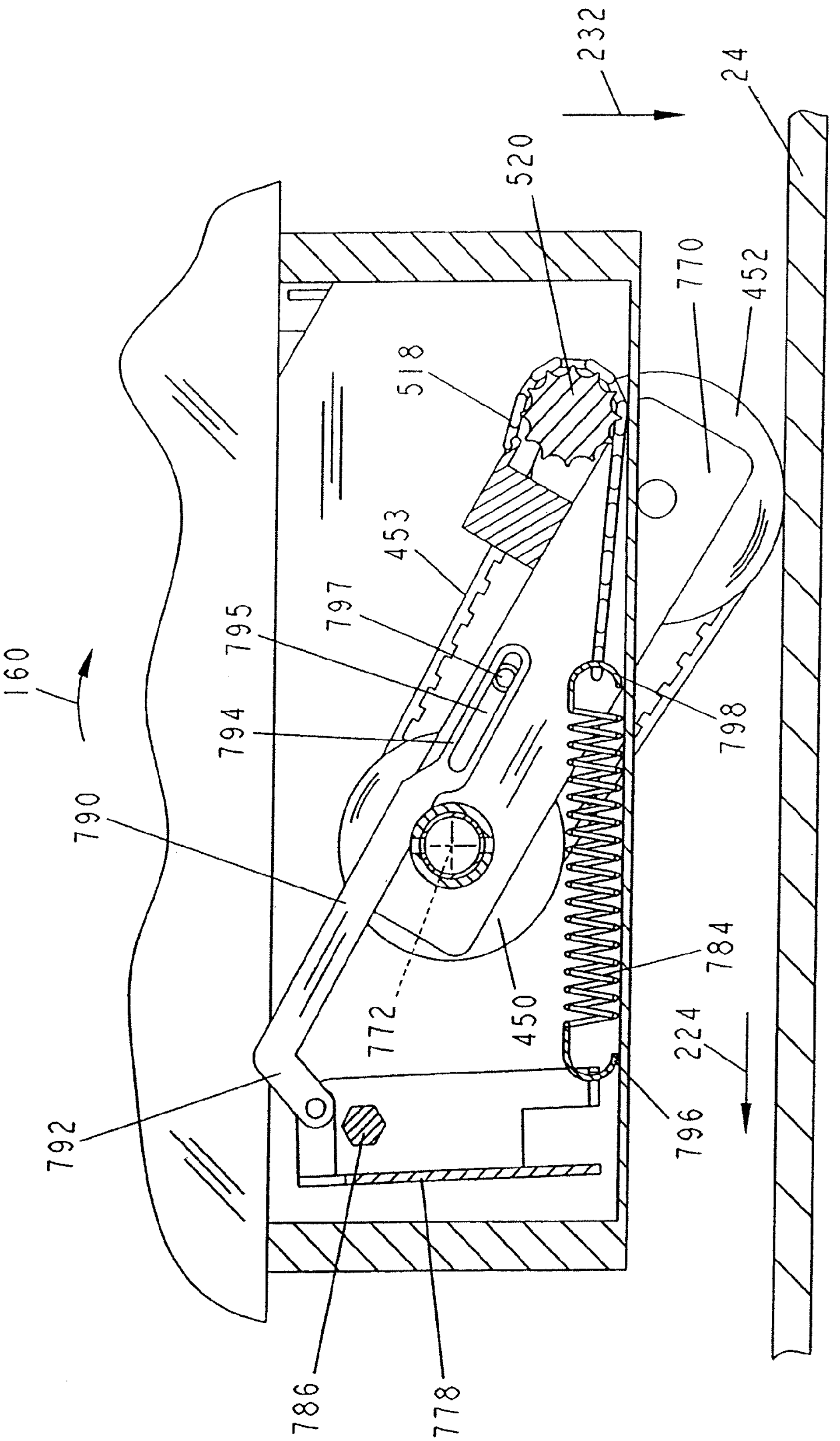
FIG. 47 is a view similar to FIG. 46 showing the spring moved to the left through action of the arm, thereby moving the traction belt into contact with the floor.
Figure 48:
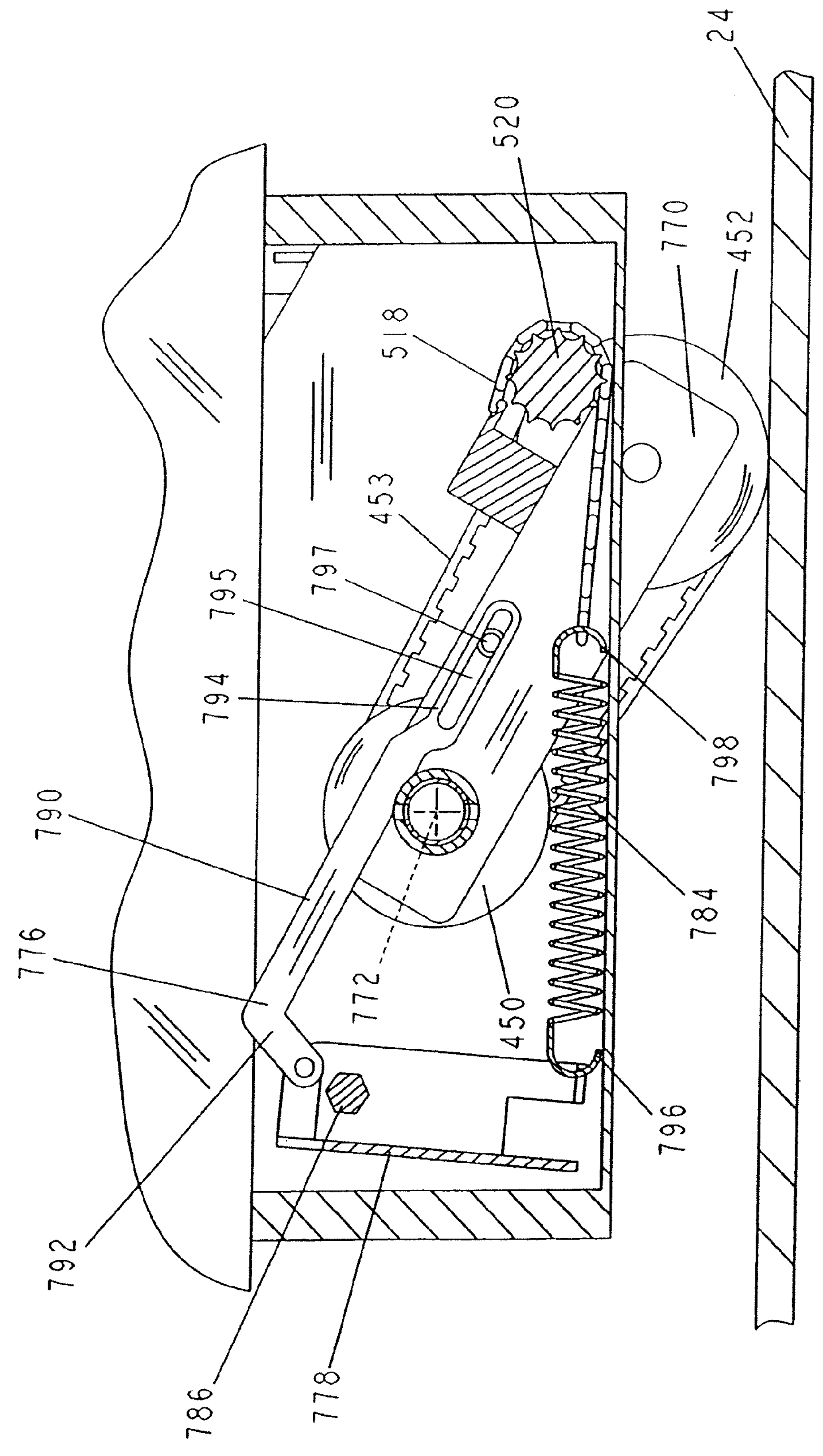
FIG. 48 is a view similar to FIG. 46 showing the spring moved further to the left than in FIG. 47 through action of the arm, and additional movement of the spring placing the spring in tension.
Figure 49:
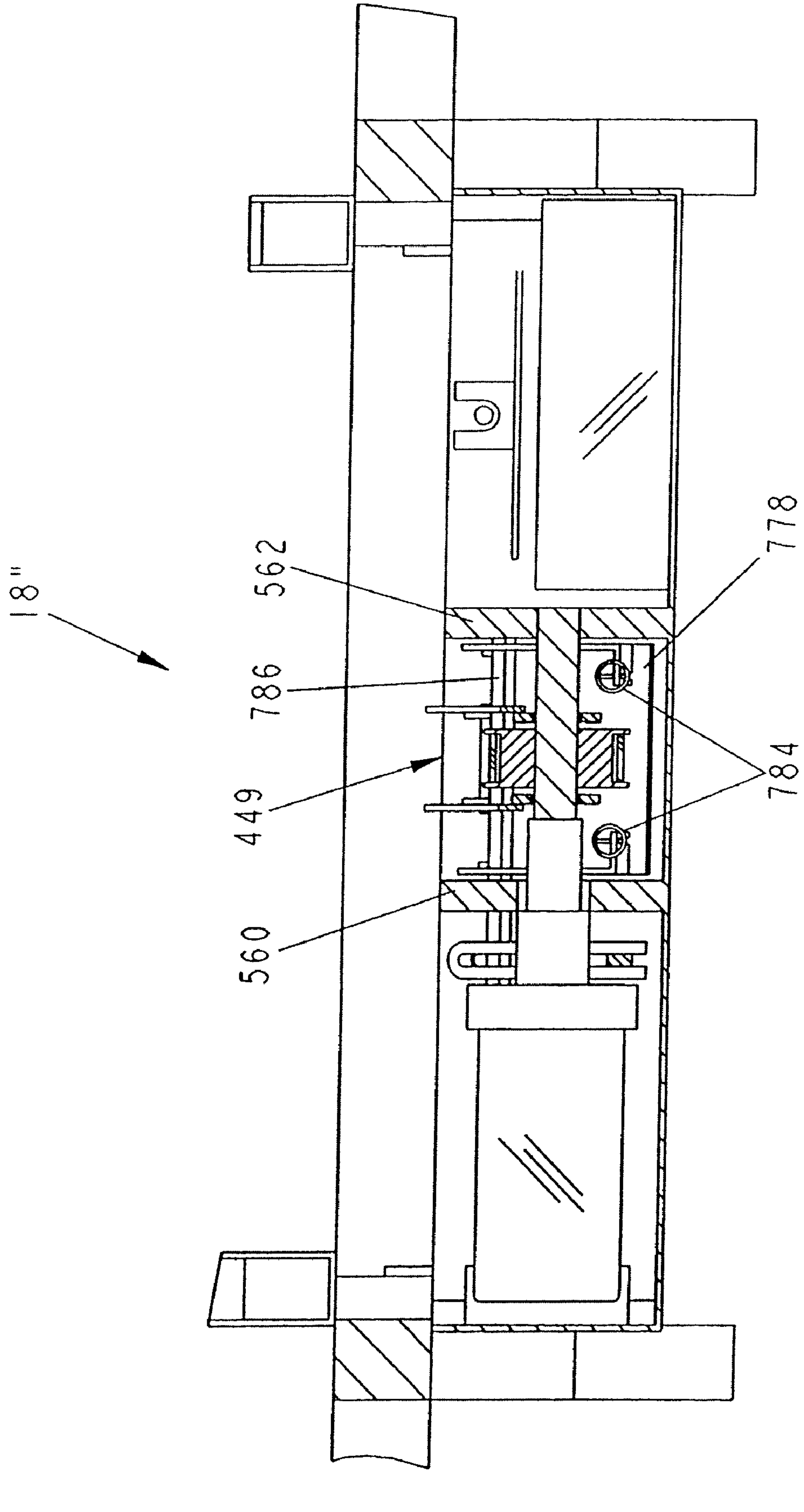
FIG. 49 is a sectional view taken along lines 49-49 of FIG. 43.
Figure 50:
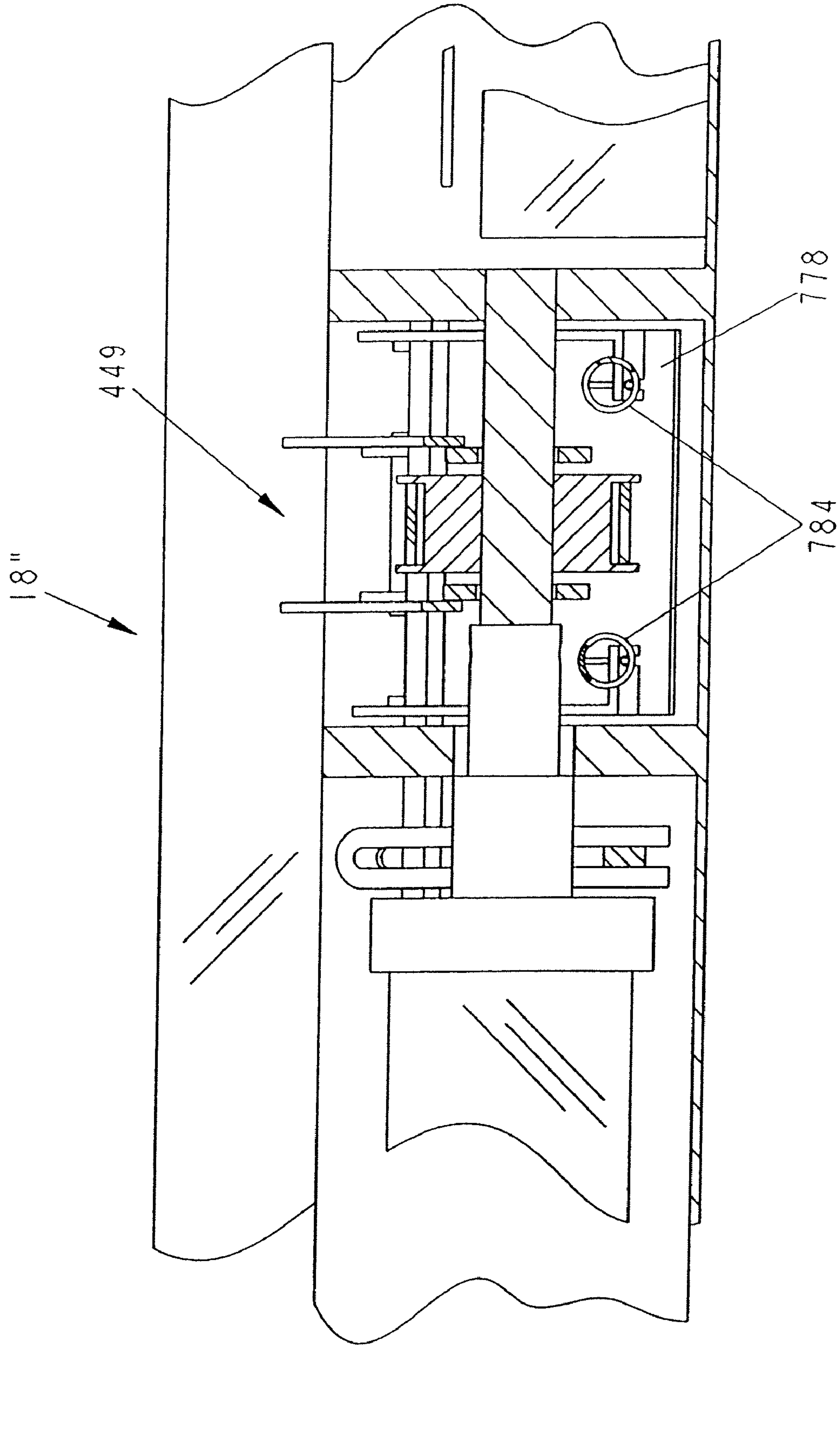
FIG. 50 is a detail view of FIG. 49.
Figure 51:
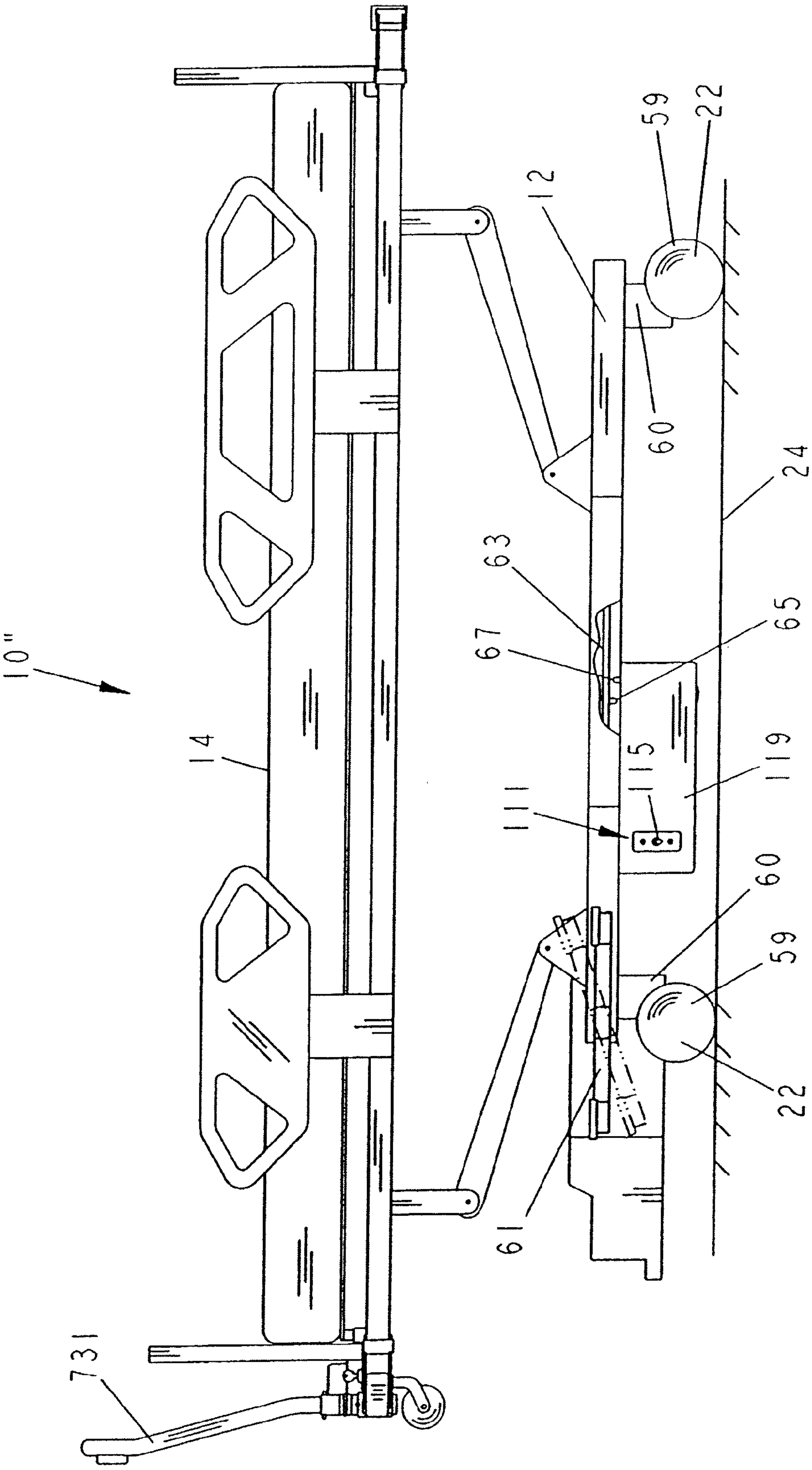
FIG. 51 is a side elevational view of the alternative embodiment hospital bed of FIG. 41 showing a caster and braking system operably connected to the third embodiment propulsion device.

A third embodiment traction engagement controller 760 includes a traction device mover, illustratively a rolling support lifter 762, and a chassis 764 coupling the rolling support lifter 762 to the bed frame 12. The rolling support lifter 762 includes a rolling support mount 766 coupled to the chassis 764 and a rolling support mount mover, or simply rolling support mover 768, coupled to the rolling support mount 766 and chassis 764 at various locations. The rollers 450 and 452 of track drive 449 are rotatably supported by the rolling support mount intermediate side plates 770. The rolling support mover 768 is configured to pivot the rolling support mount 766 and track drive 449 about pivot axis 772 to move the traction belt 453 between a storage position spaced apart from floor 24 and a use position in contact with floor 24 as illustrated in FIGS. 46-48. Rolling support mount 766 is further configured to permit the track drive to raise and lower during use of the patient support 10" in order to compensate for changes in elevation of the patient support 10" in a manner similar to that described above with respect to the previous embodiments. Thus, rolling support mount 766 is configured to permit traction belt 453 to remain in contact with floor 24 during changes in elevation of floor 24 relative to patient support 10".

Rolling support mount 766 further includes a motor mount 479 supporting a motor 42 coupled to chassis 764 in order to provide power to rotate the first roller 450 and, in turn, the traction belt 453. Additional details of the motor 42 are provided above with respect to the previous embodiments of patient support 10 and 10'.

The rolling support mount mover 768 further includes a linear actuator 774, preferably a 24-volt linear motor including built-in limit travel switches. A linkage system 776 is coupled to the actuator 774 through a pivot bracket 778. Moreover, a first end 780 of pivot bracket 778 is connected to the linkage system 776 while a second end 782 of the pivot bracket 778 is connected to a shuttle 784, preferably an extension spring. The spring 784 is configured to move substantially horizontally in response to pivoting movement of the bracket 778. The bracket 778 is operably connected to the actuator 774 through a hexagonal connecting shaft 786 having a pivot axis 788.

The linkage system 776 includes an elongated link 790 having opposing first and second ends 792 and 794, the first end 792 secured to the pivot bracket 778 and the second end 794 mounted for sliding movement relative to one of the side plates 770. More particularly, a slot 795 is formed proximate the second end 794 of the link 790 for slidably receiving a pin 797 supported by the side plates 770.

The extension spring 784 includes opposing first and second ends 796 and 798, wherein the first end 796 is fixed to the pivot bracket 778 and the opposing second end 798 is fixed to a flexible linkage, preferably chain 518. The chain 518 is guided around a sprocket 520 and includes a first end connected to the spring 784 and a second end fixed to an upwardly extending arm 800 of the side plate 770 of the rolling support mount 766.

The actuator 774 is configured to move between a retracted position as shown in FIG. 46 and an extended position as shown in FIGS. 47 and 48 in order to move the connecting link 497 and connecting hex shaft 786 in a clockwise direction 160. This movement of the hex shaft 786 results in similar movement of the pivot bracket 778 such that the spring 784 moves to the left in the direction of arrow 224 as illustrated in FIG. 47. Movement of the spring 784 to the left results in similar movement of chain 518 which is guided around sprocket 520. In turn, the rolling support mount 766 is moved in a downward direction as illustrated by arrow 232 in FIG. 47.

After the traction belt 453 contacts the floor 24, actuator 424 continues to extend so that the spring 784 is further extended and placed in tension. The tension in spring 784 therefore creates a greater normal force between the floor 24 and the belt 453 so the belt 453 has increased traction with the floor 24. As with the earlier embodiments, the spring 784 facilitates movement of the traction device 26 over a raised threshold or bump or over a depression in floor 24.

In order to return the track drive 449 to the storage position, actuator 774 moves to the retracted position as illustrated in FIG. 46 wherein the pivot bracket 778 is rotated counterclockwise by the hex shaft 786. More particularly, as the actuator 774 retracts, the connecting link 497 causes the hex shaft 786 to rotate in a counterclockwise direction, thereby imparting similar counterclockwise pivoting movement to the pivot bracket 778. The linkage 776 is thereby pulled to the left causing the rolling support mount 766 to pivot in a counterclockwise direction about the pivot axis 772 such that the track drive 449 is raised in a substantially vertical direction. It should be noted that initial movement of the link 790 will cause the pin 797 to slide within the elongated slot 795. However, as the pin 797 reaches its end of travel within the slot 795, the link 790 will pull the mount 766 upwardly.

Although the invention has been described in detail with reference to illustrative embodiments, variations and modifications exist within the scope and spirit of the invention as described and defined in the following claims.

The invention claimed is:

1. A patient support, comprising:

a frame configured to support a person in at least a horizontal position, a motor, a propulsion device coupled to the motor and coupled to the frame, the propulsion device including a rolling support to propel the patient support from one location to another location in response to output from the motor, a traction engagement controller coupled to the propulsion device and coupled to the frame, configured to:

move the propulsion device from a first position in which the propulsion device is unable to propel the patent support to a second position in which the propulsion device is able to propel the patient support in response to user input, and move the propulsion device toward or away from the floor to compensate for changes in elevation of the patient support and allow the propulsion device to remain in contact with the floor as the patient support is propelled by the propulsion device over the changes in elevation, and a plurality of casters supporting the frame and a caster mode detector operable to detect a mode of operation of the casters, wherein the traction engagement controller is configured to initiate movement of the propulsion device to the second position if the caster mode detector determines that the casters are in a steer mode.

2. The patient support of claim 1, wherein the traction engagement controller comprises a rolling support mount coupled to the frame and supporting the propulsion device, and a rolling support mount mover coupled to the rolling support mount and coupled to the frame.

3. The patient support of claim 2, wherein the rolling support mount mover is configured to move the rolling support mount from the first position to the second position and to move the rolling support mount in response to the changes in elevation of the patient support.

4. The patient support of claim 3, wherein the rolling support mount mover comprises an actuator configured to move the rolling support mount from the first position to the second position.

5. The patient support of claim 4, wherein the rolling support mount mover comprises at least one spring configured to move the rolling support mount in response to the changes in elevation of the patient support.

6. The patient support of claim 5, wherein the at least one spring is coupled to the rolling support mount.

7. The patient support of claim 1, wherein the rolling support is at least one of a wheel, roller, track, or belt.

8. The patient support of claim 1, comprising a user input device operably coupled to the propulsion device.

9. The patient support of claim 1, comprising a speed controller configured to control the motor output based on user input.

10. A patient support, comprising:

a frame configured to support a person in at least a horizontal position, a motor, a propulsion device coupled to the motor and coupled to the frame, the propulsion device including a rolling support to propel the patient support from one location to another location in response to output from the motor, and a traction engagement controller coupled to the propulsion device and coupled to the frame, configured to:

move the propulsion device from a first position in which the propulsion device is unable to propel the patent support to a second position in which the propulsion device is able to propel the patient support in response to user input, and move the propulsion device toward or away from the floor to compensate for changes in elevation of the patient support and allow the propulsion device to remain in contact with the floor as the patient support is propelled by the propulsion device over the changes in elevation, wherein the traction engagement controller comprises a rolling support mount coupled to the frame and supporting the propulsion device, and a rolling support mount mover coupled to the rolling support mount and coupled to the frame, wherein the rolling support mount mover is configured to move the rolling support mount from the first position to the second position and to move the rolling support mount in response to the changes in elevation of the patient support, wherein the rolling support mount mover comprises an actuator configured to move the rolling support mount from the first position to the second position, wherein the rolling support mount mover comprises at least one spring configured to move the rolling support mount in response to the changes in elevation of the patient support, wherein the at least one spring is coupled to the rolling support mount wherein the at least one spring is coupled to the actuator by a shuttle.

11. The patient support of claim 10, wherein the shuttle is coupled to the actuator by a linkage system.

12. The patient support of claim 11, wherein the linkage system comprises a plurality of links.

13. The patient support of claim 12, wherein the plurality of links comprises a first link pivotably coupled to the actuator and the frame, and a second link pivotably coupled to the first link and the shuttle.

14. A patient support, comprising:

a frame configured to support a person in at least a horizontal position, a motor, a propulsion device coupled to the motor and coupled to the frame, the propulsion device including a rolling support to propel the patient support from one location to another location in response to output from the motor, and a traction engagement controller coupled to the propulsion device and coupled to the frame, configured to:

move the propulsion device from a first position in which the propulsion device is unable to propel the patent support to a second position in which the propulsion device is able to propel the patient support in response to user input, and move the propulsion device toward or away from the floor to compensate for changes in elevation of the patient support and allow the propulsion device to remain in contact with the floor as the patient support is propelled by the propulsion device over the changes in elevation, wherein the traction engagement controller comprises a rolling support mount coupled to the frame and supporting the propulsion device, and a rolling support mount mover coupled to the rolling support mount and coupled to the frame, wherein the rolling support mount mover is configured to move the rolling support mount from the first position to the second position and to move the rolling support mount in response to the changes in elevation of the patient support, wherein the rolling support mount mover comprises an actuator configured to move the rolling support mount from the first position to the second position, wherein the rolling support mount mover comprises at least one spring configured to move the rolling support mount in response to the changes in elevation of the patient support, wherein the at least one spring has a first end pivotably coupled to the shuttle and a second end coupled to the rolling support mount.

15. A patient support, comprising:

a frame configured to support a person in at least a horizontal position, a motor, a propulsion device coupled to the motor and coupled to the frame, the propulsion device including a rolling support to propel the patient support from one location to another location in response to output from the motor, and a traction engagement controller coupled to the propulsion device and coupled to the frame, configured to:

move the propulsion device from a first position in which the propulsion device is unable to propel the patent support to a second position in which the propulsion device is able to propel the patient support in response to user input, and move the propulsion device toward or away from the floor to compensate for changes in elevation of the patient support and allow the propulsion device to remain in contact with the floor as the patient support is propelled by the propulsion device over the changes in elevation, wherein the traction engagement controller comprises a rolling support mount coupled to the frame and supporting the propulsion device, and a rolling support mount mover coupled to the rolling support mount and coupled to the frame, wherein the rolling support mount mover is configured to move the rolling support mount from the first position to the second position and to move the rolling support mount in response to the changes in elevation of the patient support, wherein the rolling support mount mover comprises an actuator configured to move the rolling support mount from the first position to the second position, wherein the rolling support mount mover comprises at least one spring configured to move the rolling support mount in response to the changes in elevation of the patient support, wherein the rolling support mover is configured such that the actuator is in a retracted position and the spring is in a compressed position when the propulsion device is in the second position.

16. A patient support, comprising:

a frame configured to support a person in at least a horizontal position, a motor a propulsion device coupled to the motor and coupled to the frame, the propulsion device including a rolling support to propel the patient support from one location to another location in response to output from the motor, and a traction engagement controller coupled to the propulsion device and coupled to the frame, configured to:

move the propulsion device from a first position in which the propulsion device is unable to propel the patent support to a second position in which the propulsion device is able to propel the patient support in response to user input, and move the propulsion device toward or away from the floor to compensate for changes in elevation of the patient support and allow the propulsion device to remain in contact with the floor as the patient support is propelled by the propulsion device over the changes in elevation, wherein the traction engagement controller comprises a rolling support mount coupled to the frame and supporting the propulsion device, and a rolling support mount mover coupled to the rolling support mount and coupled to the frame, wherein the rolling support mount mover is configured to move the rolling support mount from the first position to the second position and to move the rolling support mount in response to the changes in elevation of the patient support, wherein the rolling support mount mover comprises an actuator configured to move the rolling support mount from the first position to the second position, wherein the rolling support mount mover comprises at least one spring configured to move the rolling support mount in response to the changes in elevation of the patient support, wherein the rolling support mover is configured such that the actuator is in an extended position and the spring is in an uncompressed position when the propulsion device is in the first position.

17. A patient support, comprising:

a frame configured to support a person in at least a horizontal position, a motor, a propulsion device coupled to the motor and coupled to the frame, the propulsion device including a rolling support to propel the patient support from one location to another location in response to output from the motor, and a traction engagement controller coupled to the propulsion device and coupled to the frame, configured to:

move the propulsion device from a first position in which the propulsion device is unable to propel the patent support to a second position in which the propulsion device is able to propel the patient support in response to user input, and move the propulsion device toward or away from the floor to compensate for changes in elevation of the patient support and allow the propulsion device to remain in contact with the floor as the patient support is propelled by the propulsion device over the changes in elevation, wherein the traction engagement controller comprises a rolling support mount coupled to the frame and supporting the propulsion device, and a rolling support mount mover coupled to the rolling support mount and coupled to the frame, wherein the rolling support mount mover is configured to move the rolling support mount from the first position to the second position and to move the rolling support mount in response to the changes in elevation of the patient support, wherein the rolling support mount mover comprises an actuator configured to move the rolling support mount from the first position to the second position, wherein the rolling support mount mover comprises at least one spring configured to move the rolling support mount in response to the changes in elevation of the patient support, wherein the rolling support mover is configured such that the actuator is in an extended position and the spring is in an compressed position when the propulsion device is in the second position.

18. A patient support, comprising:

a frame configured to support a person in at least a horizontal position, a motor, a propulsion device coupled to the motor and coupled to the frame, the propulsion device including a rolling support to propel the patient support from one location to another location in response to output from the motor, and a traction engagement controller coupled to the propulsion device and coupled to the frame, configured to:

move the propulsion device from a first position in which the propulsion device is unable to propel the patent support to a second position in which the propulsion device is able to propel the patient support in response to user input, and move the propulsion device toward or away from the floor to compensate for changes in elevation of the patient support and allow the propulsion device to remain in contact with the floor as the patient support is propelled by the propulsion device over the changes in elevation, wherein the traction engagement controller comprises a rolling support mount coupled to the frame and supporting the propulsion device, and a rolling support mount mover coupled to the rolling support mount and coupled to the frame, wherein the rolling support mount mover is configured to move the rolling support mount from the first position to the second position and to move the rolling support mount in response to the changes in elevation of the patient support, wherein the rolling support mount mover comprises an actuator configured to move the rolling support mount from the first position to the second position, wherein the rolling support mount mover comprises at least one spring configured to move the rolling support mount in response to the changes in elevation of the patient support, wherein the rolling support mover is configured such that the actuator is in a retracted position and the spring is in an uncompressed position when the propulsion device is in the first position.

19. A patient support, comprising:

a frame configured to support a person in at least a horizontal position, a motor, a propulsion device coupled to the motor and coupled to the frame, the propulsion device including a rolling support to propel the patient support from one location to another location in response to output from the motor, a traction engagement controller coupled to the propulsion device and coupled to the frame, configured to:

move the propulsion device from a first position in which the propulsion device is unable to propel the patent support to a second position in which the propulsion device is able to propel the patient support in response to user input, move the propulsion device toward or away from the floor to compensate for changes in elevation of the patient support and allow the propulsion device to remain in contact with the floor as the patient support is propelled by the propulsion device over the changes in elevation, and an external power detector operable to determine if external power is supplied to the patient support, wherein the traction engagement controller is configured to initiate movement of the propulsion device to the second position if the external power detector determines that external power is not supplied to the patient support.

* * * * *